(12) United States Patent
Suganuma

(10) Patent No.: US 11,328,260 B2
(45) Date of Patent: May 10, 2022

(54) BEHAVIOR VISUALIZATION DEVICE AND BEHAVIOR VISUALIZATION METHOD

(71) Applicant: MITSUBISHI ELECTRIC CORPORATION, Tokyo (JP)

(72) Inventor: Yuko Suganuma, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 367 days.

(21) Appl. No.: 16/618,657

(22) PCT Filed: Jul. 19, 2017

(86) PCT No.: PCT/JP2017/026106
§ 371 (c)(1),
(2) Date: Dec. 2, 2019

(87) PCT Pub. No.: WO2019/016890
PCT Pub. Date: Jan. 24, 2019

(65) Prior Publication Data
US 2020/0118081 A1    Apr. 16, 2020

(51) Int. Cl.
*G06Q 10/10* (2012.01)
*G06Q 10/06* (2012.01)
(Continued)

(52) U.S. Cl.
CPC .......... *G06Q 10/109* (2013.01); *G06C 9/00* (2013.01); *G06Q 10/06311* (2013.01);
(Continued)

(58) Field of Classification Search
CPC .......... G06Q 10/109; G06Q 10/06311; G06Q 50/10; G06C 9/00; G06T 11/206; G06V 10/25; G06V 20/64; G06V 20/52
See application file for complete search history.

(56) References Cited

U.S. PATENT DOCUMENTS 8,295,597 B1  10/2012 Sharma et al.
10,846,745 B1 * 11/2020 Meissner .......... G06Q 30/0267
(Continued)

FOREIGN PATENT DOCUMENTS

EP    1 870 864 B1    2/2010
JP    2007-110341 A   4/2007
(Continued)

OTHER PUBLICATIONS

Office Action dated Nov. 11, 2020 in corresponding German Patent Application No. 11 2017 007 657.9 with an English Translation.
(Continued)

*Primary Examiner* — An T Nguyen
(74) *Attorney, Agent, or Firm* — Birch, Stewart, Kolasch & Birch, LLP

(57) ABSTRACT

Included are: a summary condition setting unit (104) for setting a summary condition for extracting whereabouts deeply associated with a target of interest; an important whereabouts extracting unit for extracting whereabouts deeply associated with the target of interest in each of a plurality of time zones based on whereabouts information indicating whereabouts of the target of interest and a summary condition set by the summary condition setting unit (104); a figure generating unit (106) for calculating the areas of figure regions of figures representing whereabouts deeply associated with the target of interest, extracted by the important whereabouts extracting unit, and a distance between the figure regions, and generating drawing figure data for displaying a figure representing whereabouts deeply associated with the target of interest in a hierarchical structure; and a drawing unit (109) for displaying drawing figure data generated by the figure generating unit (106) on a display device (4).

22 Claims, 61 Drawing Sheets

(51) Int. Cl.
  *G06T 11/20* (2006.01)
  *G06C 9/00* (2006.01)
  *G06V 10/25* (2022.01)
  *G06V 20/64* (2022.01)

(52) U.S. Cl.
  CPC ............ *G06T 11/206* (2013.01); *G06V 10/25* (2022.01); *G06V 20/64* (2022.01)

(56) References Cited

U.S. PATENT DOCUMENTS

| | | | |
|---|---|---|---|
| 2003/0117279 A1* | 6/2003 | Ueno | G06K 9/00771 340/523 |
| 2005/0131736 A1 | 6/2005 | Nelson et al. | |
| 2011/0081634 A1* | 4/2011 | Kurata | G06N 5/02 434/236 |
| 2015/0199698 A1 | 7/2015 | Yoshitake et al. | |
| 2016/0196494 A1 | 7/2016 | Scarr et al. | |
| 2016/0219170 A1 | 7/2016 | Tomono et al. | |
| 2017/0011410 A1 | 1/2017 | Oshima | |
| 2017/0193309 A1* | 7/2017 | Kanda | G06T 7/20 |

FOREIGN PATENT DOCUMENTS

| | | |
|---|---|---|
| JP | 2008-283 A | 1/2008 |
| JP | 2009-123181 A | 6/2009 |
| JP | 2009-157518 A | 7/2009 |
| JP | 2009-245128 A | 10/2009 |
| JP | 2009-285077 A | 12/2009 |
| JP | 2011-81431 A | 4/2011 |
| JP | 2011-118647 A | 6/2011 |
| JP | 2012-211 A | 1/2012 |
| JP | 4982511 B2 | 7/2012 |
| JP | 5025800 B2 | 9/2012 |
| JP | 5302290 B2 | 10/2013 |
| JP | 5361018 B2 | 12/2013 |
| JP | 2015-125555 A | 7/2015 |
| JP | 2015-166983 A | 9/2015 |
| JP | 2016-134113 A | 7/2016 |
| JP | 2017-111535 A | 6/2017 |

OTHER PUBLICATIONS

International Search Report for PCT/JP2017/026106 dated Oct. 3, 2017.

Mori et al., "Behavior description and anomaly detection algorithm based on accumulating sensor data in room environment", Proceedings of the 2007 JSME Conference on Robotics and Mechatronics, Akita, Japan, May 10-12, 2007, 1A1-L06, total 4 pages.

Office Action for Japanese Patent Application No. 2017-564655 dated Mar. 13, 2018.

Office Action for Taiwanese Patent Application No. 10720835840 dated Sep. 10, 2018.

\* cited by examiner

|  | Kitchen | Dining Room | Living Room | Private Room B | ... |
|---|---|---|---|---|---|
| Kitchen | 0 | 1 | 0 | 2 | |
| Dining Room | 1 | 0 | 1 | 2 | |
| Living Room | 0 | 1 | 0 | 2 | |
| Private Room B | 2 | 2 | 2 | 0 | |
| ... | | | | | ... |

| Room ID | Room Name | Device/Sensor Type ID | Device/Sensor Name | Device/Sensor ID | Attribute |
|---|---|---|---|---|---|
| 0001 | Living Room | 100 | TV | 101 | – |
| 0001 | Living Room | 200 | Air Conditioner | 201 | – |
| 0001 | Living Room | 1000 | Human Sensor | 1001 | Type A |
| 0001 | Living Room | 2000 | Door Opening/Closing Sensor | 2001 | Type A |
| ... | | | | | |

FIG. 4

| Date | Time | Room | Device ID | Operation | Attribute 1 | ... | Attribute N |
|---|---|---|---|---|---|---|---|
| 2017/11/10 | 20:16 | Private Room B | Lighting (ID211) | ON | Lighting Information 1 | ... | Lighting Information N |
| 2017/11/10 | 20:18 | Private Room B | Air Conditioner (ID210) | ON | Air Conditioner Information 1 | ... | Air Conditioner Information N |
| 2017/11/10 | 20:32 | Private Room B | Air Conditioner (ID210) | Change In Wind Direction | Air Conditioner Information 1 | ... | Air Conditioner Information N |
| 2017/11/10 | 21:38 | Living Room | Lighting (ID112) | ON | Lighting Information 1 | ... | Lighting Information N |
| 2017/11/10 | 21:55 | Living Room | TV (ID110) | ON | Program Information 1 | ... | Program Information N |
| 2017/11/10 | 21:55 | Living Room | TV (ID110) | Change In Channel | Program Information 1 | ... | Program Information N |
| ... | ... | ... | ... | ... | ... | ... | ... |
| 2017/11/13 | 6:47 | Living Room | Air Conditioner (ID111) | ON | Air Conditioner Information 1 | ... | Air Conditioner Information N |
| 2017/11/13 | 7:00 | Living Room | TV (ID110) | ON | Program Information 1 | ... | Program Information N |
| ... | ... | ... | ... | ... | ... | ... | ... |
| 2017/11/17 | 20:03 | Japanese Style Room | Lighting (ID310) | ON | Lighting Information 1 | ... | Lighting Information N |
| 2017/11/17 | 21:25 | Living Room | Lighting (ID112) | ON | Lighting Information 1 | ... | Lighting Information N |
| 2017/11/17 | 21:58 | Living Room | TV (ID110) | ON | Program Information 1 | ... | Program Information N |
| ... | ... | ... | ... | ... | ... | ... | ... |

FIG. 5

| Date | Time | Room | Sensor ID | Sensor Name | State |
|---|---|---|---|---|---|
| ... | ... | ... | ... | | ... |
| 2017/11/10 | 20:12 | Private Room B | 250 | Human Sensor | ON |
| 2017/11/10 | 20:35 | Private Room B | 251 | Temperature Sensor | 28 °C |
| ... | ... | ... | ... | | ... |
| 2017/11/10 | 20:30 | Private Room B | 251 | Temperature Sensor | 29 °C |
| ... | ... | ... | ... | | ... |
| 2017/11/10 | 21:35 | Living Room | 150 | Human Sensor | ON |
| ... | ... | ... | ... | | ... |
| 2017/11/10 | 23:12 | Living Room | 150 | Human Sensor | OFF |
| ... | ... | ... | ... | ... | ... |

FIG. 6

| Date | Time | Resident ID | Room ID | Room Name |
|---|---|---|---|---|
| 2017/1/20 | 11:55:00 | 1 | 2 | Kitchen |
| 2017/1/20 | 12:15:00 | 2 | 2 | Dining Room |
| 2017/1/20 | 12:20:00 | 1 | 6 | Dining Room |
| 2017/1/20 | 13:10:00 | 1 | 2 | Kitchen |
| 2017/1/20 | 13:15:00 | 2 | 3 | Washroom |
| 2017/1/20 | 13:18:00 | 2 | 5 | Private Room B |
| 2017/1/20 | 13:20:00 | 1 | 3 | Washroom |

FIG. 7

| Date | Time | Resident ID | Behavior |
|---|---|---|---|
| 2017/1/14 | 23:00:00 | 1 | Start Sleeping |
| 2017/1/15 | 6:20:00 | 1 | Get Up |
| 2017/1/15 | 6:20:00 | 1 | Start Washing Face, Brushing Teeth, And The Like |
| 2017/1/15 | 6:25:00 | 1 | End Washing Face, Brushing Teeth, And The Like |
| 2017/1/15 | 6:25:00 | 1 | Start Dressing |
| 2017/1/15 | 6:30 | 1 | End Dressing |
| 2017/1/15 | 6:30:00 | 1 | Start Washing Hands |
| 2017/1/15 | 6:35:00 | 1 | End Washing Hands |
| 2017/1/15 | 6:35:00 | 1 | Start Cooking |
| 2017/1/15 | 7:15:00 | 1 | End Cooking |
| 2017/1/15 | 7:15:00 | 1 | Start Preparing Meal |
| 2017/1/15 | 7:20:00 | 1 | End Preparing Meal |
| 2017/1/15 | 7:20:00 | 1 | Start Preparing Meal |
| 2017/1/15 | 7:25:00 | 1 | End Preparing Meal |
| 2017/1/15 | 7:25 | 1 | Start Eating |
| 2017/1/15 | 7:40 | 1 | End Eating |

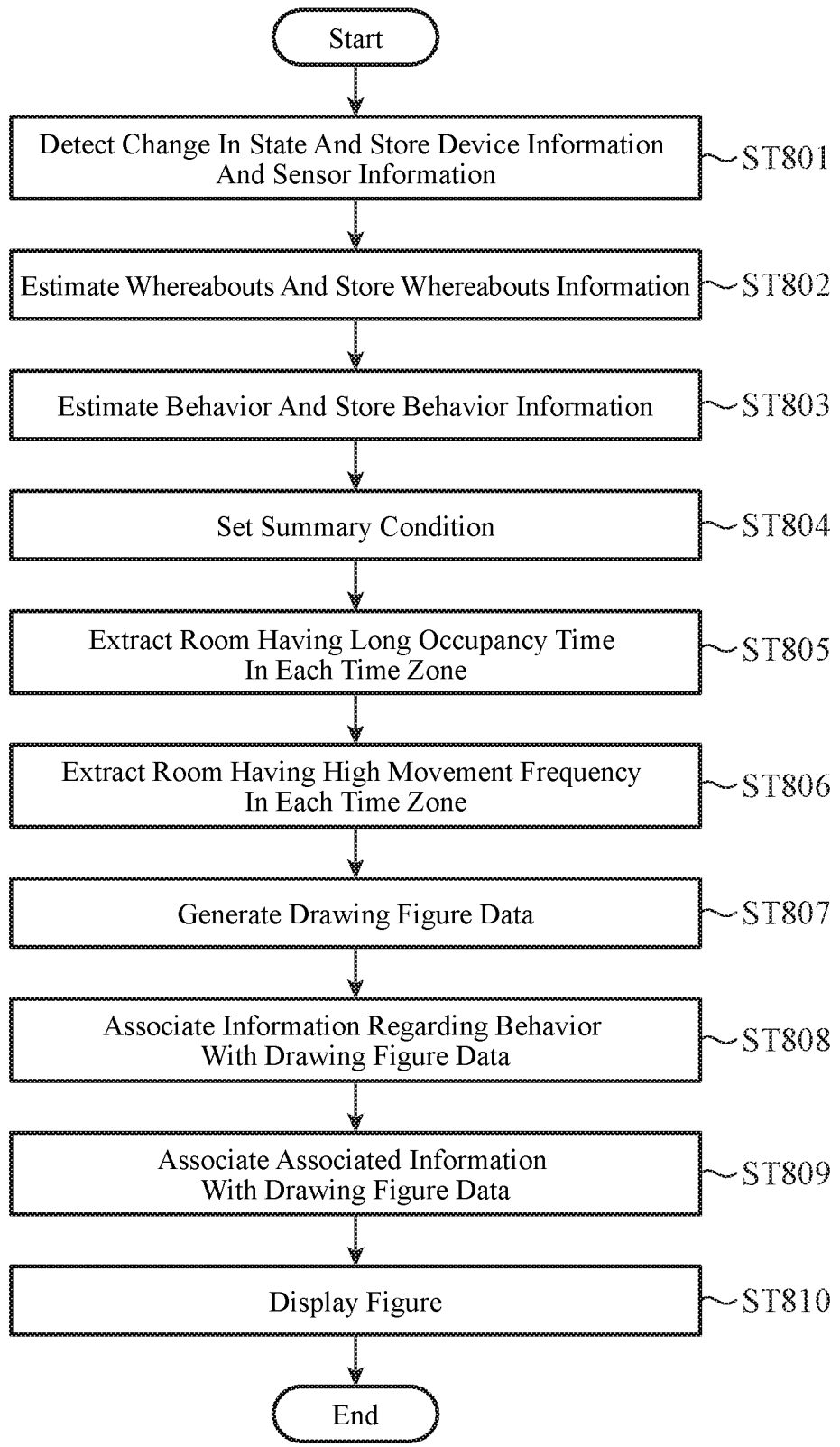

FIG. 11

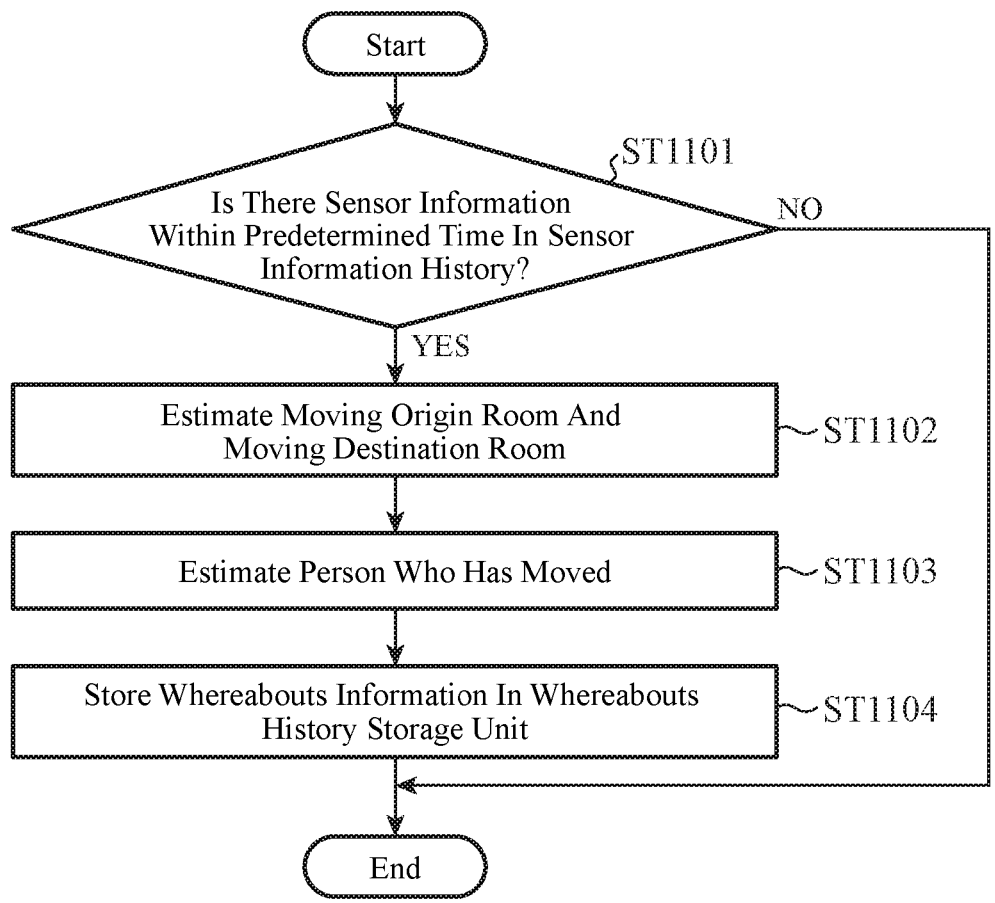

FIG. 12

| Type of Behavior | Condition | Condition Determination Formula |
|---|---|---|
| Start sleeping | 1: Time Is In Sleeping Time Zone<br>2: Current Occupancy Room Is Bedroom<br>3: Lighting In Bedroom Is Off, Or Illuminance Is Within Predetermined Range (For Example, 30 Lux Or Less Or About 0.3 Lux) | 1 AND 2 AND 3 |
| Get up | 1: Time Is In Getting Up Time Zone<br>2: Movement From Bedroom To Another Room Occurs<br>3: Lighting In Bedroom Is Changed From ON To OFF | 1 AND 2 AND 3 |
| Start Watching TV | 1: Person Stays In Room Having TV Therein<br>2: Power Source Of TV Is Turned ON | 1 AND 2 |

FIG. 15

| Date | Time | Resident ID | Room ID | Room Name |
|---|---|---|---|---|
| 2017/1/15 | 6:00:00 | 1 | 4 | Private Room A |
| 2017/1/15 | 6:20:00 | 1 | 3 | Washroom |
| 2017/1/15 | 6:25:00 | 1 | 4 | Private Room A |
| 2017/1/15 | 6:30:00 | 1 | 3 | Washroom |
| 2017/1/15 | 6:35:00 | 1 | 2 | Kitchen |
| 2017/1/15 | 7:05:00 | 2 | 3 | Washroom |
| 2017/1/15 | 7:15:00 | 1 | 6 | Dining Room |
| 2017/1/15 | 7:20:00 | 1 | 2 | Kitchen |
| 2017/1/15 | 7:25:00 | 1 | 6 | Dining Room |
| 2017/1/15 | 7:30:00 | 2 | 2 | Kitchen |
| 2017/1/15 | 7:35:00 | 2 | 6 | Dining Room |
| 2017/1/15 | 7:40:00 | 1 | 2 | Kitchen |
| 2017/1/15 | 7:55:00 | 1 | 3 | Washroom |
| ⋮ | ⋮ | ⋮ | ⋮ | ⋮ |

FIG. 16

| | 6:00 to 10:00 |
|---|---|
| Living Room | 0:54:00 |
| Kitchen | 1:19:00 |
| Washroom | 0:31:00 |
| Private Room A | 0:40:00 |
| Private Room B | 0 |
| Dining Room | 0:21:00 |
| Japanese Style Room | 0:15:00 |

FIG. 17

| Resident ID | Date | Time Zone | Accumulated Value Of Occupancy Time For Each Deeply Associated Room ||||||
| | | | Summary Whereabouts | Associated Room 1 | Occupancy Time | Associated Room 2 | Occupancy Time |
|---|---|---|---|---|---|---|---|
| [1] (Resident A) | January 15, 2017 | 6:00 to 10:00 | Kitchen | Living Room | 1:19:00 | Private Room A | 0:40:00 |
| | | 10:00 to 14:00 | ... | ... | ... | ... | ... |
| | | 14:00 to 18:00 | ... | ... | ... | ... | ... |
| | | 18:00 to 22:00 | ... | ... | ... | ... | ... |
| | January 16, 2017 | 6:00 to 10:00 | ... | ... | ... | ... | ... |
| | | ... | ... | ... | ... | ... | ... |
| [2] (Resident B) | ... | ... | ... | ... | ... | ... | ... |
| ... | ... | ... | ... | ... | ... | ... | ... |

FIG. 19

| Combination Of Rooms | Movement Frequency |
|---|---|
| Kitchen ↔ Washroom | 5 |
| Kitchen ↔ Living Room | 0 |
| Kitchen ↔ Private Room A | 1 |
| Kitchen ↔ Dining Room | 5 |
| Kitchen ↔ Japanese Style Room | 0 |
| Kitchen ↔ Private Room B | 0 |

FIG. 20

| Resident ID | Date | Time Zone | Accumulated Value Of Occupancy Time For Each Deeply Associated Room And Movement Frequency ||||||||||||
|---|---|---|---|---|---|---|---|---|---|---|---|---|---|
| | | | Summary Where-abouts | Occupancy Time | Movement Frequency | Associated Room 1 | Occupancy Time | Movement Frequency | Associated Room 2 | Occupancy Time | Movement Frequency | Associated Room 3 | Occupancy Time | Movement Frequency | Associated Room 4 | Occupancy Time | Movement Frequency |
| [1] (Resident A) | January 15, 2017 | 6:00 to 10:00 | Kitchen | 1:19:00 | — | Living Room | 0:54:00 | 0 | Private Room A | 0:40:00 | 1 | Dining Room | 0:21:00 | 5 | Wash-room | 0:31:00 | 5 |
| | | 10:00 to 14:00 | ... | ... | ... | ... | ... | ... | ... | ... | ... | ... | ... | ... | ... | ... | ... |
| | | 14:00 to 18:00 | — | — | — | — | — | — | — | — | — | — | — | — | — | — | — |
| | | 18:00 to 22:00 | ... | ... | ... | ... | ... | ... | ... | ... | ... | ... | ... | ... | ... | ... | ... |
| | January 16, 2017 | 6:00 to 10:00 | ... | ... | ... | ... | ... | ... | ... | ... | ... | ... | ... | ... | ... | ... | ... |
| | | ... | ... | ... | ... | ... | ... | ... | ... | ... | ... | ... | ... | ... | ... | ... | ... |
| [2] (Resident B) | ... | ... | ... | ... | ... | ... | ... | ... | ... | ... | ... | ... | ... | ... | ... | ... | ... |
| ... | ... | ... | ... | ... | ... | ... | ... | ... | ... | ... | ... | ... | ... | ... | ... | ... | ... |

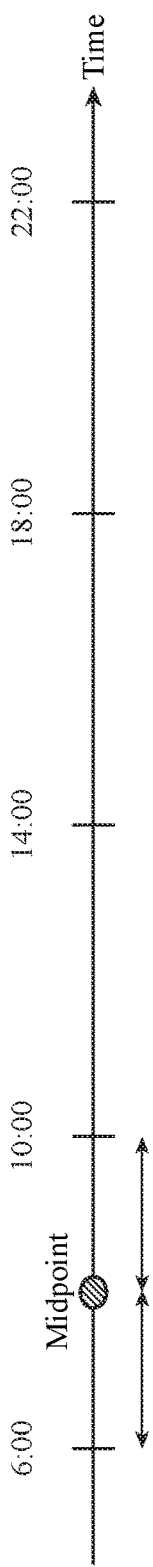
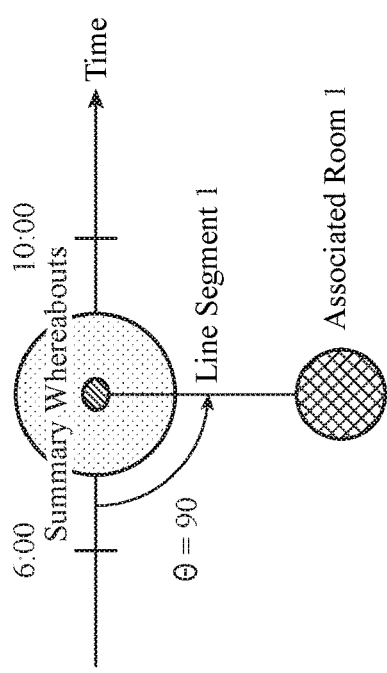
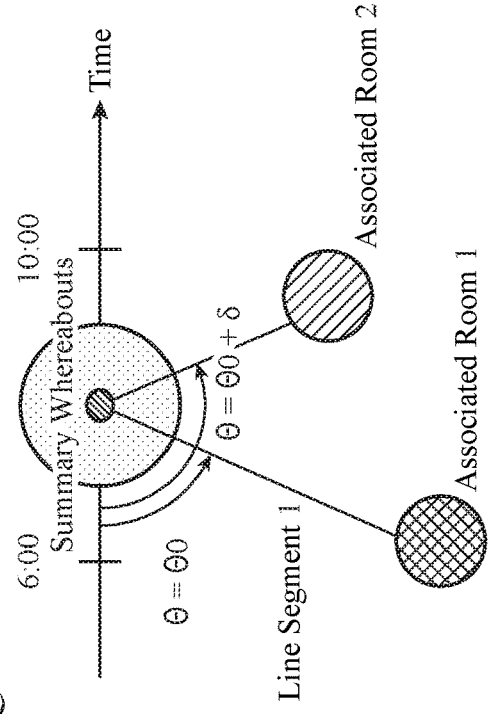
FIG. 22A
FIG. 22B
FIG. 22C

FIG. 25

| Resident ID | Date | Time Zone | Summary Where-abouts | Data Regarding Figure ||||||| Data Regarding Figure |||||
|---|---|---|---|---|---|---|---|---|---|---|---|---|---|---|
| | | | | Room Name | Radius | Center Coordinates | Length And Type Of Line Segment Connected To Another Room | Connected Room | Associated Room 1 | Room Name | Radius | Center Coordinates | Length And Type Of Line Segment Connected To Another Room | Connected Room |
| [1] (Resident A) | January 15, 2017 | 6:00 to 10:00 | Kitchen | Kitchen | 98.75 | ... | ... | ... | Living Room | Living Room | 67.5 | ... | ... | ... |
| | | 10:00 to 14:00 | ... | ... | ... | ... | ... | ... | ... | ... | ... | ... | ... | ... |
| | | 14:00 to 18:00 | ---- | ---- | ---- | ---- | ---- | ---- | ---- | ---- | ---- | ---- | ---- | ---- |
| | | 18:00 to 22:00 | | | | | | | | | | | | |
| [2] (Resident B) | ... | ... | ... | ... | ... | ... | ... | ... | ... | ... | ... | ... | ... | ... |
| ... | ... | | ... | ... | ... | ... | ... | ... | ... | ... | ... | ... | ... | ... |

FIG. 27

| Summary Whereabouts/ Associated Room | Behavior |
|---|---|
| Kitchen | Cooking |
| Living Room | Sitting Together In Circle And Chatting Happily Watching TV |
| Private Room A | Dressing |
| Washroom | Washing Face/Brushing Teeth |
| Dining Room | Eating Preparing Meal |

FIG. 28

| Resident ID | Date | Time Zone | Summary Whereabouts | Attribute Information (Behavior Information) | Data Regarding Figure | | | | | Associated Room 1 | Attribute Information (Information Regarding Behavior) | Data Regarding Figure | | | | |
|---|---|---|---|---|---|---|---|---|---|---|---|---|---|---|---|---|
| | | | | | Room Name | Radius | Center Coordinates | Length And Type Of Line Segment Connected To Another Room | Connected Room | | | Room Name | Radius | Center Coordinates | Length And Type Of Line Segment Connected To Another Room | Connected Room |
| [1] (Resident A) | January 15, 2017 | 6:00 to 10:00 | Kitchen | Cooking | Kitchen | 98.75 | ... | ... | ... | Living Room | (*) | Living Room | 67.5 | ... | ... | ... |
| | | 10:00 to 14:00 | ... | ... | ... | ... | ... | ... | ... | ... | ... | ... | ... | ... | ... | ... |
| | | 14:00 to 18:00 | — | — | — | — | — | — | — | — | — | — | — | — | — | — |
| | | 18:00 to 22:00 | ... | ... | ... | ... | ... | ... | ... | ... | ... | ... | ... | ... | ... | ... |
| [2] (Resident B) | ... | ... | ... | ... | ... | ... | ... | ... | ... | ... | ... | ... | ... | ... | ... | ... |
| ... | ... | ... | ... | ... | ... | ... | ... | ... | ... | ... | ... | ... | ... | ... | ... | ... |

(*) Sitting Together In Circle And Chatting Happily Watching TV

FIG. 30

| Resident ID | Date | Time Zone | Summary Where-abouts | Attribute Information (Behavior Information) | Data Regarding Figure ||||| Associated Room 1 | Attribute Information (Associated Information) | Data Regarding Figure |||||
|---|---|---|---|---|---|---|---|---|---|---|---|---|---|---|---|---|
| | | | | | Room Name | Radius | Center Coordinates | Length And Type Of Line Segment Connected To Another Room | Connected Room | | | Room Name | Radius | Center Coordinates | Length And Type Of Line Segment Connected To Another Room | Connected Room |
| [1] (Resident A) | January 15, 2017 | 6:00 to 10:00 | Kitchen | Cooking | Kitchen | 98.75 | ... | ... | ... | Living Room | (*) | Living Room | 67.5 | ... | ... | ... |
| | | 10:00 to 14:00 | ... | ... | ... | ... | ... | ... | ... | ... | ... | ... | ... | ... | ... | ... |
| | | 14:00 to 18:00 | | | | | | | | | | | | | | |
| | | 18:00 to 22:00 | ... | ... | ... | ... | ... | ... | ... | ... | ... | ... | ... | ... | ... | ... |
| | ... | ... | ... | ... | ... | ... | ... | ... | ... | ... | ... | ... | ... | ... | ... | ... |
| [2] (Resident B) | ... | ... | ... | ... | ... | ... | ... | ... | ... | ... | ... | ... | ... | ... | ... | ... |
| ... | | | | | | | | | | | | | | | | |

(**) Attribute Information (Information Regarding Behavior)

(*) Sitting Together In Circle And Chatting Happily Watching TV

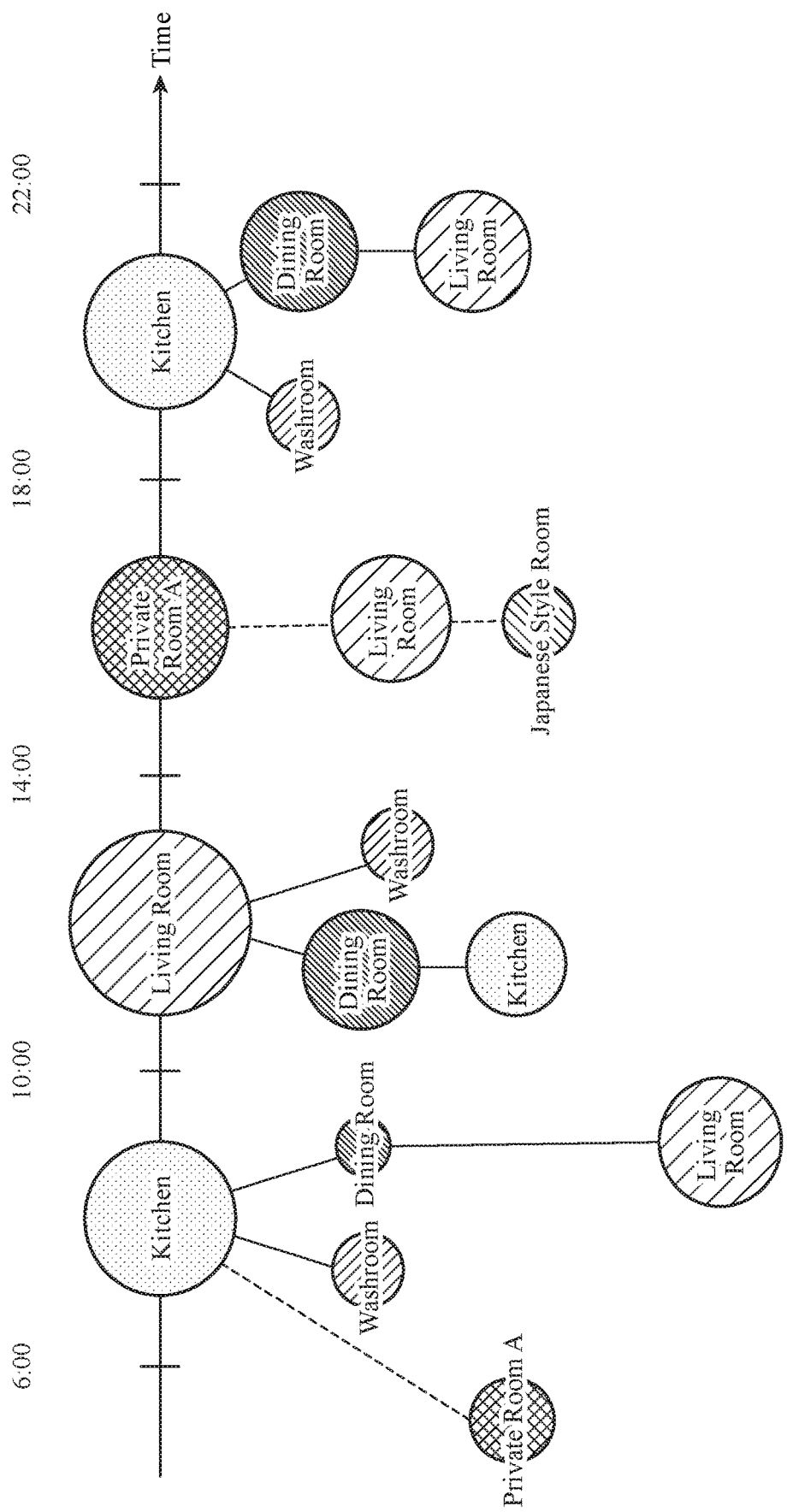

Resident A: 6:00 to 22:00 On January 15, 2017

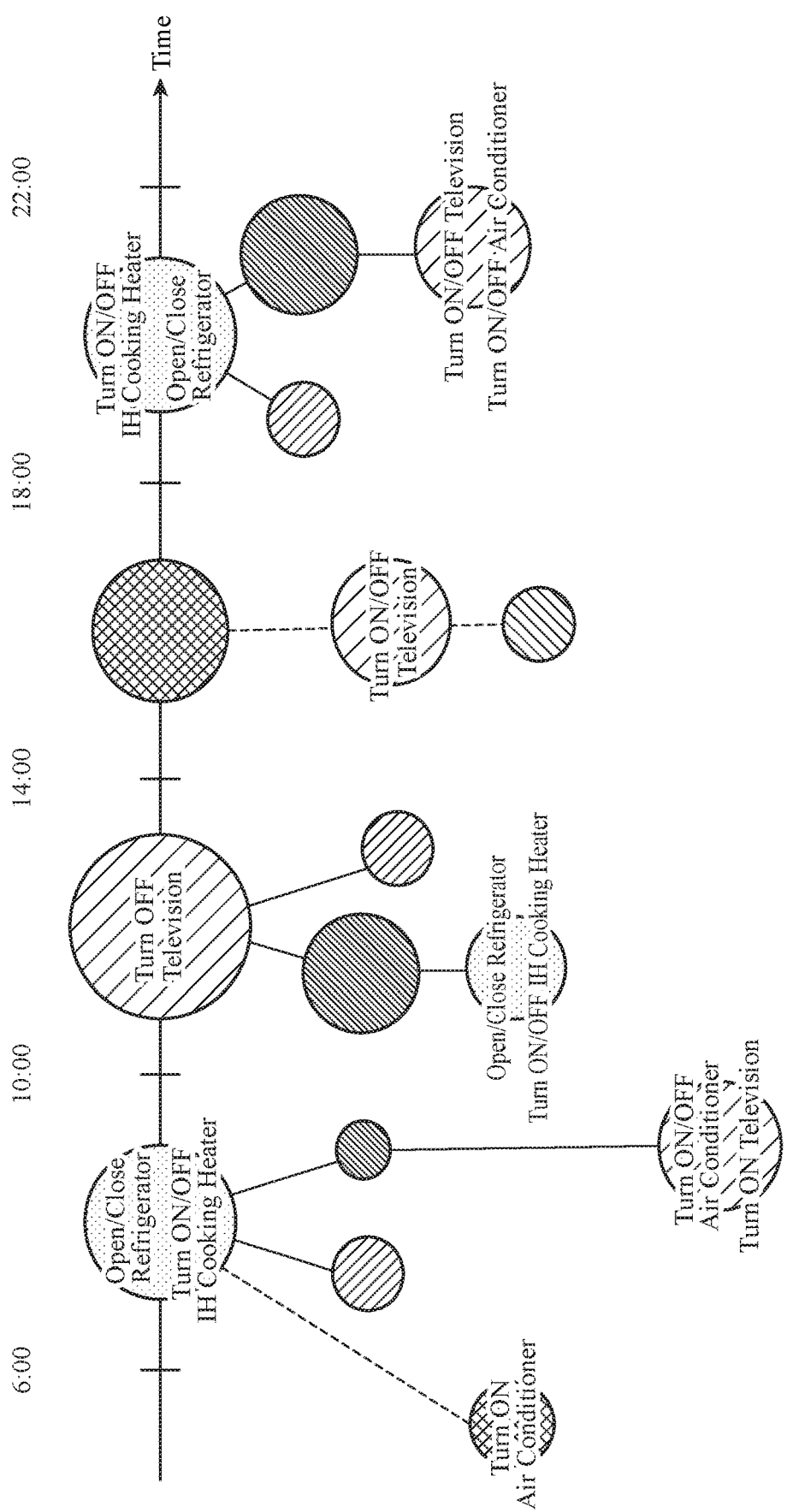

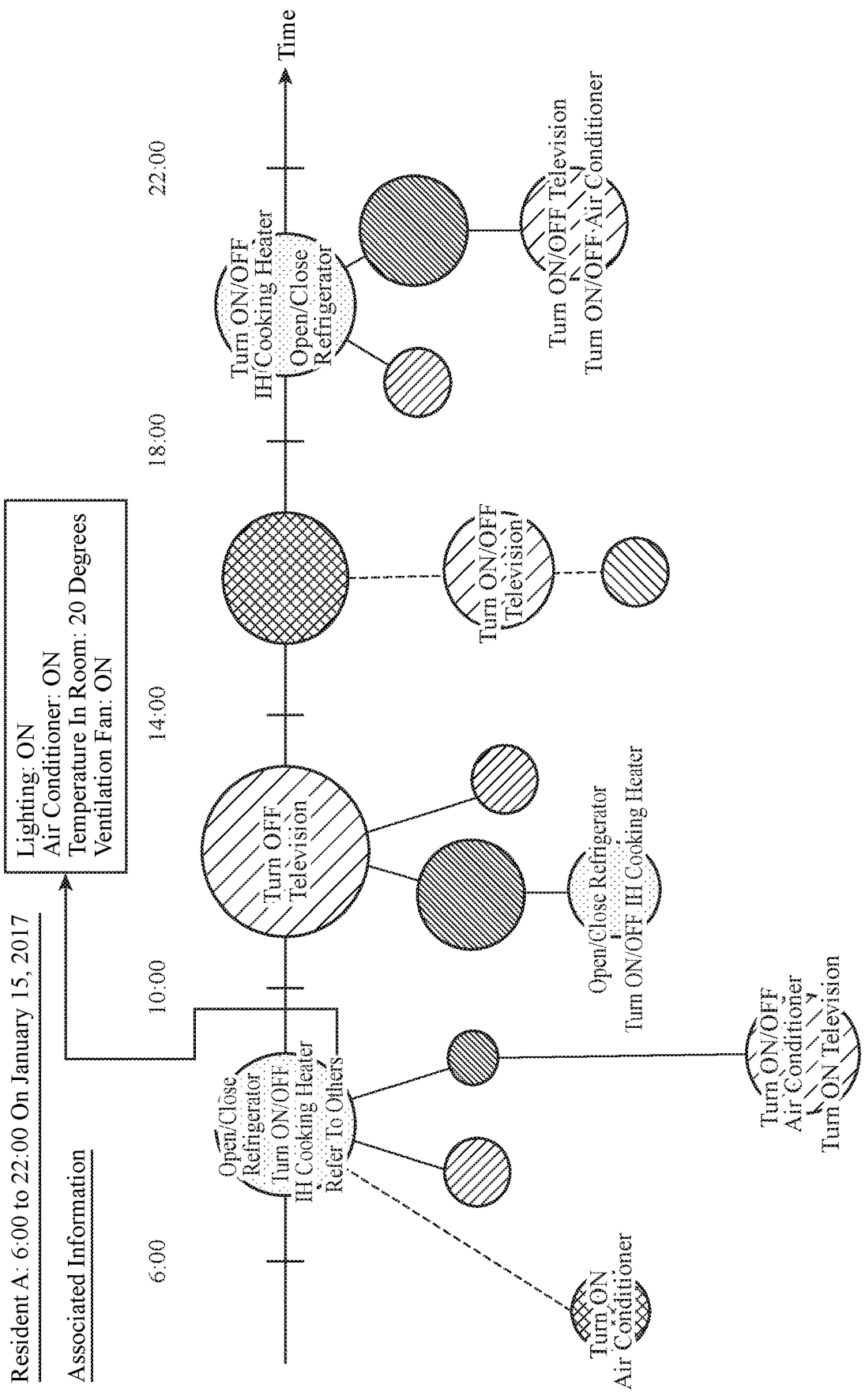

Resident A: 6:00 to 22:00 On January 15, 2017

Resident A: 6:00 to 22:00 On January 15, 2017

6:00 to 22:00 On January 15, 2017

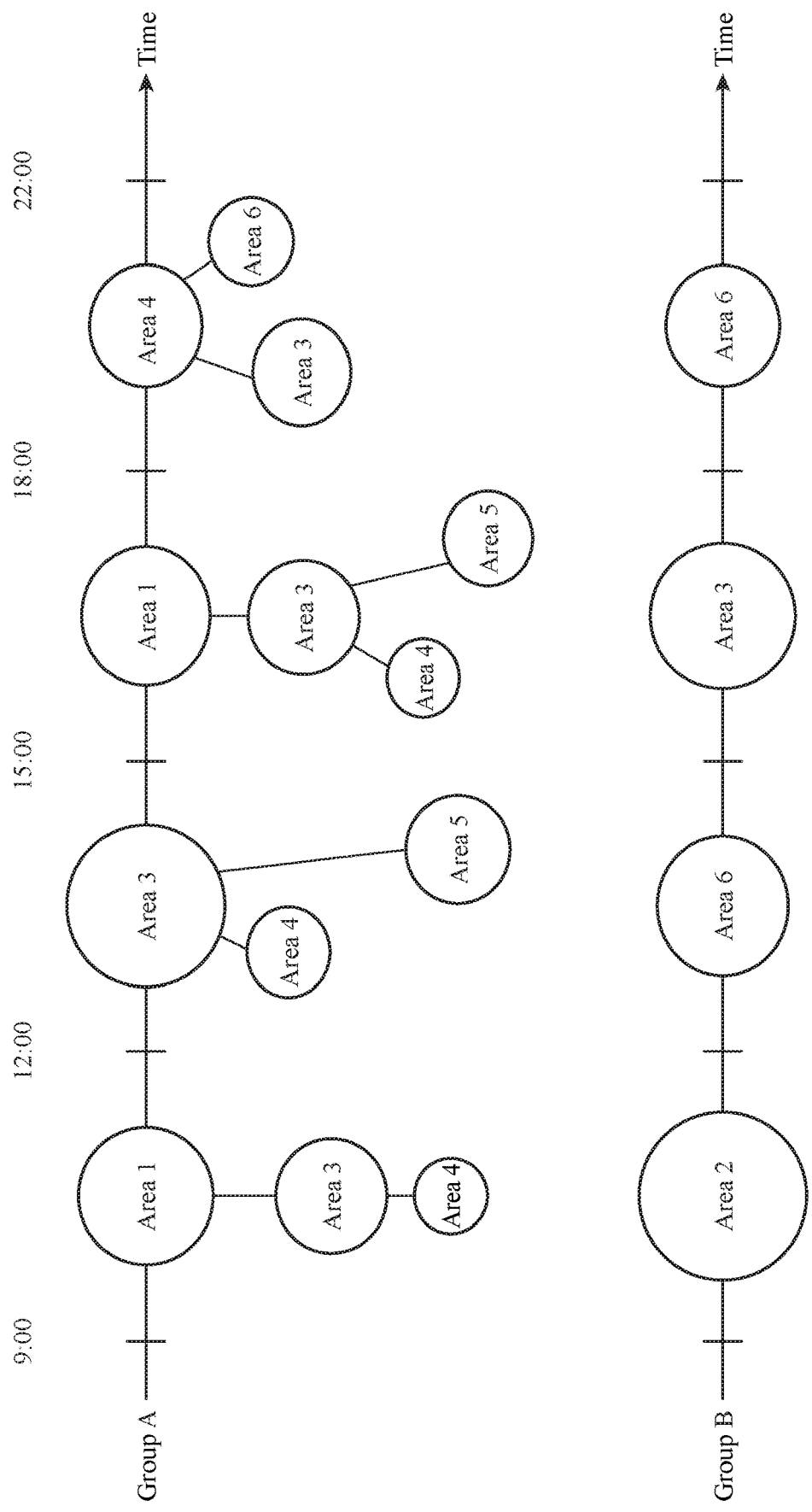

| Store ID | Sensor Type ID | Sensor Name | Sensor ID |
|---|---|---|---|
| 1 | 100 | Human Sensor | 110 |
| 2 | 200 | Human Sensor | 120 |

...

1F
   Store 1
   Store 2
   Store 3
   ...
   Store 12

2F
   Store 13
   Store 14
   Store 15
   ...
   Store 30

...

4F
   Store 60
   ...

...

9F
  Special Venue
   Store 135
   Store 136

| Store ID | Sensor Type ID | Sensor Name | Sensor ID |
|---|---|---|---|
| 1 | 10 | Human Sensor | 110 |
| 2 | 10 | Human Sensor | 120 |
| 1000 | 10 | Human Sensor | 500 |
| ... | | | |

| Date | Time | Area | Sensor ID | State |
|---|---|---|---|---|
| 2017/10/1 | 10:02:00 | Store 2 | 120 | ON |
| 2017/10/1 | 10:02:00 | Store 2 | 120 | ON |
| 2017/10/1 | 10:02:50 | Store 5 | 130 | ON |
| 2017/10/1 | 10:03:02 | Store 5 | 130 | ON |
| 2017/10/1 | 10:03:17 | Store 2 | 120 | ON |
| 2017/10/1 | 10:03:25 | Store 5 | 130 | ON |
| 2017/10/1 | 10:03:45 | Store 2 | 120 | ON |

October 1, 2017 to October 31, 2017: Important Area Display

October 1, 2017 to October 31, 2017: Associated Information Display

October 1, 2017 to October 31, 2017: Important Area Display

BEHAVIOR VISUALIZATION DEVICE AND BEHAVIOR VISUALIZATION METHOD

TECHNICAL FIELD

The present invention relates to a behavior visualization device and a behavior visualization method for visualizing and providing information regarding behavior of a target of interest.

BACKGROUND ART

Conventionally, for example, a technique for estimating whereabouts of a person and visualizing the estimated whereabouts of the person is known.

For example, Non-Patent Literature 1 discloses a technique for displaying whereabouts of a person by a horizontal bar graph with a horizontal axis as a time axis.

CITATION LIST

Non-Patent Literatures

Non-Patent Literature 1: Mori, Fujii, Shimosaka, Noguchi, and Sato: Behavior description and anomaly detection algorithm based on accumulating sensor data in room environment, Proceedings of the 2007 JSME Conference on Robotics and Mechatronics, Akita, Japan, May 10-12, 2007 1A1-L06.

SUMMARY OF INVENTION

Technical Problem

In such a technique as disclosed in Non-Patent Literature 1, for example, in a case where a person stays in the same room for a long time, the width of a bar graph in a corresponding portion is large, and visibility of the bar graph is high. However, in a case where a person stays in the same room only for a short time, the width of the bar graph is very narrow, and therefore visibility of the bar graph is deteriorated disadvantageously.

The present invention has been achieved in order to solve the above-described problem, and an object of the present invention is to provide a behavior visualization device and a behavior visualization method for visualizing information indicating behavior of a target of interest so as to facilitate visual recognition thereof.

Solution to Problem

A behavior visualization device according to the present invention includes: a summary condition setting unit for setting a summary condition for extracting whereabouts deeply associated with a target of interest; an important whereabouts extracting unit for extracting whereabouts deeply associated with the target of interest in each of a plurality of time zones on the basis of whereabouts information indicating whereabouts of the target of interest and a summary condition set by the summary condition setting unit; a figure generating unit for calculating the areas of figure regions of figures representing whereabouts deeply associated with the target of interest, extracted by the important whereabouts extracting unit, and a distance between the figure regions, and generating drawing figure data for displaying a figure representing whereabouts deeply associated with the target of interest in a hierarchical structure; and a drawing unit for displaying the drawing figure data generated by the figure generating unit on a display device, wherein the important whereabouts extracting unit includes: an occupancy time analyzing unit for calculating an accumulated value of time during which the target of interest exists in each whereabouts for each of the time zones on a basis of the whereabouts information and the summary condition, extracting whereabouts having the largest accumulated value in each of the time zones as summary whereabouts, and extracting whereabouts having the second largest accumulated value after the summary whereabouts as associated whereabouts; and a movement frequency analyzing unit for calculating a movement frequency between the summary whereabouts and other whereabouts by the target of interest for each of the time zones and extracting whereabouts having a high movement frequency with respect to the summary whereabouts as the associated whereabouts on a basis of the summary condition, and the figure generating unit generates drawing figure data for displaying a figure representing the summary whereabouts for each of the time zones on a time axis as a parent node on a basis of information regarding an accumulated value of time during which the target of interest exists in each whereabouts for each of the time zones and information regarding a movement frequency between the summary whereabouts and other whereabouts by the target of interest, and displaying a figure representing the associated whereabouts below the figure representing the summary whereabouts in a hierarchical structure.

Advantageous Effects of Invention

According to the present invention, by analyzing whereabouts deeply associated with a target of interest, and visualizing information regarding the whereabouts deeply associated with the target using a hierarchical structure, information indicating behavior of the target of interest can be visualized so as to facilitate visual recognition thereof.

BRIEF DESCRIPTION OF DRAWINGS

FIG. 4 is a diagram for explaining an example of contents of device information stored in a device information history storage unit of a storage unit in the first embodiment.

FIG. 5 is a diagram for explaining an example of contents of sensor information stored in a sensor information history storage unit of a storage unit in the first embodiment.

FIG. 6 is a diagram for explaining an example of contents of whereabouts information stored in a whereabouts history storage unit of a storage unit in the first embodiment.

FIG. 7 is a diagram for explaining an example of contents of behavior information stored in a behavior history storage unit of a storage unit in the first embodiment.

FIG. 8 is a flowchart for explaining an operation of a behavior visualization device in the first embodiment.

FIG. 11 is a flowchart for explaining details of an operation of storing whereabouts information in step ST802 of FIG. 8 by a whereabouts estimating unit in the first embodiment.

FIG. 12 is a diagram for explaining an example of contents of a behavior definition file stored in a storage unit in the first embodiment.

FIG. 15 is a diagram illustrating an example of whereabouts information in a whereabouts history storage unit in the first embodiment.

FIG. 16 is a diagram for explaining an example of a result of calculation of an accumulated value of occupancy time of resident A in each room in each time zone by an occupancy time analyzing unit in the first embodiment.

FIG. 17 is a diagram illustrating an example of post-occupancy-time-analysis information output from an occupancy time analyzing unit to a movement frequency analyzing unit in the first embodiment.

FIG. 19 is a diagram for explaining an example of a result of calculation of the number of times a resident has moved from summary whereabouts to another room or the number of times a resident has moved from the other room to the summary whereabouts by a movement frequency analyzing unit in the first embodiment.

FIG. 20 is a diagram illustrating an example of important room information output from a movement frequency analyzing unit to a figure generating unit in the first embodiment.

FIGS. 22A to 22C are diagrams for explaining an example of a specific operation of calculating center coordinates of a circle representing summary whereabouts and a circle representing an associated room to be drawn by a figure generating unit in the first embodiment.

FIG. 25 is a diagram illustrating an example of contents of drawing figure data generated by a figure generating unit in the first embodiment.

FIG. 27 is a diagram for explaining an example of behavior of resident A in "kitchen", "living room", "private room A", "washroom", and "dining room", extracted by a behavior information imparting unit in the first embodiment.

FIG. 28 is a diagram illustrating an example of contents of drawing figure data associated with information regarding behavior as attribute information by a behavior information imparting unit in the first embodiment.

FIG. 30 is a diagram illustrating an example of contents of drawing figure data associated with associated information as attribute information by an associated information imparting unit 108 in the first embodiment.

FIG. 31 is a diagram illustrating an example of a screen displayed on a display device by a drawing unit in the first embodiment.

FIG. 33A is a diagram illustrating another example of the screen displayed on the display device by the drawing unit in the first embodiment.

FIG. 33B is a diagram illustrating another example of the screen displayed on the display device by the drawing unit in the first embodiment.

FIG. 40 is a screen example of a screen in which a behavior visualization device displays a result of analyzing deeply associated whereabouts, behavior, or associated information for every group including a plurality of people on a display device in the first embodiment.

DESCRIPTION OF EMBODIMENTS

DESCRIPTION OF EMBODIMENTS

Hereinafter, embodiments of the present invention will be described in detail with reference to the drawings.

In the following description, the phrase that a behavior visualization device "summarizes behavior of a person" means that the behavior visualization device extracts features such as whereabouts where a person who is a target of interest has mainly spent, whereabouts deeply associated with the whereabouts, and behavior that has been mainly performed by the person for each time zone in a target period of interest. Note that in the following description, the term "behavior" is not limited only to specific behavior such as cooking or sleeping, but is used as a broad sense term including general actions of a person.

First Embodiment

A behavior visualization device according to a first embodiment summarizes behavior of a person of interest, analyzes whereabouts deeply associated with the person, main behavior performed in the whereabouts, association between the whereabouts deeply associated with the person and the behavior, and the like, and visualizes these using a hierarchical structure.

In the following description, as an example, a person of interest is a specific "person", and whereabouts is a room in a house. Behavior of a person is behavior of the "person" in a room in a house. Note that "person" of interest may be one person or a plurality of people. In the following description, "person" is also referred to as "resident".

Figure 1:
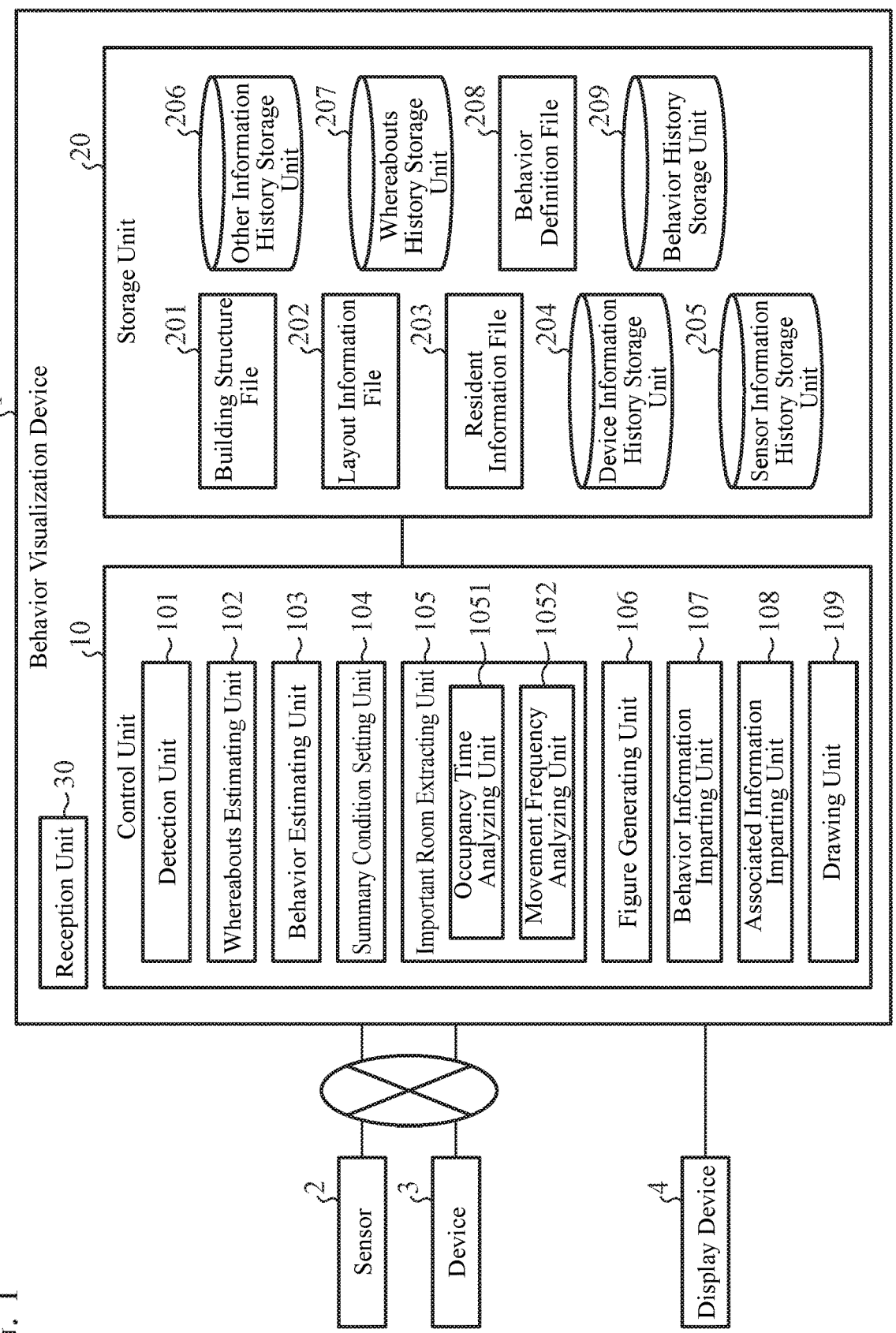
FIG. 1 is a block diagram illustrating a configuration example of a behavior visualization device according to a first embodiment.

FIG. 1 is a block diagram illustrating a configuration example of a behavior visualization device 1 according to the first embodiment.

The behavior visualization device 1 is connected to one or more sensors 2 via a network, and acquires information collected by the sensors 2. The sensor 2 is installed in a room in a house to be whereabouts of a resident. Alternatively, the sensor 2 is brought into a room in a house to be whereabouts in the house (hereinafter, the phrase that the sensor 2 is "installed in a room" also includes a case where the sensor 2 is temporarily brought into a room). The sensor 2 is, for example, any one of various sensors such as an infrared human sensor, a door opening/closing sensor, an illuminance sensor, a temperature sensor, and an acceleration sensor of a wearable terminal.

The behavior visualization device 1 is connected to one or more devices 3 via a network, and acquires information regarding the devices 3 from the devices 3. The device 3 is, for example, one of various devices such as home appliances and lighting installed in a room.

The behavior visualization device 1 summarizes behavior of a resident on the basis of information acquired from the sensor 2 or information acquired from the device 3, visualizes whereabouts deeply associated with the resident, main behavior performed in the whereabouts, or association between the whereabouts deeply associated with the resident and the behavior using a hierarchical structure, and displays these on a display device 4.

The display device 4 is, for example, a display. Note that in FIG. 1, the display device 4 is disposed outside the behavior visualization device 1. However, limitation thereto is not intended, and the display device 4 may be disposed in the behavior visualization device 1.

As illustrated in FIG. 1, the behavior visualization device 1 includes a control unit 10, a storage unit 20, and a reception unit 30.

The control unit 10 controls an operation of summarizing behavior of a resident and displaying the behavior on the display device 4.

The control unit 10 includes a detection unit 101, a whereabouts estimating unit 102, a behavior estimating unit 103, a summary condition setting unit 104, an important room extracting unit 105, a figure generating unit 106, a behavior information imparting unit 107, an associated information imparting unit 108, and a drawing unit 109.

The important room extracting unit 105 includes an occupancy time analyzing unit 1051 and a movement frequency analyzing unit 1052.

The detection unit 101 receives information from the device 3 in a room or the sensor 2 in the room. The detection unit 101 detects a change in the state of the device 3 on the basis of the information received from the device 3, generates device information associating detection information with date and time information, and stores the device information in a device information history storage unit 204 (described later) of the storage unit 20.

The detection unit 101 detects a change in the state of the sensor 2 on the basis of the information received from the sensor 2, generates sensor information associating detection information with date and time information, and stores the sensor information in a sensor information history storage unit 205 (described later) of the storage unit 20.

The detection unit 101 outputs both the device information and the sensor information to the whereabouts estimating unit 102 and the behavior estimating unit 103.

The whereabouts estimating unit 102 estimates whereabouts of a resident on the basis of the device information and the sensor information acquired from the detection unit 101, generates whereabouts information associating the estimated whereabouts of the resident with the date and time information, and stores the whereabouts information in a whereabouts history storage unit 207 (described later). The whereabouts estimating unit 102 outputs the whereabouts information to the behavior estimating unit 103.

The behavior estimating unit 103 estimates behavior of a resident on the basis of the device information and the sensor information acquired from the detection unit 101, the whereabouts information acquired from the whereabouts estimating unit 102, and the contents of a behavior definition file 208 defined in advance and stored in the storage unit 20, and stores the estimated behavior in a behavior history storage unit 209 (described later) as behavior information indicating behavior of each resident. The behavior definition file 208 stores information defining the type of behavior to be estimated, one or more detection conditions for determining that the behavior has been performed, and an estimation method using the detection conditions. Details of the behavior definition file 208 will be described later.

The summary condition setting unit 104 sets a summary condition on the basis of summary condition setting instruction information output from the reception unit 30 (described later) or preset summary condition setting instruction information.

The summary condition is, for example, a condition for extracting whereabouts deeply associated with a resident, main behavior performed in the whereabouts, or associated information on the basis of whereabouts information in a target period, behavior information in the target period, and device information or sensor information in the target period.

The summary condition setting unit 104 outputs the set summary condition information to the important room extracting unit 105.

The important room extracting unit 105 refers to the whereabouts information stored in the whereabouts history storage unit 207 of the storage unit 20, and extracts a room deeply associated with a resident in each time zone set by dividing the target period by each unit time on the basis of the summary condition set by the summary condition setting unit 104.

Note that details will be described later, but in the first embodiment, as an example, the unit time for dividing the target period based on the summary condition is set to several hours. The important room extracting unit 105 extracts one or more rooms in a house as whereabouts deeply associated with a resident in each time zone in the target period. In the following description, the unit time for dividing the target period is assumed to be several hours.

The occupancy time analyzing unit 1051 of the important room extracting unit 105 refers to the whereabouts information stored in the whereabouts history storage unit 207 of the storage unit 20, and extracts a room having the highest degree of occupancy time during which a resident stayed in a room in each time zone as summary whereabouts on the basis of the summary condition set by the summary condition setting unit 104. The room having the highest degree of occupancy time is a room having the longest resident occupancy time.

Specifically, the occupancy time analyzing unit 1051 calculates an accumulated value of the occupancy time during which a resident stayed in each room for each time zone based on the summary condition set by the summary condition setting unit 104. Then, the occupancy time analyzing unit 1051 extracts a room having the calculated maximum accumulated value of occupancy time as summary whereabouts for each time zone.

The occupancy time analyzing unit 1051 refers to the whereabouts information stored in the whereabouts history storage unit 207, searches for a room having the second highest degree of occupancy time after the summary whereabouts from the top according to a rank designated in a summary condition on the basis of the summary condition, and extracts the room as an associated room.

The occupancy time analyzing unit 1051 outputs, for each time zone, information regarding summary whereabouts and information regarding an associated room in association with information specifying a resident and information indicating each time zone to the movement frequency analyzing unit 1052 of the important room extracting unit 105.

The information specifying a resident is, for example, a resident ID assigned to each resident.

The movement frequency analyzing unit 1052 receives the information regarding summary whereabouts and the information regarding an associated room for each resident and for each time zone output from the occupancy time analyzing unit 1051, and calculates a movement frequency between the summary whereabouts and a room for each time zone for each resident. The movement frequency analyzing unit 1052 extracts a room having a high movement frequency as an associated room on the basis of the calculation result of the movement frequency and the movement frequency extraction level defined in the summary condition.

The movement frequency analyzing unit 1052 outputs the information regarding the associated room extracted for each time zone and the information regarding summary whereabouts and an associated room extracted by the occupancy time analyzing unit 1051 in association with the information specifying a resident to the figure generating unit 106.

On the basis of the information regarding summary whereabouts and the information regarding an associated room output from the movement frequency analyzing unit 1052 of the important room extracting unit 105, the figure generating unit 106 calculates the areas of figure regions of a figure representing the summary whereabouts and a figure representing the associated room, and a distance between the figure regions, and generates drawing figure data for displaying the figure representing the summary whereabouts and the figure representing the associated room in a hierarchical structure.

The figure generating unit 106 outputs the generated drawing figure data to the behavior information imparting unit 107.

On the basis of the behavior information stored in the behavior history storage unit 209 and the summary condition set by the summary condition setting unit 104, the behavior information imparting unit 107 extracts main behavior of a resident in the summary whereabouts and the associated room for each time zone, and associates information regarding the extracted main behavior with the drawing figure data. The behavior information imparting unit 107 outputs the drawing figure data associated with the information regarding the main behavior to the associated information imparting unit 108.

The associated information imparting unit 108 extracts associated information deeply associated with a resident in summary whereabouts and an associated room for each time zone on the basis of the device information stored in the device information history storage unit 204, the sensor information stored in the sensor information history storage unit 205, and the other information stored in an other information history storage unit 206 (described later). The associated information imparting unit 108 further associates the extracted associated information with the drawing figure data output from the behavior information imparting unit 107.

The associated information imparting unit 108 outputs the drawing figure data associating the information regarding main behavior with the associated information to the drawing unit 109.

The drawing unit 109 displays information based on the drawing figure data output from the associated information imparting unit 108 on the display device 4.

Specifically, the drawing unit 109 displays figures representing summary whereabouts and an associated room for each time zone on a time axis on the display device 4 on the basis of the drawing figure data, and displays whereabouts deeply associated with a resident, main behavior of the resident performed in the whereabouts, and associated information deeply associated with the resident in the whereabouts as a lower layer of the summary whereabouts. As a result, the drawing unit 109 visualizes information regarding a relationship between whereabouts deeply associated with a resident and whereabouts deeply associated with the resident, a relationship between each whereabouts and main behavior, and a relationship between the main behavior and associated information or the like.

At this time, the drawing unit 109 displays information regarding summary whereabouts and information regarding an associated room on the display device 4 in a hierarchical structure.

The storage unit 20 stores various types of information.

The storage unit 20 includes a building structure file 201, a layout information file 202, a resident information file 203, the device information history storage unit 204, the sensor information history storage unit 205, the other information history storage unit 206, the whereabouts history storage unit 207, the behavior definition file 208, and the behavior history storage unit 209.

The building structure file 201 includes information defining a region to be whereabouts of a resident, such as a room, a floor, or an area. In the first embodiment, whereabouts of a resident is set to a room in a house, and therefore the building structure file 201 includes information defining at least all the rooms in the house. The building structure file 201 may include information defining all the rooms, corridors, and regions such as stairs constituting a house. For example, in a case where whereabouts of a resident is set to all the regions that can be whereabouts of the resident in a house, the building structure file 201 includes information defining all the rooms, corridors, and regions such as stairs constituting the house.

Figures 2A, 2B, 3:
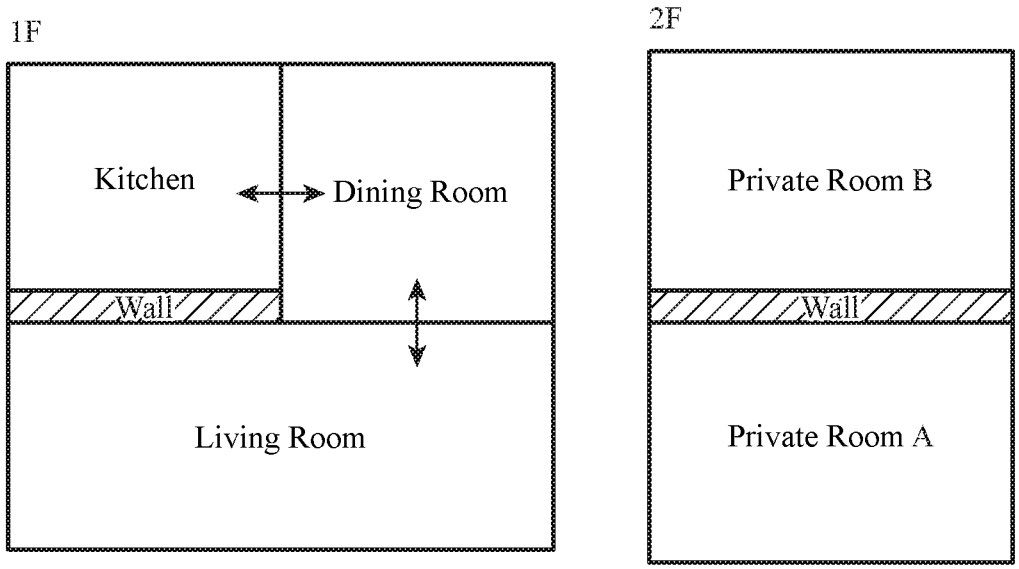
FIGS. 2A and 2B are diagrams for explaining an example of contents of a building structure file stored in a storage unit in the first embodiment.
FIG. 3 is a diagram for explaining an example of contents of a layout information file stored in a storage unit in the first embodiment.

Here, FIG. 2 is a diagram for explaining an example of contents of the building structure file 201 stored in the storage unit 20 in the first embodiment. FIG. 2A is an example of the building structure file 201 illustrating room definitions as a part of a floor plan. FIG. 2B is an example of the building structure file 201 illustrating room definitions as numerical values.

The building structure file 201 defines a room ID (not illustrated in FIG. 2), a room name, and a connection relationship indicating whether a resident can directly move between rooms. Note that to each room, a room ID that can specify the room is assigned in advance.

The building structure file 201 defines that a resident cannot directly move between rooms, for example, even if the rooms are adjacent to each other, but in a case where the resident cannot directly move between the rooms because of a wall or the like between the rooms.

The building structure file 201 illustrated in FIG. 2A indicates a connection relationship indicating whether a resident can directly move between rooms by indicating a wall and an arrow. For example, a resident cannot directly move between a kitchen and a living room on the first floor because a wall is illustrated therebetween, and a resident can directly move between the kitchen and a dining room on the first floor because an arrow is illustrated therebetween.

In the building structure file 201 illustrated in FIG. 2B, rooms between which a resident can directly move are indicated as "1", rooms between which a resident can move through a region other than the rooms, such as corridors or stairs, are indicated as "2", and rooms between which a resident cannot move without passing through another room or the like because of a wall or the like therebetween are indicated as "0". For example, a resident can directly move between the kitchen and the dining room, but the resident cannot move between the kitchen and the living room because of a wall therebetween, and therefore a connection relationship thereof is indicated as "0". A connection relationship between the kitchen and the dining room is "1", and a connection relationship between the living room and the dining room is "1". Therefore, a resident cannot directly move between the kitchen and the living room (connection relationship "0"), but the resident can indirectly move therebetween through the dining room.

The layout information file 202 includes information defining a room in a house in which the sensor 2 such as a human sensor or the device 3 such as a television (TV) is installed.

The layout information file 202 defines information regarding each sensor 2 or information regarding each device 3 in association with information regarding a room in which each sensor 2 or each device 3 is installed.

Here, FIG. 3 is a diagram for explaining an example of contents of the layout information file 202 stored in the storage unit 20 in the first embodiment.

As illustrated in FIG. 3, the layout information file 202 defines information regarding a room ID, a room name, a device/sensor type ID, a device/sensor name, a device/sensor ID, and attribute in association with each other. Note that IDs that can specify each sensor 2 and each device 3 are assigned in advance to each sensor 2 and each device 3, respectively.

Note that the contents illustrated in FIG. 3 are merely examples. For example, the layout information file 202 may define information other than the contents illustrated in FIG. 3. The layout information file 202 only needs to indicate association of each sensor 2 and each device 3 with a room in which each sensor 2 and each device 3 are installed.

The resident information file 203 defines the number of residents of a house, and defines, for each resident, an ID for identifying the resident and various types of resident information regarding the resident in association with each other. Examples of the various types of resident information regarding a resident include information regarding a bedroom of each resident or a mobile terminal owned by each resident, such as a smartphone. IDs that can specify the resident information are assigned in advance to the various types of resident information regarding the resident. For example, in a case where the various types of resident information include information regarding a bedroom of each resident, a unique bedroom ID is assigned to each bedroom. The resident information file 203 defines the resident ID and the bedroom ID in association with each other.

The device information history storage unit 204 stores device information output from the detection unit 101.

Here, FIG. 4 is a diagram for explaining an example of contents of device information stored in the device information history storage unit 204 of the storage unit 20 in the first embodiment.

The device information illustrated in FIG. 4 includes a room in which each device 3 is installed, a device ID for identifying each device 3, contents of an operation for each device 3, attribute information of each device 3, and information regarding the date and time when a change in the state of each device 3 was detected.

Examples of the contents of an operation for the device 3 included in the device information include turning ON/OFF power, raising/lowering temperature, changing an air volume, and changing a wind direction.

In a case where the device 3 is an air conditioner, examples of the attribute information of the device 3 included in the device information include information regarding set temperature of the air conditioner, information regarding a change in operation mode such as ventilation, heating, or cooling, information regarding an air volume, and information regarding a wind direction. In a case where the device 3 is a TV, examples of the attribute information of the device 3 included in the device information include a program name of a TV program being watched, a broadcast station, a genre, a performer, and a keyword for program inquiry. Note that this is merely an example, and the attribute information of the device 3 is any information regarding details of the device 3 obtained from the device 3.

As illustrated in FIG. 4, in the device information, the attribute information associated with the device 3 is not limited to one type, and the contents and type of the attribute information differ depending on the type of the device 3. That is, different pieces of attribute information for each device 3 are associated with attributes 1 to N depending on the type of the operated device 3. The number of pieces of attribute information associated with the device 3 varies depending on the type of the device 3, and the same number of pieces of attribute information is not necessarily associated with all the devices 3.

The sensor information history storage unit 205 stores sensor information output from the detection unit 101.

Here, FIG. 5 is a diagram for explaining an example of contents of sensor information stored in the sensor information history storage unit 205 of the storage unit 20 in the first embodiment.

The sensor information illustrated in FIG. 5 includes a room in which each sensor 2 is installed, a sensor ID for identifying each sensor 2, a sensor name that is the name of the sensor 2, information regarding the state of the sensor 2, and information regarding the date and time when a change in the state of each sensor 2 was detected.

Information regarding the state of the sensor 2 varies depending on the type of the sensor 2. For example, in a case where the sensor 2 is a human sensor, the information regarding the state of the sensor 2 is information regarding whether a resident has been detected (ON) or not detected (OFF), information regarding the number of times a resident has been detected, or the like. For example, in a case where the sensor 2 is a temperature sensor, the information regarding the state of the sensor 2 is information regarding room temperature or the like acquired periodically.

The other information history storage unit 206 stores other information associating information not stored in the device information history storage unit 204 or the sensor information history storage unit 205 with date and time information, such as image data or video data. Details of the other information will be described later.

The whereabouts history storage unit 207 stores whereabouts information associating whereabouts of each resident with date and time information.

Here, FIG. 6 is a diagram for explaining an example of contents of whereabouts information stored in the whereabouts history storage unit 207 of the storage unit 20 in the first embodiment.

The whereabouts information illustrated in FIG. 6 includes a resident ID of each resident, a room ID and a room name in which a resident stays, and date and time information. The date and time information included in the whereabouts information is information regarding the date and time when each resident entered a corresponding room or information regarding the date and time when the resident left the corresponding room.

Note that the whereabouts information illustrated in FIG. 6 includes both the information regarding a room ID and the information regarding a room name. However, limitation thereto is not intended, and the whereabouts information may include information regarding only either one of the room ID and the room name. The whereabouts information may include not the information regarding a resident ID but only the information regarding a resident name, or may include both the information regarding a resident ID and the information regarding a resident name.

The behavior definition file 208 is a file defining conditions used for estimating behavior of a resident by the behavior estimating unit 103 as behavior definitions. Specifically, the behavior definition file 208 defines the type of behavior to be estimated, one or more detection conditions for determining that the behavior has been executed, and an estimation method using the detection conditions. The estimation method is, for example, a method for determining which conditions are set as AND or OR specifically. The details will be described later.

The behavior history storage unit 209 stores behavior information associating information indicating behavior of each resident with date and time information. Note that information indicating behavior included in the behavior information includes, for example, in a case of being in a house, information regarding various behaviors in daily life, such as "sleeping", "cooking", and "eating".

Here, FIG. 7 is a diagram for explaining an example of contents of behavior information stored in the behavior history storage unit 209 of the storage unit 20 in the first embodiment.

The behavior information illustrated in FIG. 7 includes information indicating a resident ID of each resident and the contents of behavior performed by the resident, and date and time information. The date and time information included in the behavior information is information regarding start date and time when each resident started corresponding behavior or information regarding end date and time when the resident ended the corresponding behavior.

Note that in the behavior information illustrated in FIG. 7, the information indicating contents of behavior is information regarding a name indicating the behavior. However, limitation thereto is not intended, and the information indicating contents of behavior may be information regarding a behavior ID. The behavior information may include information regarding a resident name instead of a resident ID, or may include information regarding both a resident ID and a resident name.

The storage unit 20 includes the building structure file 201, the layout information file 202, the resident information file 203, the device information history storage unit 204, the sensor information history storage unit 205, the other information history storage unit 206, the whereabouts history storage unit 207, the behavior definition file 208, and the behavior history storage unit 209, and stores information regarding a result analyzed by the important room extracting unit 105, drawing figure data generated by the figure generating unit 106, and the like. Details of operations of the important room extracting unit 105 and the figure generating unit 106 will be described later.

Note that in the first embodiment, as illustrated in FIG. 1, the storage unit 20 is included in the behavior visualization device 1. However, limitation thereto is not intended, and the storage unit 20 may be disposed at a place where the behavior visualization device 1 can refer to the storage unit 20 outside the behavior visualization device 1.

Now, return to the description of FIG. 1.

The reception unit 30 receives various operations by a user. A user inputs a desired operation by operating an input device (not illustrated) such as a mouse or a keyboard, for example. The reception unit 30 receives information regarding an operation input by a user from the input device, and outputs the received information regarding the operation to the control unit 10.

Next, an operation of the behavior visualization device 1 according to the first embodiment will be described.

In the following description, as an example, the behavior visualization device 1 visualizes information regarding whereabouts or behavior of a resident in a house using a hierarchical structure. It is assumed that the resident includes two family members of resident A and resident B. Note that this is merely an example, and the resident only needs to include one or more persons.

FIG. 8 is a flowchart for explaining an operation of the behavior visualization device 1 according to the first embodiment.

The detection unit 101 receives information from each device 3 or each sensor 2 in a room. The detection unit 101 detects a change in the state of each device 3 on the basis of information received from each device 3 in a room, and stores the detection information in association with date and time information in the device information history storage unit 204 of the storage unit 20 as device information. The detection unit 101 detects a change in the state of each sensor 2 on the basis of information received from each sensor 2 in a room, and stores the detection information in association with date and time information in the sensor information history storage unit 205 of the storage unit 20 as sensor information (step ST801). The detection unit 101 outputs both the device information and the sensor information to the whereabouts estimating unit 102 and the behavior estimating unit 103.

Figure 9:
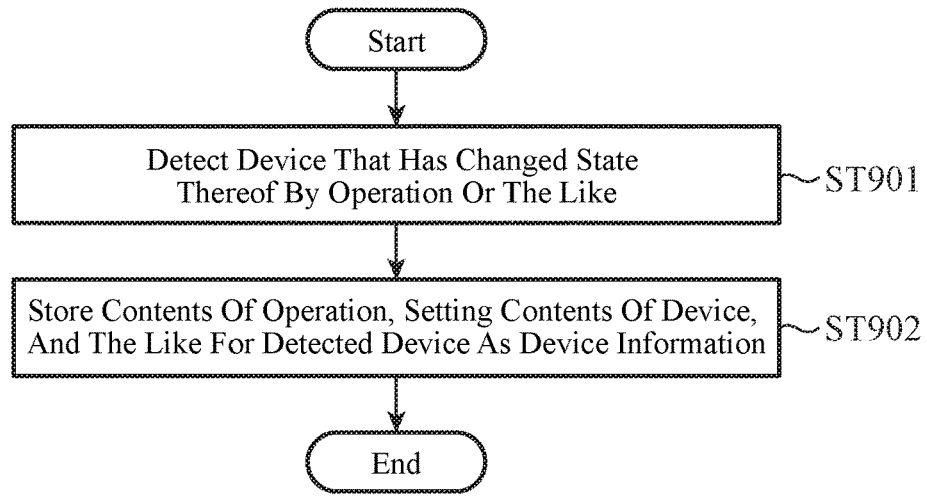
FIG. 9 is a flowchart for explaining details of an operation of storing device information in step ST801 of FIG. 8 by a detection unit in the first embodiment.

Here, FIG. 9 is a flowchart for explaining details of an operation of storing device information in step ST801 of FIG. 8 by the detection unit 101 in the first embodiment.

The detection unit 101 receives information from each device 3 in a room, and detects a device 3 that has changed the state thereof (step ST901). For example, when a resident performs an operation such as turning ON the power of the device 3 or changing the setting contents of the device 3, the state of the device 3 changes. The detection unit 101 detects a change in the state of the device 3 on the basis of the information received from the device 3.

Then, when detecting a change in the state of the device 3, the detection unit 101 stores information regarding contents of an operation, setting contents of the device 3, or the like for the device 3 of which a change in the state has been detected as device information (see FIG. 4) associated with date and time information in the device information history storage unit 204 of the storage unit 20 (step ST902).

Figure 10:
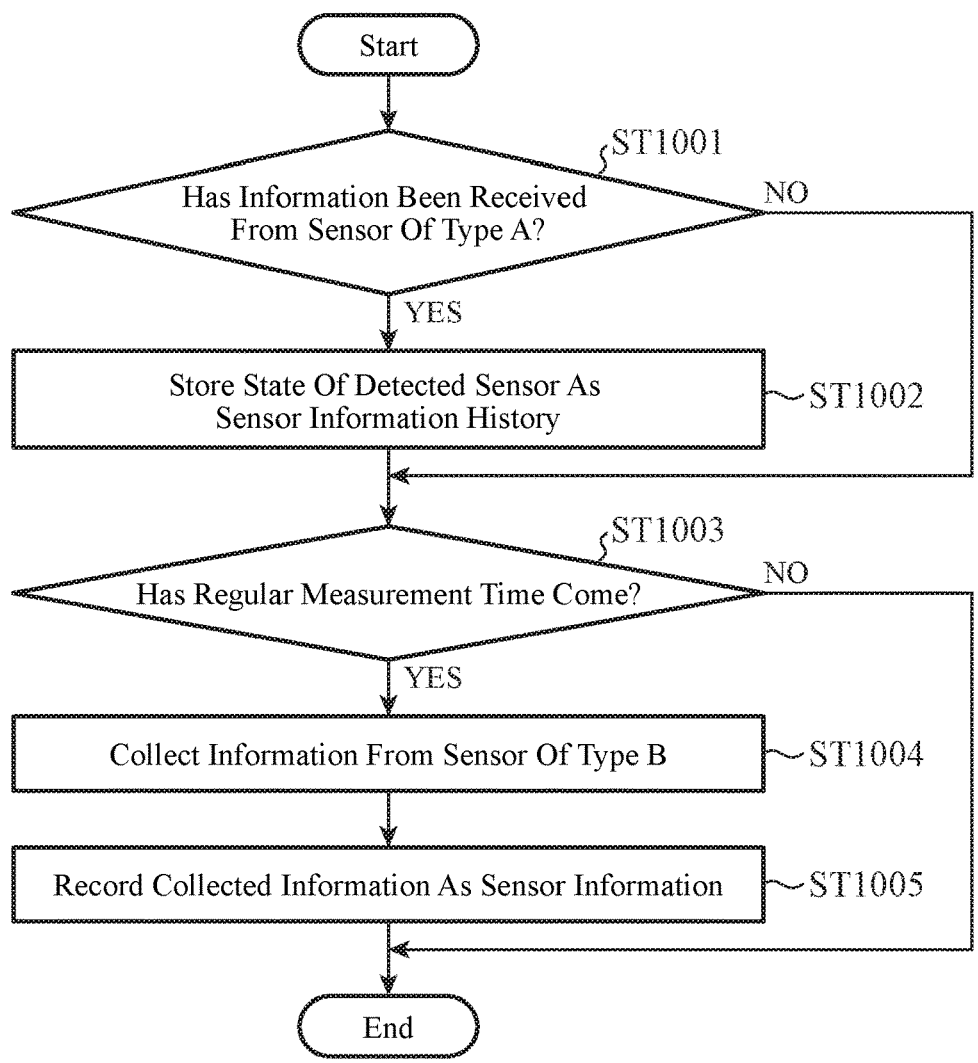
FIG. 10 is a flowchart for explaining details of an operation of storing sensor information in step ST801 of FIG. 8 by a detection unit in the first embodiment.

FIG. 10 is a flowchart for explaining details of an operation of storing sensor information in step ST801 of FIG. 8 by the detection unit 101 in the first embodiment.

The detection unit 101 changes an information reception method depending on two types of sensor information received from the sensor 2.

The detection unit 101 receives information from a sensor 2 for detecting a resident or an operation of the resident (referred to as type A), such as a human sensor or a door opening/closing sensor, each time the sensor 2 of type A performs detection.

That is, the detection unit 101 monitors whether information is transmitted from the sensor 2 of type A all the time. In a case where the sensor 2 of type A detects a resident or an operation of the resident, the detection unit 101 immediately receives information from the sensor 2.

In contrast, the detection unit 101 collects information periodically at preset time intervals from a sensor 2 (type B) for collecting measured physical quantity regardless of behavior of a resident or an operation of the resident, such as a temperature sensor or an illuminance sensor.

The detection unit 101 determines whether the detection unit 101 has received information from the sensor 2 of type A (step ST1001).

In step ST1001, if the detection unit 101 determines that the detection unit 101 has not received information from the sensor 2 of type A ("NO" in step ST1001), the process proceeds to step ST1003.

In step ST1001, if the detection unit 101 determines that the detection unit 101 has received information from the sensor 2 of type A ("YES" in step ST1001), the detection unit 101 stores the received information as sensor information (for example, see FIG. 5) in the sensor information history storage unit 205 of the storage unit 20 (step ST1002). For example, in a room, when a human sensor installed in the room detects a resident, the detection unit 101 receives information indicating that the resident has been detected from the human sensor, and stores the information in the sensor information history storage unit 205.

The detection unit 101 determines whether periodical measurement time for collecting information from the sensor 2 of type B has come (step ST1003).

In step ST1003, if the detection unit 101 determines that the periodical measurement time has not come ("NO" in step ST1003), the process ends.

In step ST1003, if the detection unit 101 determines that the periodical measurement time has come ("YES" in step ST1003), the detection unit 101 collects information from the sensor 2 of type B (step ST1004), and stores the collected information as sensor information in the sensor information history storage unit 205 of the storage unit 20 (step ST1005).

In this way, the detection unit 101 receives information from the device 3 when a resident operates the device 3, for example. The detection unit 101 receives information from the sensor 2 when the sensor 2 detects a resident, for example. Then, the detection unit 101 stores, as history, the information received from the device 3 and the information received from the sensor 2 in association with date and time information in the device information history storage unit 204 of the storage unit 20 and the sensor information history storage unit 205 of the storage unit 20, respectively.

Now, return to the flowchart of FIG. 8.

In step ST801, the whereabouts estimating unit 102 estimates whereabouts of a resident on the basis of the device information and the sensor information output from the detection unit 101, and stores whereabouts information associating the estimated whereabouts of the resident with date and time information in the whereabouts history storage unit 207 (step ST802).

Here, FIG. 11 is a flowchart for explaining details of an operation of storing whereabouts information in step ST802 of FIG. 8 by the whereabouts estimating unit 102 in the first embodiment.

When the whereabouts estimating unit 102 acquires device information and sensor information from the detection unit 101, the whereabouts estimating unit 102 refers to the sensor information history storage unit 205, and determines whether there is past sensor information within a predetermined time from the time when the sensor information (hereinafter referred to as "current sensor information") was acquired (step ST1101). The predetermined time is preset, and is set to, for example, 10 minutes in the first embodiment. This is an example, and the predetermined time can be set appropriately.

In step ST1101, if the whereabouts estimating unit 102 determines that there is no past sensor information within a predetermined time from the time when the current sensor information was acquired ("NO" in step ST1101), the process ends.

In step ST1101, if the whereabouts estimating unit 102 determines that there is past sensor information within a predetermined time from the time when the current sensor information was acquired ("YES" in step ST1101), the whereabouts estimating unit 102 refers to the layout information file 202 of the storage unit 20, and specifies a room where the sensor 2 specified by the past sensor information within the predetermined time is installed. Then, on the basis of information regarding the specified room, the whereabouts estimating unit 102 estimates a moving origin room of a resident and a moving destination room of the resident (step ST1102).

For example, in step ST801, it is assumed that the detection unit 101 has received information indicating that a resident has been detected from a human sensor (1) installed in a living room, and has output sensor information based on the information to the whereabouts estimating unit 102.

When the whereabouts estimating unit 102 acquires the sensor information (current sensor information) from the detection unit 101, the whereabouts estimating unit 102 refers to the sensor information history storage unit 205 and determines whether there is past sensor information acquired within the past 10 minutes from the date and time when the current sensor information was acquired (see step ST1101). As a result, it is assumed that it is determined that there is past sensor information acquired within the past 10 minutes, and a sensor specified by the past sensor information is a human sensor (2) installed in a dining room. In this case, the whereabouts estimating unit 102 estimates that the moving origin room is the dining room, and the moving destination room is the living room.

Subsequently, the whereabouts estimating unit 102 refers to the whereabouts history storage unit 207 and estimates a resident who has moved from the moving origin room to the moving destination room estimated in step ST1102 (step ST1103). In the above example, the whereabouts estimating unit 102 estimates a resident who has moved from the dining room to the living room.

Specifically, the whereabouts estimating unit 102 refers to the whereabouts history storage unit 207 and estimates that a resident whose latest whereabouts is the dining room is a resident who has moved. In a case where there is no resident whose latest whereabouts is the dining room, the whereabouts estimating unit 102 refers to the building structure file 201 of the storage unit 20, specifies a room from which a resident can move to the living room that is the moving destination, and estimates that a resident whose latest whereabouts is the room is a resident who has moved.

Then, the whereabouts estimating unit 102 stores, for the resident who has moved, information specifying the resident, information regarding date and time when sensor information based on information received from the sensor 2 installed in the moving destination room (human sensor (1) in the above example) was acquired, and information regarding the moving destination room (the living room in the above example) in association with one another in the whereabouts history storage unit 207 as whereabouts information (step ST1104).

The whereabouts estimating unit 102 outputs the estimated whereabouts information to the behavior estimating unit 103.

Now, return to the flowchart of FIG. 8.

The behavior estimating unit 103 estimates behavior of a resident on the basis of the device information and the sensor information acquired from the detection unit 101 in step ST801, the whereabouts information acquired from the whereabouts estimating unit 102 in step ST802, and the contents of the behavior definition file 208 defined in advance and stored in the storage unit 20, and stores the estimated result in the behavior history storage unit 209 as behavior information (step ST803).

Here, FIG. 12 is a diagram for explaining an example of contents of the behavior definition file 208 stored in the storage unit 20 in the first embodiment. The behavior definition file 208 is defined by being described in, for example, an XML format.

In the behavior definition file 208, for example, as illustrated in FIG. 12, the type of behavior, a condition for determining that the behavior has been performed, and a determination formula for the condition are defined for each behavior.

A user defines the behavior definition file 208 as illustrated in FIG. 12 and stores the behavior definition file 208 in the storage unit 20 in advance. Specifically, a user inputs contents defined in the behavior definition file 208 from an input device, and the reception unit 30 receives the input contents. Then, the reception unit 30 outputs the received contents to a definition setting unit (not illustrated) of the control unit 10, and the definition setting unit creates the behavior definition file 208 on the basis of the contents output from the reception unit 30, and stores the behavior definition file 208 in the storage unit 20.

Figure 13:
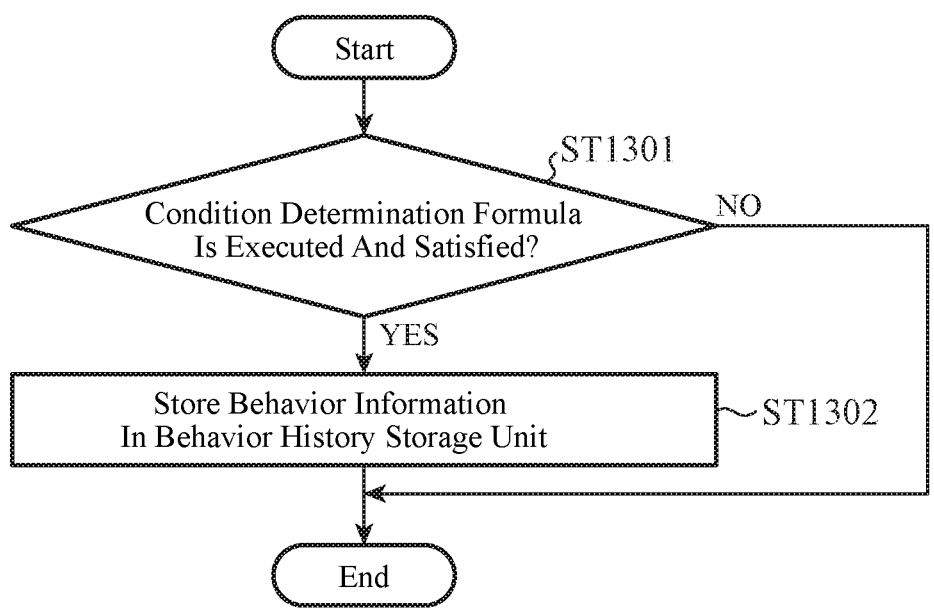
FIG. 13 is a flowchart for explaining details of an operation of storing behavior information in step ST803 of FIG. 8 by a behavior estimating unit in the first embodiment.

FIG. 13 is a flowchart for explaining details of an operation of storing behavior information in step ST803 of FIG. 8 by the behavior estimating unit 103 in the first embodiment.

If the behavior estimating unit 103 acquires the device information and the sensor information from the detection unit 101 and acquires the whereabouts information from the whereabouts estimating unit 102, the behavior estimating unit 103 refers to the behavior definition file 208 stored in the storage unit 20, and determines whether there is behavior satisfying the condition defined in the behavior definition file 208 (step ST1301).

In step ST1301, if the behavior estimating unit 103 determines that there is no behavior satisfying the condition defined in the behavior definition file 208 ("NO" in step ST1301), the process ends.

In step ST1301, if the behavior estimating unit 103 determines that there is behavior satisfying the condition defined in the behavior definition file 208 ("YES" in step ST1301), the behavior estimating unit 103 stores the behavior that has been determined as behavior satisfying the condition in the behavior history storage unit 209 as behavior information associated with date and time information included in the device information or the sensor information acquired from the detection unit 101 (step ST1302).

For example, it is assumed that it can be found that resident A currently stays in a bedroom on the basis of the whereabouts information acquired from the whereabouts estimating unit 102. In this state, it is assumed that the illuminance of lighting in the bedroom is changed from 300 lux to 0.3 lux on the basis of the sensor information acquired from the detection unit 101, and the detection time of the information is 23:10. In this case, the behavior estimating unit 103 estimates the behavior of resident A as "start sleeping" because this case satisfies a condition regarding behavior of "start sleeping" in the behavior definition file 208. Then, the behavior estimating unit 103 stores the information indicating "start sleeping" and the information of the resident ID specifying resident A in association with date and time information in the behavior history storage unit 209 as behavior information. Note that the sleeping time zone defined in the behavior definition file 208 is preset to, for example, a time zone of 22:00 to 1:00, and is stored in the behavior estimating unit 103. The date and time information associated as behavior information by the behavior estimating unit 103 may be, for example, the date and time included in the device information or the sensor information acquired from the detection unit 101, or the date and time when the behavior estimating unit 103 estimated the behavior.

On the basis of the whereabouts information stored in the whereabouts history storage unit 207 and the behavior information stored in the behavior history storage unit 209 in such a manner described above, as described later, the behavior visualization device 1 extracts whereabouts deeply associated with a resident for each time zone, and analyzes and visualizes association between rooms or a relationship between whereabouts of the resident and behavior of the resident.

Now, return to the flowchart of FIG. 8.

The summary condition setting unit 104 sets the summary condition on the basis of the summary condition setting instruction information output from the reception unit 30 or the preset summary condition setting instruction information. Specifically, the summary condition setting unit 104 executes a pre-stored processing program and sets a summary condition (step ST804).

As for the summary condition setting instruction information, for example, a user operates an input device each time and inputs a summary condition setting instruction, and the reception unit 30 receives the input setting instruction and outputs the setting instruction to the summary condition setting unit 104 as summary condition setting instruction information. The summary condition setting instruction information may be preset and stored, for example, when the behavior visualization device 1 is set.

The summary condition setting unit 104 sets the following summary conditions, for example.

(A) Unit of a target period
(B) Start date and time and end date and time
(C) Specific condition for period or time zone
(D) Unit time for summarizing information regarding a person
(E) Condition for extracting a room deeply associated with a person in a target time zone
   Degree-of-occupancy extraction level
   Movement frequency extraction level
(F) Condition for extracting behavior
(G) Condition for extracting associated information The summary condition setting unit 104 sets a unit of a target period to be processed, such as one day, one week, or one month as the unit of a target period (A).

The summary condition setting unit 104 sets start date and time and end date and time of a target period for analyzing and visualizing a room deeply associated with a resident, main behavior performed in the room, or the like as the date and time (B).

As for the specific condition (C), when a specific condition is imparted to the unit of a target period (A), the summary condition setting unit 104 sets the specific condition. Examples of the specific condition include specific days of the week, weekends and holidays only, and weekdays only.

The summary condition setting unit 104 sets a unit time as an analysis unit indicating the degree of granularity on the time axis for analyzing a room deeply associated with a resident, main behavior performed in the room, or the like for the unit of a target period (A) as the unit time (D). The analysis unit is a unit time indicating whether analysis is performed every two hours or every five hours, for example, in a case where the unit of a target period set in (A) is one day, and the behavior visualization device 1 analyzes and visualizes whereabouts of a resident during the day or main behavior performed in the whereabouts. For example, in a case where the unit of a target period (A) is one month, the summary condition setting unit 104 can also set the condition in units of day or week such as "three days" or "one week" as the unit time (D). For example, in a case where the period set in (A) is one year, the summary condition setting unit 104 can also set a condition in units of month such as "two months" as the unit time (D).

An operation for analyzing a room deeply associated with a resident, main behavior performed in the room, or the like on the basis of the condition set as the unit time (D) will be described later.

When the summary condition setting unit 104 sets, as the extraction condition (E), a plurality of time zones by dividing a target period from the start date and time to the end date and time for analyzing and visualizing behavior of a resident by the unit time (D), the summary condition setting unit 104 sets an extraction condition for extracting a room deeply associated with the resident in each time zone.

The summary condition setting unit 104 further sets, as an extraction condition for extracting a room deeply associated with the resident, a degree-of-occupancy extraction level designating the number of degrees of occupancy time of the resident to be extracted from the top at maximum, and a movement frequency extraction level designating the number of rooms having high movement frequencies from a room having the highest degree of occupancy time of the resident (hereinafter referred to as "summary whereabouts") to be extracted from the top at maximum.

For example, in a case where it is designated to extract a room in which the degree of occupancy time of the resident is any one of the top three degrees, the summary condition setting unit 104 sets "3" as the degree-of-occupancy extraction level. In a case where it is designated to extract a room in which the movement frequency of the resident is any one of the top two frequencies, the summary condition setting unit 104 sets "2" as the movement frequency extraction level.

A specific process for extracting a room having a high movement frequency with respect to the summary whereabouts on the basis of the condition set as the extraction condition (E) will be described later.

When the summary condition setting unit 104 sets, as the extraction condition (F), a plurality of time zones by dividing a target period from the start date and time to the end date and time for analyzing and visualizing behavior of a resident by the unit time (D), the summary condition setting unit 104 sets an extraction condition for extracting information regarding main behavior performed by the resident in each time zone. Specifically, the summary condition setting unit 104 sets an extraction condition designating the number of main behaviors performed by the resident from the top ranking as the extraction condition (F). The summary condition setting unit 104 also sets a determination criterion for determining whether behavior performed by the resident is main behavior. The determination criterion is used when the behavior information imparting unit 107 extracts the behavior performed by the resident in the number of behaviors designated from the top ranking.

For example, the following determination criterion (a) or (b) is used as a determination criterion for determining whether the behavior performed by the resident is main behavior.

(a) Total time during which the behavior was performed in a target time zone (b) Total number of times the behavior was performed in a target time zone The summary condition setting unit 104 appropriately determines whether the determination criterion (a) or (b) is set as the extraction condition (F), for example, on the basis of an instruction from a user.

Note that the determination criteria of (a) and (b) are merely examples, and the summary condition setting unit 104 may set a determination criterion other than the above (a) and (b) as the extraction condition (F).

Note that a specific process for extracting main behavior performed by the resident on the basis of the condition set as the extraction condition (F) will be described later.

When the summary condition setting unit 104 sets, as the extraction condition (G), a plurality of time zones by dividing a target period from the start date and time to the end date and time for analyzing and visualizing behavior of a resident by the unit time (D), the summary condition setting unit 104 sets an extraction condition for extracting main associated information among pieces of information obtained in each time zone. The information obtained in each time zone is, for example, device information, sensor information, or other information stored in the other information history storage unit 206, such as an image or a video. Specifically, for example, the summary condition setting unit 104 sets, as the extraction condition (G), an extraction condition designating the maximum number of pieces to be extracted as associated information deeply associated with the resident from various pieces of information including the device information, the sensor information, and other information.

Note that a specific process for extracting associated information deeply associated with the resident on the basis of the condition set as the extraction condition (G) will be described later.

The set values of the conditions (A) to (G) as described above are stored in advance, for example, in a place that can be referred to by the summary condition setting unit 104 of the storage unit 20 as summary condition setting instruction information. The summary condition setting unit 104 reads the summary condition setting instruction information and sets the summary conditions as described above. For example, a summary condition setting screen display control unit (not illustrated) of the behavior visualization device 1 may display a graphical user interface (GUI) screen for designating set values of the conditions (A) to (G) on the display device 4. A user may operate the input device from the GUI screen and may designate set values each time the behavior visualization device 1 performs operation. The reception unit 30 may receive information regarding the set values, may store the information in a place that can be referred to by the summary condition setting unit 104 of the storage unit 20 as summary condition setting instruction information. The summary condition setting unit 104 may read the summary condition setting instruction information stored by the reception unit 30 and may set the summary conditions as described above.

In the first embodiment, the behavior visualization device 1 sets the unit of the target period as one day, sets a plurality of time zones by dividing the one day by set unit time, and summarizes behavior of a resident for each set time zone. That is, the summary condition setting unit 104 assumes that one day is set as the unit of a target period (A), and a specific unit time is set as the unit time (D) as the summary condition.

The summary condition setting unit 104 stores information regarding the set summary condition in the storage unit 20 and outputs the information to the important room extracting unit 105.

Now, return to the flowchart of FIG. 8.

The important room extracting unit 105 refers to the whereabouts information stored in the whereabouts history storage unit 207 of the storage unit 20, and extracts a room deeply associated with a resident in each time zone on the basis of the summary condition set by the summary condition setting unit 104 in step ST804.

First, the occupancy time analyzing unit 1051 of the important room extracting unit 105 refers to the whereabouts information stored in the whereabouts history storage unit 207 of the storage unit 20, and extracts a room having the highest degree of occupancy time during which a resident stayed in a room in each time zone as summary whereabouts on the basis of the summary condition set by the summary condition setting unit 104. The occupancy time analyzing unit 1051 searches for a room having the second highest degree of occupancy time after the summary whereabouts from the top according to a rank designated in a summary condition, and extracts the room as an associated room (step ST805).

Figure 14:
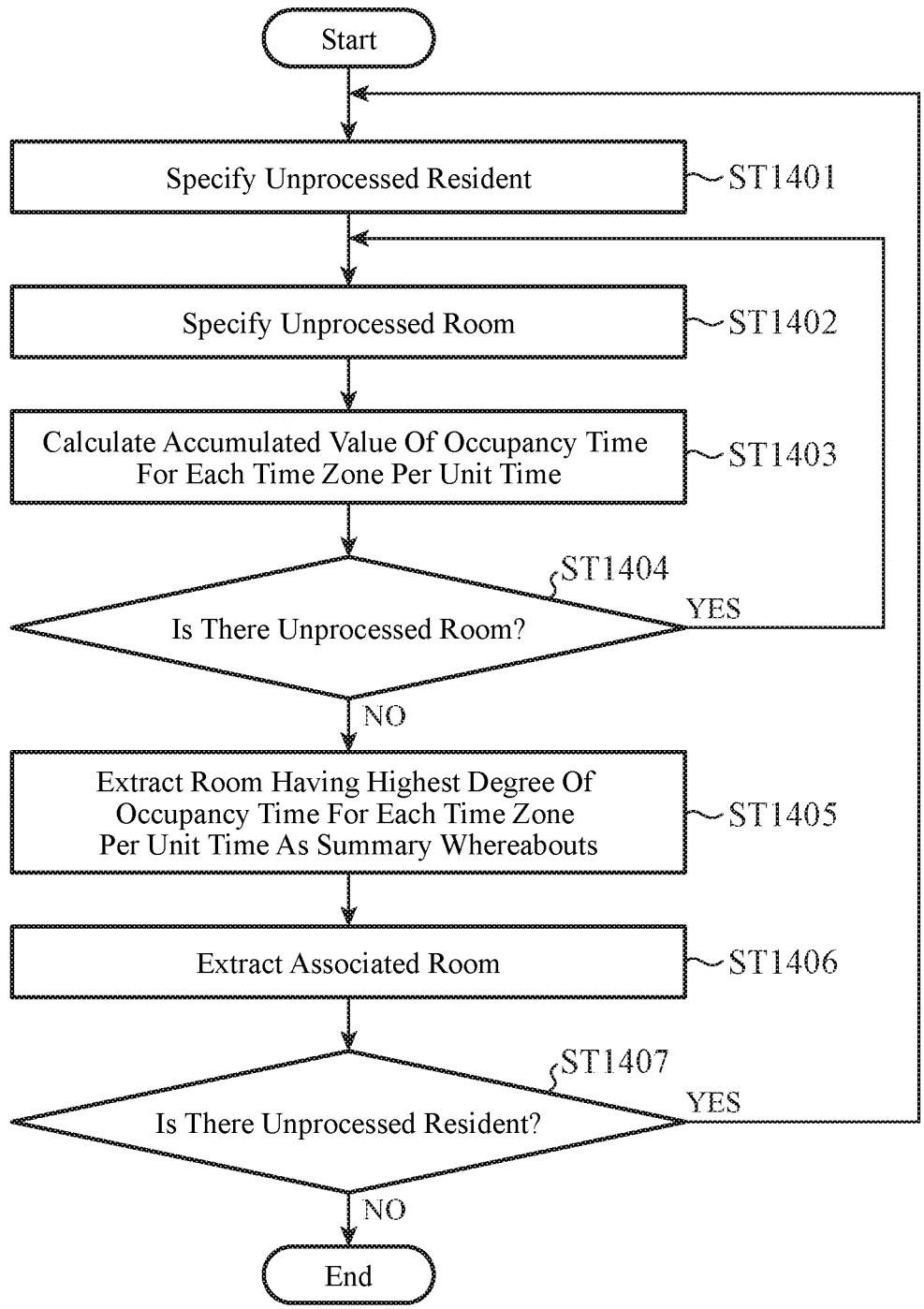
FIG. 14 is a flowchart for explaining details of an operation of extracting summary whereabouts and an associated room in each time zone by an occupancy time analyzing unit of an important room extracting unit in the first embodiment.

Here, FIG. 14 is a flowchart for explaining details of an operation of extracting summary whereabouts and an associated room in each time zone by the occupancy time analyzing unit 1051 of the important room extracting unit 105 in the first embodiment.

The following process is performed for all the rooms in a house for each resident defined in the resident information file 203.

First, the occupancy time analyzing unit 1051 specifies an unprocessed resident (hereinafter referred to as "occupancy time analysis target resident") among the residents defined in the resident information file 203 (step ST1401).

Next, the occupancy time analyzing unit 1051 refers to the building structure file 201 and specifies one unprocessed room (hereinafter referred to as "occupancy time analysis target room") (step ST1402).

The occupancy time analyzing unit 1051 refers to whereabouts information stored in the whereabouts history storage unit 207 and calculates an accumulated value of time during which the occupancy time analysis target resident stays in the occupancy time analysis target room for each time zone set by dividing a target period corresponding to the unit of a target period (A), the date and time (B), and the specific condition (C) set in the summary condition by the unit time (D) (step ST1403). Specifically, the occupancy time analyzing unit 1051 refers to the whereabouts information stored in the whereabouts history storage unit 207 and calculates an accumulated value of occupancy time during which the occupancy time analysis target resident specified in step ST1401 stayed in the occupancy time analysis target room specified in step ST1402 for each time zone on one day on the basis of the summary condition set by the summary condition setting unit 104.

The occupancy time analyzing unit 1051 determines whether there is an unprocessed room (step ST1404).

In step ST1404, if the occupancy time analyzing unit 1051 determines that there is an unprocessed room ("YES" in step ST1404), the process returns to step ST1402, and the subsequent processes are repeated. That is, the occupancy time analyzing unit 1051 specifies the next unprocessed room as the occupancy time analysis target room and calculates an accumulated value of time during which the occupancy time analysis target resident stays in the occupancy time analysis target room.

In step ST1404, if the occupancy time analyzing unit 1051 determines that there is no unprocessed room ("NO" in step ST1404), the occupancy time analyzing unit 1051 extracts a room having the largest occupancy time accumulated value calculated for each time zone as summary whereabouts (step ST1405).

The occupancy time analyzing unit 1051 refers to the whereabouts information stored in the whereabouts history storage unit 207 and extracts information regarding a room having the second or subsequent highest degree of occupancy time after the summary whereabouts in the number of pieces designated from the top according to a rank designated in the summary condition in each time zone on the basis of the degree-of-occupancy extraction level in the extraction condition (E), set in the summary condition. The occupancy time analyzing unit 1051 sets a room extracted as a room having the second highest degree of occupancy time after the summary whereabouts as an associated room (step ST1406).

The occupancy time analyzing unit 1051 determines whether there is an unprocessed resident (step ST1407).

In step ST1407, if the occupancy time analyzing unit 1051 determines that there is an unprocessed resident ("YES" in step ST1407), the process returns to step ST1401, and the subsequent processes are repeated. That is, the occupancy time analyzing unit 1051 acquires information regarding the next resident, and extracts, as an occupancy time analysis target resident, summary whereabouts and an associated room for the occupancy time analysis target resident.

The occupancy time analyzing unit 1051 performs the above processes for all the residents defined in the resident information file 203.

In step ST1407, if the occupancy time analyzing unit 1051 determines that there is no unprocessed resident ("NO" in step ST1704), the occupancy time analyzing unit 1051 outputs, for each resident, summary whereabouts, an associated room, and information associated with information regarding an accumulated value of occupancy time in each room (hereinafter referred to as "post-occupancy-time-analysis information") in each time zone to the movement frequency analyzing unit 1052 of the important room extracting unit 105.

An operation of the occupancy time analyzing unit 1051 as described with reference to FIG. 14 will be described with a specific example.

For example, it is assumed that the resident defined in the resident information file 203 includes two persons of resident A and resident B, and the contents of the whereabouts history storage unit 207 are as illustrated in FIG. 15.

Note that in FIG. 15, the resident ID of resident A is "1", and the resident ID of resident B is "2".

The contents of a summary condition set by the summary condition setting unit 104 are as follows. In the following description, it is assumed that the summary conditions are as follows when description is made with a specific example.

(A) Unit of a target period: one day (B) Start date and time and end date and time: 6:00 on Jan. 15, 2017 and 22:00 on Jan. 15, 2017

(C) Specific condition for period or time zone: none (D) Unit time for summarizing information regarding a person: four hours (E) Condition for extracting a room deeply associated with a person in a target time zone degree-of-occupancy extraction level: 3

Movement frequency extraction level: 2

(F) Condition for extracting behavior: 3

(G) Condition for extracting associated information: 2

First, the occupancy time analyzing unit 1051 acquires information regarding resident A having a resident ID of "1" as an unprocessed resident, and specifies the resident A as an occupancy time analysis target resident (step ST1401 in FIG. 14).

Subsequently, the occupancy time analyzing unit 1051 refers to the building structure file 201, acquires information regarding the living room having a room ID of "1" as an unprocessed room, and specifies the living room as an occupancy time analysis target room (step ST1402 in FIG. 14).

The occupancy time analyzing unit 1051 refers to the whereabouts information in the whereabouts history storage unit 207 for resident A and calculates an accumulated value of the occupancy time during which resident A stayed in the living room for each time zone set by dividing a period from 6:00 on Jan. 15, 2017 for every four hours (6:00 to 10:00, 10:00 to 14:00, 14:00 to 18:00, and 18:00 to 22:00) (step ST1403). Note that, for simple description, hereinafter, the description of the year is omitted and only the month and day are described, or the description of the year and month is omitted and only the time is described appropriately for the target period of 6:00 to 22:00 on Jan. 15, 2017.

As a result of calculating the accumulated value of the occupancy time during which resident A stayed in the living room, the occupancy time analyzing unit 1051 calculates the occupancy time during which resident A stayed in the living room from 6:00 to 10:00, for example, as 54 minutes. FIG. 15 is a diagram illustrating an example of whereabouts information in the whereabouts history storage unit 207 at this time. Note that, for simple description, FIG. 15 only illustrates the record up to 7:55 on Jan. 15, 2017, but the whereabouts information also includes information on and after 7:55 on Jan. 15, 2017. The occupancy time analyzing unit 1051 also calculates an accumulated value of occupancy time during which resident A stayed in the living room for each of time zones of 10:00 to 14:00, 14:00 to 18:00, and 18:00 to 22:00.

Since there is an unprocessed room ("YES" in step ST1404), the occupancy time analyzing unit 1051 similarly calculates an accumulated value of occupancy time of resident A in another room defined in the building structure file 201 for each time zone. In this way, the occupancy time analyzing unit 1051 calculates an accumulated value of occupancy time of resident A in each room for each time zone. As a result, for example, the accumulated value of the occupancy time of resident A in each room in the time zone of 6:00 to 10:00 is illustrated in FIG. 16. Here, for simple description, FIG. 16 illustrates the accumulated value of the occupancy time of resident A in each room in the time zone of 6:00 to 10:00. However, the occupancy time analyzing unit 1051 also calculates an accumulated value of occupancy time of resident A in each room for each of the time zones of 10:00 to 14:00, 14:00 to 18:00, and 18:00 to 22:00.

The occupancy time analyzing unit 1051 extracts a room having the highest degree of occupancy time of resident A as summary whereabouts in each of the time zones of 6:00 to 10:00, 10:00 to 14:00, 14:00 to 18:00, and 18:00 to 22:00 (step ST1405 in FIG. 14).

For example, if the accumulated value of the occupancy time of resident A in each room in the time zone of 6:00 to 10:00 is as illustrated in FIG. 16, the room having the largest accumulated value of the occupancy time is "kitchen". Therefore, the occupancy time analyzing unit 1051 extracts "kitchen" as a summary whereabouts.

The occupancy time analyzing unit 1051 extracts an associated room of resident A on the basis of the summary condition (step ST1406 in FIG. 14).

For example, according to the summary condition, the degree-of-occupancy extraction level is "3". Therefore, the occupancy time analyzing unit 1051 extracts a room in which the accumulated value of occupancy time is any one of the top three values as an associated room. As a result, according to FIG. 16, in the time zone of 6:00 to 10:00, "kitchen" has the first accumulated value of the occupancy time from the top, "living room" has the second accumulated value of occupancy time from the top, and "private room A" has the third accumulated value of the occupancy time from the top.

Therefore, the occupancy time analyzing unit 1051 extracts "living room" and "private room A" having the second and third highest degree of occupancy time after "kitchen" that is the summary whereabouts as associated rooms.

The occupancy time analyzing unit 1051 extracts rooms having the second and third highest degree of occupancy time from the top ranking after summary whereabouts having the largest accumulated value of occupancy time also for each of the time zones of 10:00 to 14:00, 14:00 to 18:00, and 18:00 to 22:00 as associated rooms.

The occupancy time analyzing unit 1051 determines whether there is an unprocessed resident, and resident B is unprocessed ("YES" in step ST1407 in FIG. 14). Therefore, the occupancy time analyzing unit 1051 calculates, also for resident B, an accumulated value of occupancy time in each room in each of time zones of 6:00 to 10:00, 10:00 to 14:00, 14:00 to 18:00, and 18:00 to 22:00, and extracts summary whereabouts and an associated room.

As described above, the occupancy time analyzing unit 1051 extracts summary whereabouts and an associated room as rooms deeply associated with a resident.

Then, the occupancy time analyzing unit 1051 outputs, for each time zone, information regarding summary whereabouts and an associated room in association with information specifying a resident to the movement frequency analyzing unit 1052 as post-occupancy-time-analysis information.

Here, FIG. 17 is a diagram illustrating an example of post-occupancy-time-analysis information output from the occupancy time analyzing unit 1051 to the movement frequency analyzing unit 1052 in the first embodiment.

As illustrated in FIG. 17, the occupancy time analyzing unit 1051 outputs, for each resident, information associating each time zone with information regarding a room deeply associated with the resident, that is, summary whereabouts and an associated room. The post-occupancy-time-analysis information output from the occupancy time analyzing unit 1051 is also associated with information regarding the degree of occupancy time, that is, an accumulated value of occupancy time.

Now, return to the flowchart of FIG. 8.

Next, in step ST805, the movement frequency analyzing unit 1052 calculates, for each resident, a movement frequency between summary whereabouts and another room in each time zone on the basis of the post-occupancy-time-analysis information output from the occupancy time analyzing unit 1051 and the whereabouts information stored in the whereabouts history storage unit 207 of the storage unit 20, and extracts a room having a high movement frequency as an associated room on the basis of the calculated movement frequency and the movement frequency extraction level defined in the summary condition (step ST806). Then, the movement frequency analyzing unit 1052 adds information regarding the extracted associated room to the post-occupancy-time-analysis information output from the occupancy time analyzing unit 1051 in step ST805, and sets the information as important room information.

Figure 18:
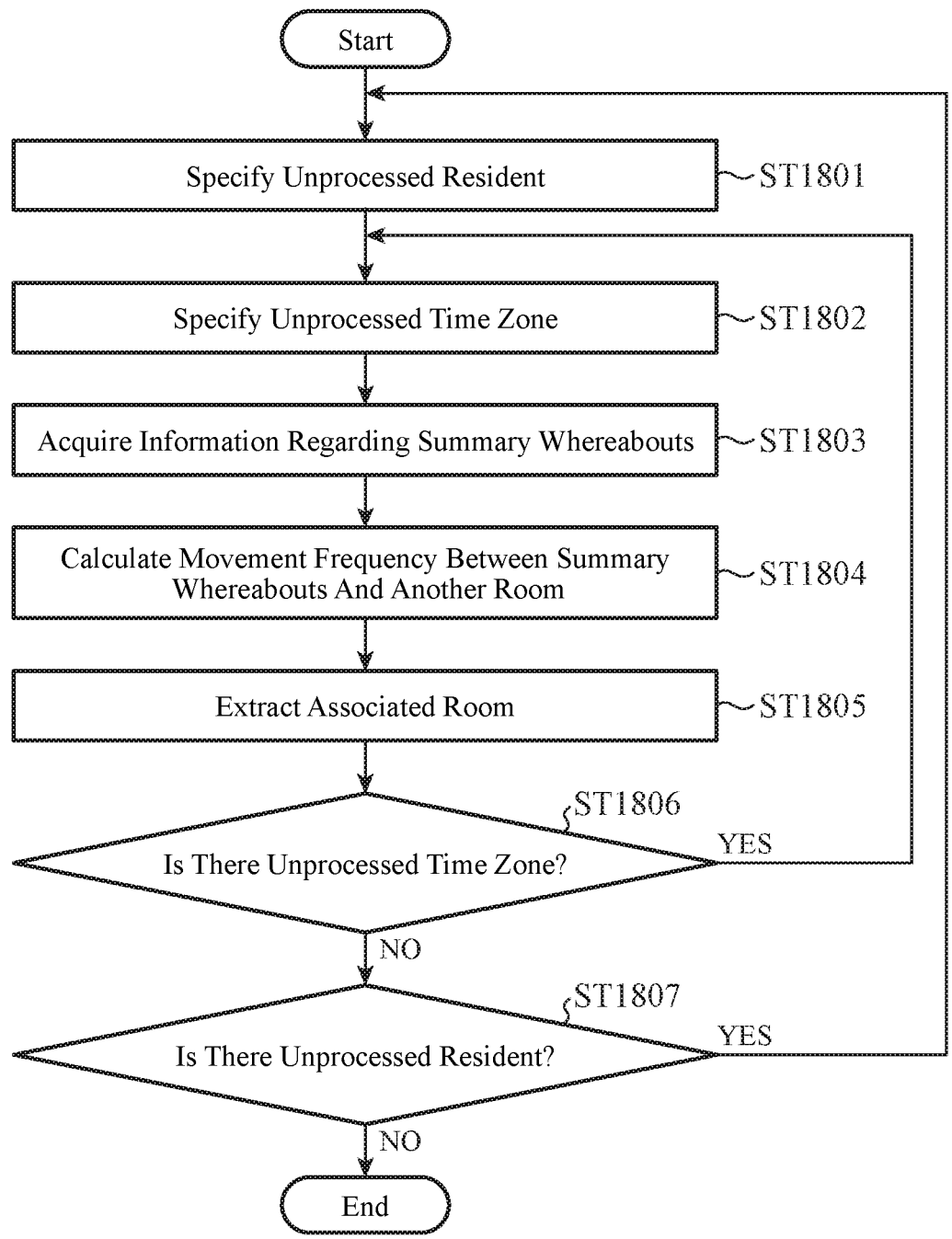
FIG. 18 is a flowchart for explaining details of an operation of extracting a room having a high movement frequency by a movement frequency analyzing unit of an important room extracting unit in the first embodiment.

Here, FIG. 18 is a flowchart for explaining details of an operation of extracting a room having a high movement frequency by the movement frequency analyzing unit 1052 of the important room extracting unit 105 in the first embodiment.

First, the movement frequency analyzing unit 1052 of the important room extracting unit 105 specifies an unprocessed resident (hereinafter referred to as "movement frequency analysis target resident") on the basis of the post-occupancy-time-analysis information output from the occupancy time analyzing unit 1051 (step ST1801). For example, the movement frequency analyzing unit 1052 specifies resident A as the movement frequency analysis target resident.

Next, the movement frequency analyzing unit 1052 specifies one unprocessed time zone (hereinafter referred to as "movement frequency analysis target time zone") on the basis of the post-occupancy-time-analysis information output from the occupancy time analyzing unit 1051 (step ST1802). For example, the movement frequency analyzing unit 1052 specifies a time zone of 6:00 to 10:00 on January 15 as a movement frequency analysis target time zone.

The following processes are performed for each resident set in the post-occupancy-time-analysis information for each time zone.

The movement frequency analyzing unit 1052 acquires information regarding summary whereabouts in the movement frequency analysis target time zone specified in step ST1802 (step ST1803).

For example, the summary whereabouts for resident A in the time zone of 6:00 to 10:00 on January 15 is "kitchen" as described above (see also FIG. 17 and the like), and the movement frequency analyzing unit 1052 acquires information indicating "kitchen".

The movement frequency analyzing unit 1052 refers to the whereabouts information stored in the whereabouts history storage unit 207 of the storage unit 20, and calculates the number of times the movement frequency analysis target resident specified in step ST1801 has moved from the summary whereabouts to another room or the number of times the movement frequency analysis target resident specified in step ST1801 has moved from another room to the summary whereabouts in the movement frequency analysis target time zone specified in step ST1802 (step ST1804). For example, the movement frequency analyzing unit 1052 calculates the number of times resident A has moved from "kitchen" to another room or the number of times resident A has moved from another room to "kitchen" in the time zone of 6:00 to 10:00 on the basis of the whereabouts of resident A in the time zone of 6:00 to 10:00. The movement frequency analyzing unit 1052 uses the calculated number of movements as a movement frequency.

As a result, the movement frequency analyzing unit 1052 calculates, for example, the movement frequencies as illustrated in FIG. 19. As illustrated in FIG. 19, for example, the movement frequency analyzing unit 1052 collectively sets movement between summary whereabouts and a room such as movement from "kitchen" to "washroom" or movement from "washroom" to "kitchen" as a movement frequency between the summary whereabouts and the room.

At this time, the movement frequency analyzing unit 1052 also calculates the number of times the movement frequency analysis target resident has moved between rooms other than the summary whereabouts in the movement frequency analysis target time zone. The movement frequency analyzing unit 1052 also calculates the total number of times the movement frequency analysis target resident has moved in the movement frequency analysis target time zone.

Then, the movement frequency analyzing unit 1052 extracts a room in which a movement frequency with the summary whereabouts corresponds to the movement frequency extraction level of the extraction condition (E) as an associated room among the summary conditions set by the summary condition setting unit 104 (see step ST804 in FIG. 8) (step ST1805).

Specifically, since "2" is designated as the movement frequency extraction level, the movement frequency analyzing unit 1052 extracts two rooms having the highest and second highest movement frequencies as associated rooms on the basis of the information regarding the calculated movement frequency.

Since the movement frequency of resident A in the time zone of 6:00 to 10:00 is as illustrated in FIG. 19, the movement frequency analyzing unit 1052 extracts "dining room" and "washroom" as associated rooms in the time zone of 6:00 to 10:00.

The movement frequency analyzing unit 1052 determines whether or not there is an unprocessed time zone (step ST1806).

In step ST1806, if the movement frequency analyzing unit 1052 determines that there is an unprocessed time zone ("YES" in step ST1806), the process returns to step ST1802, and the subsequent processes are repeated. That is, the movement frequency analyzing unit 1052 specifies the next unprocessed time zone as a movement frequency analysis target time zone, and calculates the movement frequency of the movement frequency analysis target resident in the movement frequency analysis target time zone.

Since there are unprocessed time zones (10:00 to 14:00, 14:00 to 18:00, and 18:00 to 22:00), the process returns to step ST1802, and the movement frequency analyzing unit 1052 specifies the time zone of 10:00 to 14:00 as a movement frequency analysis target time zone. Then, as described above, the movement frequency analyzing unit 1052 acquires information regarding summary whereabouts for resident A in the time zone of 10:00 to 14:00, and calculates a movement frequency between the summary whereabouts and another room. Then, the movement frequency analyzing unit 1052 extracts an associated room on the basis of the movement frequency extraction level of the summary condition.

In this way, the movement frequency analyzing unit 1052 calculates the number of movements between the summary whereabouts and another room for resident A in each of the time zones of 6:00 to 10:00, 10:00 to 14:00, 14:00 to 18:00, and 18:00 to 22:00 as a movement frequency, and extracts an associated room having a movement frequency corresponding to the movement frequency extraction level designated in the summary condition.

In step ST1806, if the movement frequency analyzing unit 1052 determines that there is no unprocessed time zone ("NO" in step ST1806), the process proceeds to step ST1807, and the movement frequency analyzing unit 1052 determines whether or not there is an unprocessed resident (step ST1807).

In step ST1807, if the movement frequency analyzing unit 1052 determines that there is an unprocessed resident ("YES" in step ST1807), the process returns to step ST1801, and the subsequent processes are repeated. That is, the movement frequency analyzing unit 1052 specifies the next resident as a movement frequency analysis target resident, calculates the movement frequency for each time zone, and extracts associated rooms for the movement frequency analysis target resident.

The movement frequency analyzing unit 1052 performs the above processes for all the residents included in the post-occupancy-time-analysis information output from the occupancy time analyzing unit 1051.

In step ST1807, if the movement frequency analyzing unit 1052 determines that there is no unprocessed resident ("NO" in step ST1807), the movement frequency analyzing unit 1052 adds information regarding the extracted associated room and movement frequency to the post-occupancy-time-analysis information, stores the information as important room information in the storage unit 20, and outputs the information to the figure generating unit 106.

FIG. 20 is a diagram illustrating an example of important room information output from the movement frequency analyzing unit 1052 to the figure generating unit 106 in the first embodiment.

As illustrated in FIG. 20, the important room information is obtained by adding information regarding the associated room extracted by the movement frequency analyzing unit 1052 on the basis of the movement frequency to the post-occupancy-time-analysis information (see FIG. 17). Note that, for simple description, FIG. 20 does not illustrate the number of movements between rooms other than the summary whereabouts and the total number of movements between the rooms in each time zone.

When adding information regarding an associated room to the post-occupancy-time-analysis information on the basis of the movement frequency, the movement frequency analyzing unit 1052 sets information regarding an accumulated value of the occupancy time of each resident in the added associated room as important room information. The movement frequency analyzing unit 1052 only needs to acquire information regarding an accumulated value of the occupancy time of each resident in the associated room extracted by itself from the occupancy time analyzing unit 1051. The movement frequency analyzing unit 1052 sets information regarding the movement frequency between the summary whereabouts and the associated room set in the post-occupancy-time-analysis information in the important room information.

Now, return to the flowchart of FIG. 8.

In step ST805 of FIG. 8, as described with reference to FIGS. 14 to 17, the occupancy time analyzing unit 1051 calculates the degree of occupancy time for each resident in each time zone, extracts summary whereabouts and an associated room in each time zone, and generates post-occupancy-time-analysis information.

In step ST806 of FIG. 8, as described with reference to FIGS. 18 to 20, the movement frequency analyzing unit 1052 calculates a movement frequency between the summary whereabouts and another room for each resident for each time zone, and extracts an associated room in each time zone. Then, the movement frequency analyzing unit 1052 adds information regarding the associated room extracted by itself to the post-occupancy-time-analysis information, and sets the information as important room information.

In the example described above, for example, the important room extracting unit 105 extracts "kitchen" as summary whereabouts of resident A in a time zone of 6:00 to 10:00, and extracts "living room", "private room A", "dining room", and "washroom" as associated rooms by the processes in step ST805 and step ST806 in FIG. 8 (see FIG. 20).

In step ST806, the figure generating unit 106 determines the areas of figure regions of figures representing summary whereabouts and an associated room, and a distance between the figure regions on the basis of the important room information output from the movement frequency analyzing unit 1052, and generates drawing figure data for displaying the figures representing the summary whereabouts and an associated room (step ST807).

Specifically, the figure generating unit 106 generates drawing figure data for displaying a figure representing summary whereabouts for each time zone as a parent node on the time axis, and displaying a figure representing an associated room below the figure representing the summary whereabouts in a hierarchical structure.

In the first embodiment, the figure generating unit 106 generates drawing figure data by regarding a figure representing each of summary whereabouts and associated rooms as a circle. Note that this is merely an example, and the figures representing summary whereabouts and an associated room can be each, for example, an arbitrary figure such as a circle or a quadrangle, and can be preset appropriately by a user.

Figure 21:
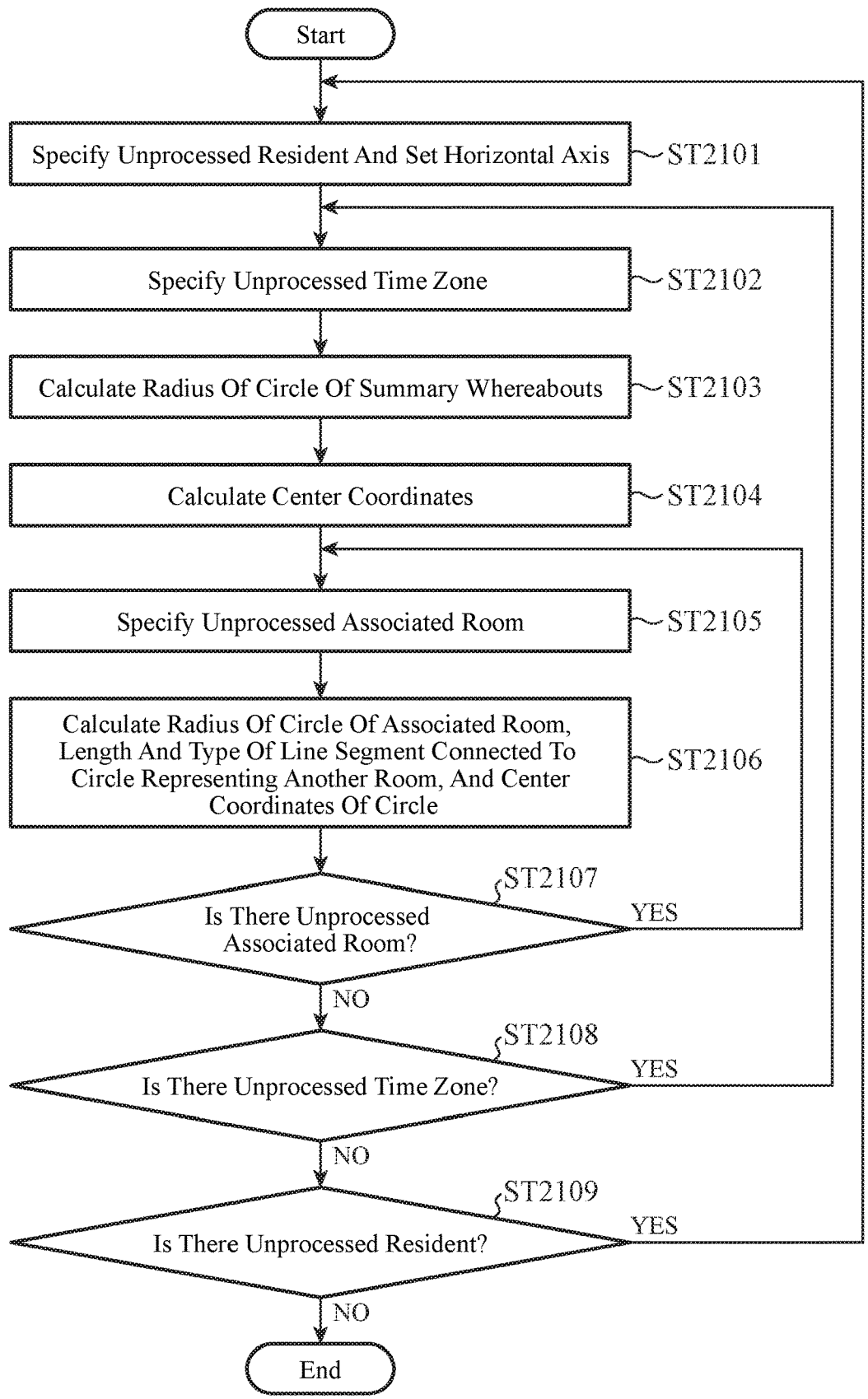
FIG. 21 is a flowchart for explaining details of an operation of generating drawing figure data by a figure generating unit in the first embodiment.

Here, FIG. 21 is a flowchart for explaining details of an operation of generating drawing figure data by the figure generating unit 106 in the first embodiment.

First, the figure generating unit 106 specifies an unprocessed resident (hereinafter referred to as "drawing target resident") on the basis of the important room information output from the movement frequency analyzing unit 1052 in step ST805. The figure generating unit 106 generates time axis data for drawing a scale for each time zone with the horizontal axis as the time axis (step ST2101). For example, in the above example, the figure generating unit 106 specifies resident A and generates time axis data for drawing a scale indicating four time zones of 6:00 to 10:00, 10:00 to 14:00, 14:00 to 18:00, and 18:00 to 22:00.

Subsequently, the figure generating unit 106 specifies an unprocessed time zone (hereinafter referred to as "drawing target time zone") for the drawing target resident specified in step ST2101 (step ST2102). For example, the figure generating unit 106 specifies the time zone of 6:00 to 10:00 on January 15 as the drawing target time zone.

The figure generating unit 106 determines the size of a figure region of a figure representing the drawing target summary whereabouts on the basis of the degree of occupancy time for the summary whereabouts in the drawing target time zone specified in step ST2102 (hereinafter referred to as "drawing target summary whereabouts") (step ST2103). Specifically, the figure generating unit 106 calculates the radius of a circle representing the drawing target summary whereabouts on the basis of the following (formula 1), and determines the size of the circle representing the drawing target summary whereabouts.

(Radius of circle representing drawing target summary whereabouts)=(accumulated value of occupancy time in drawing target summary whereabouts in time zone to be processed)/(unit time)*(constant)    (formula 1)

For example, for resident A, the summary whereabouts in the time zone of 6:00 to 10:00 is "kitchen", and an accumulated value of occupancy time in "kitchen" in the time zone of 6:00 to 10:00 calculated by the occupancy time analyzing unit 1051 is one hour and 19 minutes (=79 minutes) (see FIGS. 16, 17, and the like). Therefore, the figure generating unit 106 calculates the radius of a circle representing "kitchen" on the basis of (formula 1) as follows.

(Radius of circle representing kitchen)=79/240*300=98.75

Note that the constant is 300 in this case.

Then, the figure generating unit 106 calculates coordinates on the time axis for arranging the figure representing the drawing target summary whereabouts at the center time of the drawing target time zone on the time axis data generated in step ST2101 with respect to the drawing target summary whereabouts (step ST2104). Specifically, the figure generating unit 106 calculates the center coordinates of a circle representing the drawing target summary whereabouts.

Here, FIGS. 22A to 22C are diagrams for explaining an example of a specific operation of calculating center coordinates of a circle representing summary whereabouts and a circle representing an associated room to be drawn by the figure generating unit 106 in the first embodiment.

The figure generating unit 106 calculates the center coordinates of a circle representing the drawing target summary whereabouts by an operation as described below. The figure generating unit 106 also calculates center coordinates of a circle representing a drawing target associated room described later by an operation as described below.

For the summary whereabouts, the figure generating unit 106 sets the midpoint on a line segment of the target time zone of the summary whereabouts (for example, a scale of 6:00 to 10:00 in FIG. 22A) as center coordinates of a circle representing the summary whereabouts (see FIG. 22A).

As for an associated room, the figure generating unit 106 calculates the center coordinates of a circle representing an associated room as follows.

The number of associated rooms is assumed to be N.

The center coordinates of associated whereabouts at i=1 are calculated as follows.

In a case of N=1, by setting Θ to 90, the center coordinates of associated room 1 are calculated from the length of line segment 1 connecting summary whereabouts and the associated room 1 and the center coordinates of the summary whereabouts (see FIG. 22B).

In a case of N≥2, the process starts from Θ=Θ0. (Θ0 is an initial value. For example, Θ0=50).

In a case of associated room 1, by setting Θ to Θ0, the arrangement of the first associated room 1 is determined as described above.

In a case of associated room 2, by setting Θ to Θ0+δ, the center coordinates of a circle representing associated room 2 are calculated from the radius of a circle connecting associated whereabouts 2 and summary whereabouts and the center coordinates of the summary whereabouts. When associated room 2 is arranged at the calculated center coordinates, it is checked whether the circle representing associated room 2 overlaps with the circle representing associated room 1. A common method (determination of intersections between figures) is used for determining the overlap.

If there is no overlap, the center coordinates are settled.

If there is an overlap, associated room 2 is arranged at a position not overlapping with associated room 1 by increasing or decreasing δ by a small amount. (It depends on a side on which the overlapping opponent's circle is present whether to increase or decrease δ)

In a case of associated room i, Θ=Θ0+(i−1) δ is satisfied.

Here, δ=(180−2Θ)/(N−1) is satisfied.

In a similar manner to the case in associated room 2, an overlap with a surrounding circle is determined, and if there is an overlap, fine adjustment is performed.

The process is repeated until i=N.

In the above example, Θ0 is 50, but another value may be used as Θ0. (See FIG. 22C for the above)

Now, return to the flowchart of FIG. 21.

The figure generating unit 106 specifies an unprocessed associated room (hereinafter referred to as "drawing target associated room") among the associated rooms associated with the drawing target summary whereabouts on the basis of the important room information output from the movement frequency analyzing unit 1052 (step ST2105).

For example, the figure generating unit 106 first acquires "living room" as the drawing target associated room.

The figure generating unit 106 calculates the radius of a circle representing the drawing target associated room acquired in step ST2105, the length and type of a line segment obtained by connecting a circle representing the drawing target associated room to a circle representing another room, and the center coordinates of the circle representing the drawing target associated room on the time axis data generated in step ST2101 (step ST2106).

Figure 23:
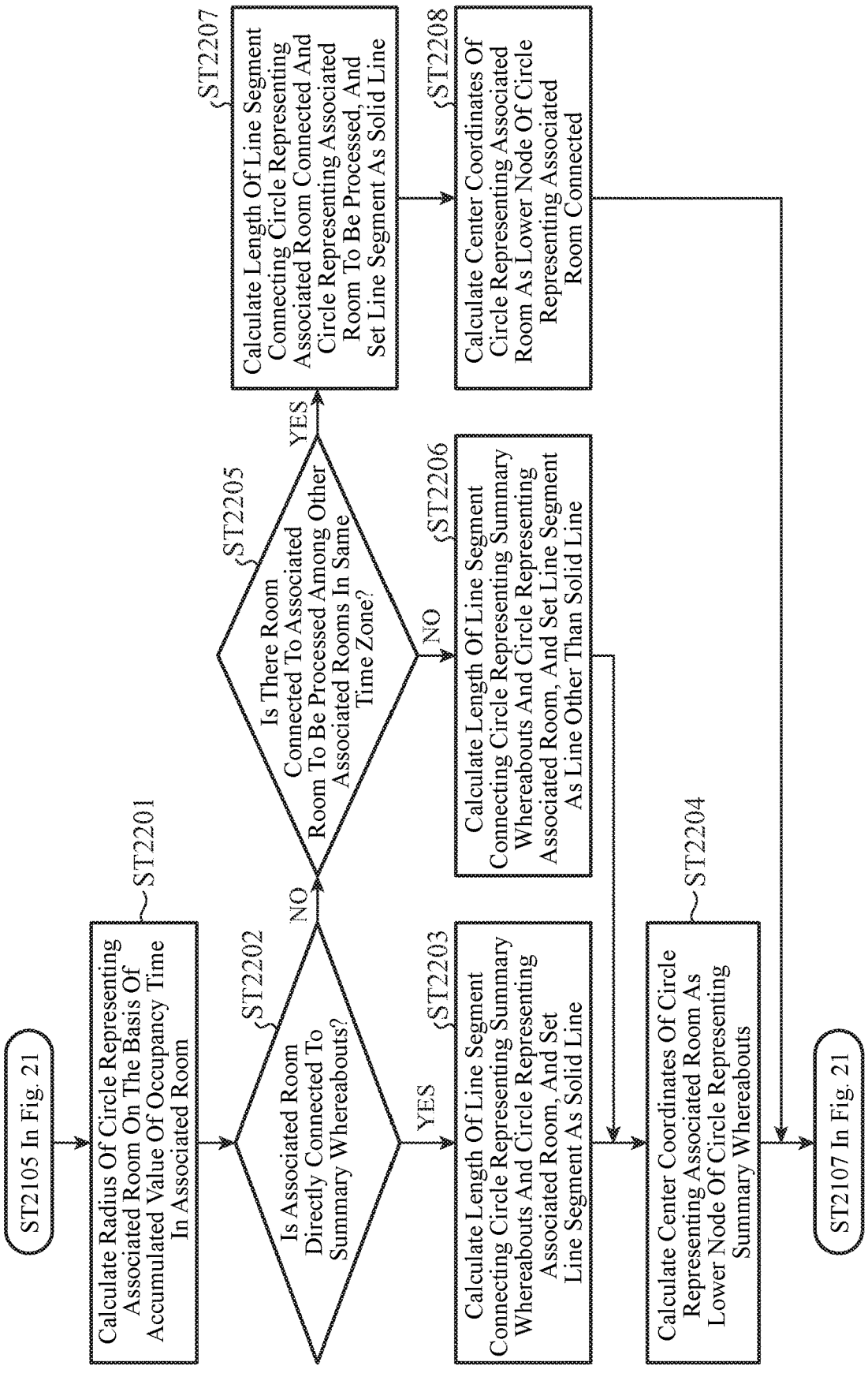
FIG. 23 is a flowchart for explaining details of an operation of a figure generating unit in step ST2106 of FIG. 21 in the first embodiment.

Here, FIG. 23 is a flowchart for explaining details of an operation of the figure generating unit 106 in step ST2106 of FIG. 21 in the first embodiment.

First, the figure generating unit 106 calculates the radius of a circle representing the drawing target associated room specified in step ST2105 in FIG. 21 on the basis of an accumulated value of occupancy time during which the drawing target resident stayed in the drawing target associated room in the important room information (see step 806 in FIG. 8) acquired from the important room extracting unit 105 on the basis of the following (formula 2) (step ST2201).

(Radius of circle representing drawing target associated room)=(accumulated value of occupancy time in drawing target associated room in drawing target time zone)/(unit time)*(constant)    (formula 2)

Currently, the drawing target associated room is "living room", and the accumulated value of time during which resident A who is the drawing target resident stayed in the "living room" in the time zone of 6:00 to 10:00 that is the drawing target time zone is 54 minutes (see FIG. 20).

Therefore, the figure generating unit 106 calculates the radius of a circle representing "living room" on the basis of (formula 2) as follows.

(Radius of circle representing living room)=54/240*300=67.5

Note that the constant is 300 here.

Subsequently, the figure generating unit 106 refers to the building structure file 201 stored in the storage unit 20, and determines whether the drawing target associated room is directly connected to the drawing target summary whereabouts (step ST2202). Specifically, the figure generating unit 106 determines whether a resident can directly move between the drawing target associated room and the drawing target summary whereabouts without passing through another room.

In step ST2202, if the figure generating unit 106 determines that the drawing target associated room is directly connected to the drawing target summary whereabouts ("YES" in step ST2202), the process proceeds to step ST2203.

In step ST2202, if the figure generating unit 106 determines that the drawing target associated room is not directly connected to the drawing target summary whereabouts ("NO" in step ST2202), the process proceeds to step ST2205.

For example, if the contents of the building structure file 201 are as illustrated in FIG. 2, "living room" that is the drawing target associated room is not directly connected to "kitchen" that is the drawing target summary whereabouts. Therefore, the process proceeds to step ST2205.

In step ST2205, the figure generating unit 106 determines whether or not there is an associated room directly connected to the drawing target associated room (hereinafter referred to as "connection associated room") among the other associated rooms in the drawing target time zone (step ST2205).

In step ST2205, if the figure generating unit 106 determines that there is a connection associated room ("YES" in step ST2205), the process proceeds to step ST2207.

In step ST2205, if the figure generating unit 106 determines that there is no connection associated room ("NO" in step ST2205), the process proceeds to step ST2206.

According to the building structure file 201 (FIG. 2), in the time zone of 6:00 to 10:00, among associated rooms other than "living room", that is, among "washroom", "dining room", and "private room A", "dining room" is directly connected to "living room". Therefore, the process proceeds to step ST2207.

In step ST2207, the figure generating unit 106 calculates the length of a line segment connecting a circle representing the drawing target associated room and a circle representing the connection associated room, and sets the type of the line segment as a solid line (step ST2207).

In the above example, in step ST2207, the figure generating unit 106 calculates the length of a line segment connecting a circle representing "living room" that is a drawing target associated room and a circle representing "dining room" that is a connection associated room of "living room".

Note that the figure generating unit 106 calculates the length of a line segment connecting a circle representing the drawing target associated room and a circle representing the connection associated room on the basis of a movement frequency between the rooms. Specifically, the figure generating unit 106 calculates the length of a line segment connecting a circle representing the drawing target associated room and a circle representing the connection associated room on the basis of the following (formula 3). In the following (formula 3), "room 1" represents the drawing target associated room, and "room 2" represents the connection associated room.

(Length of line segment connecting circle representing room 1 and circle representing room 2)= (Total number of movements between rooms in drawing target time zone)/(number of movements between room 1 and room 2 in drawing target time zone)*(constant)   (formula 3)

In the above example, for example, if resident A has moved once between "living room" and "dining room" in the time zone of 6:00 to 10:00, and the total number of movements between rooms in the time zone of 6:00 to 10:00 is 20, the figure generating unit 106 calculates the length of a line segment connecting a circle representing "living room" and a circle representing "'dining room" as follows on the basis of (formula 3).

(Length of line segment connecting circle representing living room and circle representing dining room)=20/1*20=200

The constant is 20 here.

The figure generating unit 106 sets a line segment connecting a circle representing "living room" and a circle representing "dining room" as a solid line.

The figure generating unit 106 calculates the center coordinates of a circle representing a drawing target associated room using the circle representing the drawing target associated room as a lower node of a circle representing a connection associated room (step ST2208).

That is, the figure generating unit 106 calculates the center coordinates of a circle representing "living room" using the circle representing "living room" as a lower node of a circle representing "dining room". The process in the case where the drawing target associated room is "living room" is thus completed.

The processes in step ST2203 to step ST2204 and the process in step ST2215 will be described later with a specific example. Now, return to the flowchart of FIG. 21.

In step ST2107, the figure generating unit 106 determines whether or not there is an unprocessed associated room (step ST2107).

In step ST2107, if the figure generating unit 106 determines that there is no unprocessed associated room ("NO" in step ST2107), the process proceeds to step ST2108.

In step ST2107, if the figure generating unit 106 determines that there is an unprocessed associated room ("YES" in step ST2107), the process returns to step ST2105, and the subsequent processes are repeated. That is, the figure generating unit 106 specifies the next unprocessed associated room as a drawing target associated room, and calculates the radius of a circle representing the drawing target associated room or the like (step ST2106).

In the above example, since there is "private room A" as an unprocessed associated room, the figure generating unit 106 specifies "private room A" as a drawing target associated room (step ST2105) and performs the process in step ST2106.

Details of the process in step ST2106 for the "private room A" will be described again with reference to FIG. 23. Note that the detailed description of the contents already described in the process in FIG. 23 is omitted.

In step ST2201, the figure generating unit 106 calculates the radius of a circle representing "private room A" on the basis of an accumulated value of occupancy time in "private room A" on the basis of (formula 2) as follows.

(Radius of circle representing private room $A$)=40/ 240*300=50

Subsequently, the figure generating unit 106 refers to the building structure file 201 (see FIG. 2), and determines whether "private room A" that is a drawing target associated room is directly connected to "kitchen" that is drawing target summary whereabouts (step ST2202).

A resident needs to move through corridors or stairs from "kitchen" on the first floor to "private room A" on the second floor. Therefore, the figure generating unit 106 determines that "kitchen" and "private room A" are not directly connected to each other ("NO" in step ST2202), and the process proceeds to step ST2205.

The figure generating unit 106 determines whether there is a connection associated room of "private room A" that is a drawing target associated room among the other associated rooms in the drawing target time zone (step ST2205).

Since there is no connection associated room of "private room A", the process proceeds to step ST2206.

In step ST2206, the figure generating unit 106 calculates the length of a line segment connecting a circle representing the drawing target summary whereabouts and a circle representing the drawing target associated room, and sets the type of the line segment as a line other than a solid line (for example, dotted line) (step ST2206).

Specifically, the figure generating unit 106 calculates the length of a line segment connecting a circle representing "kitchen" that is drawing target summary whereabouts and a circle representing "private room A" that is a drawing target associated room on the basis of (formula 3) as follows.

The figure generating unit 106 sets the type of a line segment connecting a circle representing "kitchen" and a circle representing "private room A" as a dotted line.

(Length of line segment connecting circle representing kitchen and circle representing private room A)=20/1*20=200

Subsequently, the figure generating unit 106 calculates the center coordinates of a circle representing a drawing target associated room using the circle representing the drawing target associated room as a lower node of a circle representing drawing target summary whereabouts (step ST2204).

That is, the figure generating unit 106 calculates the center coordinates of a circle representing "private room A" using the circle representing "private room A" as a lower node of a circle representing "kitchen".

The process in the case where the drawing target associated room is "private room A" is thus completed.

Now, return to the flowchart of FIG. 21. The figure generating unit 106 performs the process for "dining room" and "washroom" which are the remaining associated rooms by similar procedures.

For example, in a case where "dining room" is a drawing target associated room, in step ST2201 of FIG. 23, the figure generating unit 106 calculates the radius of a circle representing the "dining room" on the basis of (formula 2) as follows.

(Radius of circle representing dining room)=21/240*300=26.25

Since "dining room" is directly connected to "kitchen" that is drawing target summary whereabouts ("YES" in step ST2202 in FIG. 23), the process proceeds to step ST2203.

In step ST2203, the figure generating unit 106 calculates the length of a line segment connecting a circle representing the drawing target summary whereabouts and a circle representing the drawing target associated room, and sets the type of the line segment as a solid line (step ST2203).

Specifically, the figure generating unit 106 calculates the length of a line segment connecting a circle representing "kitchen" that is drawing target summary whereabouts and a circle representing "dining room" that is a drawing target associated room on the basis of (formula 3) as follows.

(Length of line segment connecting circle representing kitchen and circle representing dining room)
=20/5*20=80

The figure generating unit 106 sets the type of a line segment connecting a circle representing "kitchen" and a circle representing "dining room" as a solid line.

In step ST2204, the figure generating unit 106 calculates the center coordinates of a circle representing "dining room" using the circle representing "dining room" as a lower node of a circle representing "kitchen".

The process in the case where the drawing target associated room is "dining room" is thus completed.

Also in a case where "washroom" is set as a drawing target associated room, a similar process to that in the case where "dining room" is set as a drawing target associated room is performed. That is, the figure generating unit 106 performs the processes in step ST2201 to step ST2204.

Specifically, the figure generating unit 106 calculates the radius of a circle representing "washroom" on the basis of an accumulated value of occupancy time of resident A in "washroom" in the time zone of 6:00 to 10:00 (step ST2201). Note that the building structure file 201 illustrated in FIG. 2 illustrates a part of the floor plan, and therefore does not illustrate the washroom. However, it is assumed that the washroom is directly connected to the kitchen ("YES" in step ST2202).

Next, the figure generating unit 106 calculates the length of a line segment connecting a circle representing "kitchen" and a circle representing "associated room" on the basis of a movement frequency between "kitchen" and "washroom", and sets the line segment as a solid line (step ST2203).

Then, the figure generating unit 106 calculates the center coordinates of a circle representing "washroom" using the circle representing "washroom" as a lower node of a circle representing "kitchen".

As described above, the figure generating unit 106 determines a positional relationship between a circle representing "kitchen" that is summary whereabouts and circles representing "living room" "private room A", "washroom", and "dining room" that are associated room, and the length, type, and color of a line segment connecting these circles for resident A in the time zone of 6:00 to 10:00. The figure generating unit 106 sets an appropriate color for a circle representing each room by changing the color for each room.

Figure 24:
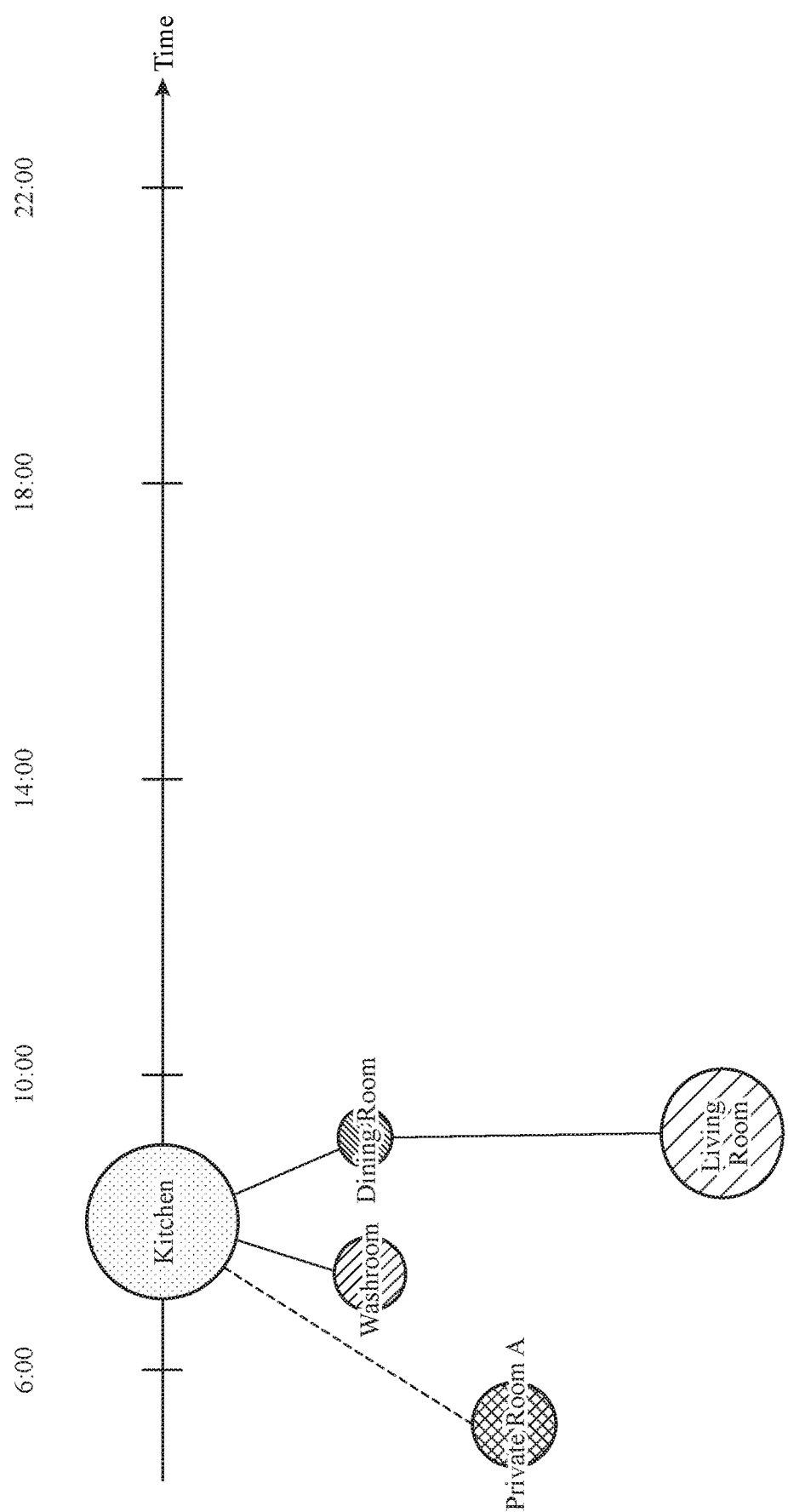
FIG. 24 is a diagram illustrating an image displaying drawing figure data generated by a figure generating unit in the first embodiment.

FIG. 24 is a diagram illustrating an image displaying drawing figure data generated by the figure generating unit 106 in the first embodiment.

Note that FIG. 24 illustrates an image displaying drawing figure data in a case where the figure generating unit 106 determines a circle representing summary whereabouts, a circle representing each associated room, and the length, type, and the like of a line segment connecting the rooms in the time zone of 6:00 to 10:00 as in the above example, and generates the drawing figure data in the time zone of 6:00 to 10:00.

As illustrated in FIG. 24, the figure generating unit 106 can generate drawing figure data for drawing a room name in each of circles representing summary whereabouts and associated rooms.

Now, return to the flowchart of FIG. 21.

Drawing figure data is generated for summary whereabouts and all associated rooms in the time zone specified in step ST2102. When there is no unprocessed associated room in the specified time zone ("NO" in step ST2107), the figure generating unit 106 determines whether or not there is an unprocessed time zone (step ST2108).

In step ST2108, if the figure generating unit 106 determines that there is no unprocessed time zone ("NO" in step ST2108), the process proceeds to step ST2109.

In step ST2108, if the figure generating unit 106 determines that there is an unprocessed time zone ("YES" in step ST2108), the process returns to step ST2102, and the subsequent processes are repeated. That is, the figure generating unit 106 specifies the next unprocessed time zone as a drawing target time zone, and generates drawing figure data for displaying summary whereabouts of the drawing target resident and associated rooms in the drawing target time zone.

Currently, there is an unprocessed time zone. Therefore, the process returns to step ST2102, and the figure generating unit 106 specifies the time zone of 10:00 to 14:00 as the next drawing target time zone, and the processes after step ST2103 are performed. Since the processes after step ST2103 are similar to the operation described above, detailed description thereof is omitted. As described above, the figure generating unit 106 generates drawing figure data for all the time zones indicated by the important room information output from the important room extracting unit 105 in the time zones of 6:00 to 10:00, 10:00 to 14:00, 14:00 to 18:00, and 18:00 to 22:00.

In step ST2109, the figure generating unit 106 determines whether or not there is an unprocessed resident (step ST2109).

In step ST2109, if the figure generating unit 106 determines that there is no unprocessed resident ("NO" in step ST2109), the process ends.

In step ST2109, if the figure generating unit 106 determines that there is an unprocessed resident ("YES" in step ST2109), the process returns to step ST2101, and the subsequent processes are repeated. That is, the figure generating unit 106 specifies the next unprocessed resident as a drawing target resident, and generates drawing figure data for displaying summary whereabouts and associated rooms of the drawing target resident in each time zone.

Since the processes after step ST2102 are similar to the processes described above, detailed description thereof is omitted.

As described above, the figure generating unit 106 generates drawing figure data for displaying summary whereabouts and associated rooms of all the residents in each time zone.

Note that in the above description, the "constant" of the formula for calculating the radius of a circle or the length of a line segment connecting the circles is not a fixed value. For example, a user can change "constant" depending on the resolution or screen size of the display device 4 for displaying the drawing figure data generated by the figure generating unit 106. The process of displaying the drawing figure data on the display device 4 will be described later.

The figure generating unit 106 stores the drawing figure data created as a result of the operation described with reference to FIGS. 21 and 23 in the storage unit 20 and outputs the drawing figure data to the behavior information imparting unit 107.

Here, FIG. 25 is a diagram illustrating an example of contents of drawing figure data generated by the figure generating unit 106 in the first embodiment.

As illustrated in FIG. 25, the drawing figure data is associated with drawing figure data regarding summary whereabouts and drawing figure data regarding each associated room for each resident. The drawing figure data regarding summary whereabouts and the drawing figure data regarding each associated room each include a room name, the radius of a circle representing the room, the center coordinates of a circle representing the room, the length and type of a line segment connecting the room and another room, and information regarding a room to be connected. Note that the drawing figure data also includes time axis data although not illustrated in FIG. 25.

Now, return to the flowchart of FIG. 8.

On the basis of the behavior information stored in the behavior history storage unit 209 of the storage unit 20 and a summary condition, the behavior information imparting unit 107 extracts behavior deeply associated with a resident in the summary whereabouts and an associated room for each time zone, and associates information regarding the extracted behavior with the drawing figure data output in step ST807. (Step ST808).

Figure 26:
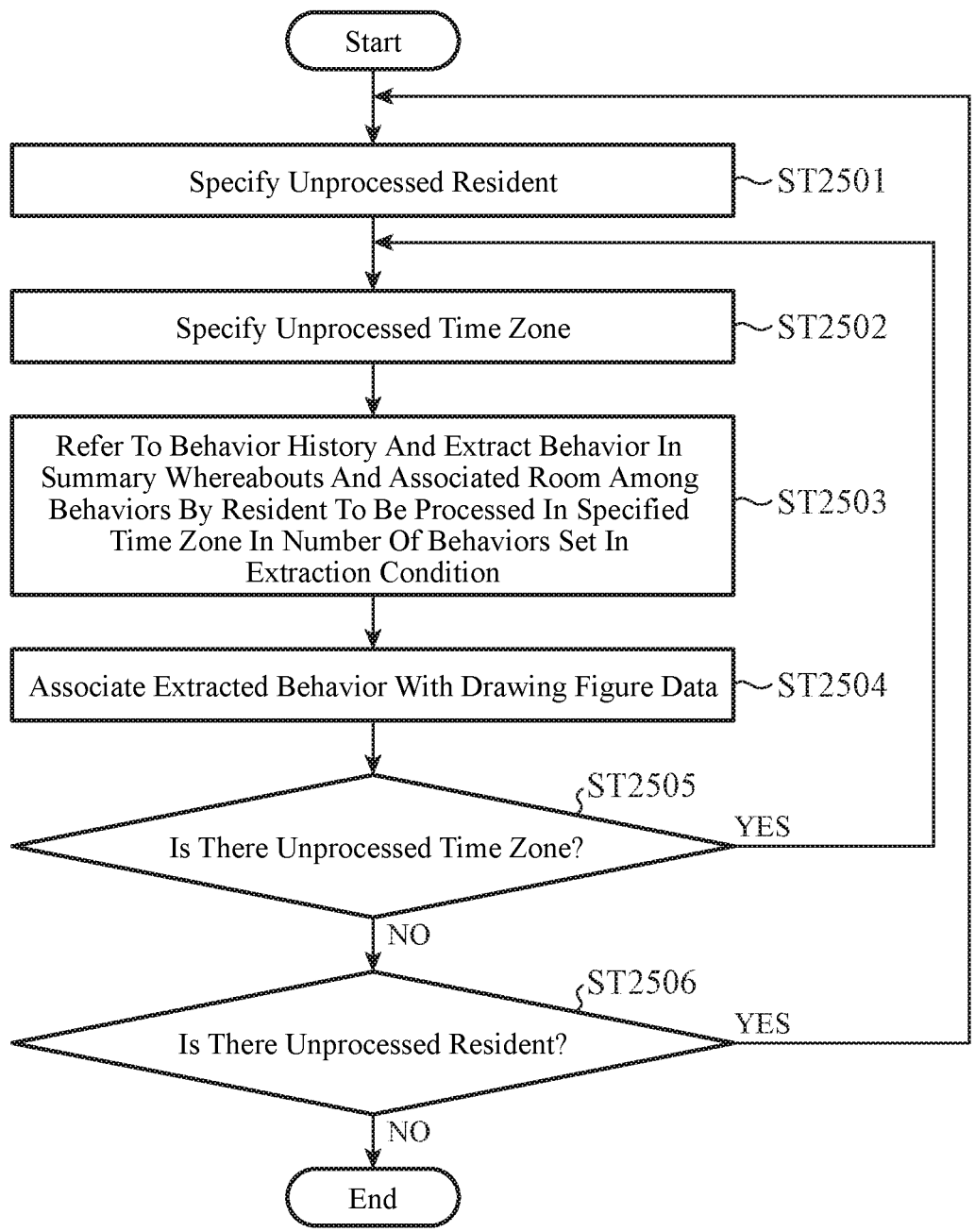
FIG. 26 is a flowchart for explaining details of an operation of a behavior information imparting unit in step ST808 in the first embodiment.

Here, FIG. 26 is a flowchart for explaining details of an operation of the behavior information imparting unit 107 in step ST808 in the first embodiment.

The behavior information imparting unit 107 specifies an unprocessed resident (hereinafter referred to as "behavior imparting target resident") on the basis of the drawing figure data output from the figure generating unit 106 in step ST807 (step ST2501).

For example, the behavior information imparting unit 107 specifies resident A as a behavior imparting target resident.

Subsequently, the behavior information imparting unit 107 specifies an unprocessed time zone (hereinafter referred to as "behavior imparting target time zone") for the behavior imparting target resident specified in step ST2501 (step ST2502).

For example, the behavior information imparting unit 107 specifies the time zone of 6:00 to 10:00 on January 15 as a behavior imparting target time zone.

The behavior information imparting unit 107 refers to the behavior information stored in the behavior history storage unit 209 of the storage unit 20, and extracts behavior in summary whereabouts and behavior in each associated room among behaviors of the behavior imparting target resident specified in step ST2501 in the behavior imparting target time zone specified in step ST2502 on the basis of an extraction condition (step ST2503).

For example, the behavior information imparting unit 107 extracts behavior of resident A in "kitchen" that is summary whereabouts of resident A and behavior of resident A in "living room", "private room A", "washroom", and "dining room" that are associated rooms in the time zone of 6:00 to 10:00. At this time, if there is a plurality of behaviors in summary whereabouts and each associated room, the behavior information imparting unit 107 extracts behavior in such a manner that an upper limit of the number of behaviors extracted is the number of behaviors designated in the extraction condition (F) in the summary condition set by the summary condition setting unit 104 (see step ST804). In the summary condition, since "3" is designated in the extraction condition (F), the behavior information imparting unit 107 extracts the top three behaviors at maximum.

Note that determination criterion for determining what kind of behavior is determined as main behavior of a resident is preset in the extraction condition (F) in the summary condition by the summary condition setting unit 104 (see step ST804).

The behavior information imparting unit 107 extracts the behavior determined as main behavior of resident A in summary whereabouts and each associated room by the number designated in the extraction condition (F) on the basis of the determination criterion set in the extraction condition (F).

For example, if "the total number of times of behaviors performed in a target time zone" is set as a determination criterion for determining main behavior of a resident in (F)

in the summary condition, among behaviors performed by resident A in the summary whereabouts and each associated room in the time zone of 6:00 to 10:00, the behavior information imparting unit 107 extracts the top three behaviors in descending order of the total number of behaviors performed.

As a result, for example, it is assumed that the behavior information imparting unit 107 has extracted the behavior as illustrated in FIG. 27 as the behavior of resident A in "kitchen", "living room", "private room A", "washroom", and "dining room". Specific examples illustrated in the subsequent processes will be also described by assuming that the behavior information imparting unit 107 has extracted the behavior as illustrated in FIG. 27.

The behavior information imparting unit 107 adds the information regarding each behavior extracted in step ST2503 to the drawing figure data (see FIG. 25) output by the figure generating unit 106 as attribute information, and thereby associates the drawing figure data with the information regarding each behavior extracted in ST2503 (step ST2504).

FIG. 28 is a diagram illustrating an example of contents of drawing figure data associated with information regarding behavior as attribute information by the behavior information imparting unit 107 in the first embodiment.

FIG. 28 illustrates, as an example, a case where the behavior information imparting unit 107 associates attribute information with the drawing figure data as illustrated in FIG. 25.

As illustrated in FIG. 28, for example, behavior of "cooking" extracted as behavior for "kitchen" that is summary whereabouts is associated as attribute information of a circle representing "kitchen". Similarly, for example, behavior of "sitting together in a circle and chatting happily" and "watching television" is associated as attribute information of a circle representing "living room" that is an associated room.

The behavior information imparting unit 107 determines whether or not there is an unprocessed time zone (step ST2505).

In step ST2505, if the behavior information imparting unit 107 determines that there is no unprocessed time zone ("NO" in step ST2505), the process proceeds to step ST2506.

In step ST2505, if the behavior information imparting unit 107 determines that there is an unprocessed time zone ("YES" in step ST2505), the process returns to step ST2502, and the subsequent processes are repeated.

Currently, there is an unprocessed time zone. Therefore, the process returns to step ST2502, and the behavior information imparting unit 107 specifies, as the next time zone, the time zone of 10:00 to 14:00 as a behavior imparting target time zone, and extracts behavior performed in summary whereabouts and each associated room among behaviors of resident A in a similar manner to the time zone of 6:00 to 10:00. Then, the behavior information imparting unit 107 associates information regarding the extracted behavior with the drawing figure data as attribute information.

As described above, the processes in step ST2502 to step ST2505 are repeated for resident A until there is no unprocessed time zone. That is, the behavior information imparting unit 107 associates information regarding behavior as attribute information with the drawing figure data for resident A in all the time zones of 6:00 to 10:00, 10:00 to 14:00, 14:00 to 18:00, and 18:00 to 22:00.

In step ST2506, the behavior information imparting unit 107 determines whether or not there is an unprocessed resident (step ST2506).

In step ST2506, if the behavior information imparting unit 107 determines that there is no unprocessed resident ("NO" in step ST2506), the process ends.

In step ST2506, if the behavior information imparting unit 107 determines that there is an unprocessed resident ("YES" in step ST2506), the process returns to step ST2501, and the subsequent processes are repeated. That is, the behavior information imparting unit 107 repeats the processes after step ST2502 using resident B as a behavior imparting target resident. Since the processes after step ST2502 are similar to the contents described above, detailed description thereof is omitted.

As described above, the behavior information imparting unit 107 associates information regarding behavior as attribute information with the drawing figure data for all the time zones for all the residents.

The behavior information imparting unit 107 stores the drawing figure data associated with the information regarding behavior in the storage unit 20 and outputs the drawing figure data to the associated information imparting unit 108.

Now, return to the flowchart of FIG. 8.

The associated information imparting unit 108 extracts associated information deeply associated with a resident in summary whereabouts and an associated room for each time zone on the basis of the device information stored in the device information history storage unit 204, the sensor information stored in the sensor information history storage unit 205, and other information stored in the other information history storage unit 206, and associates the extracted associated information with the drawing figure data output in step ST808 and associated with the information regarding behavior (step ST809). The associated information includes device information, sensor information, and information such as an image or a video.

Figure 29:
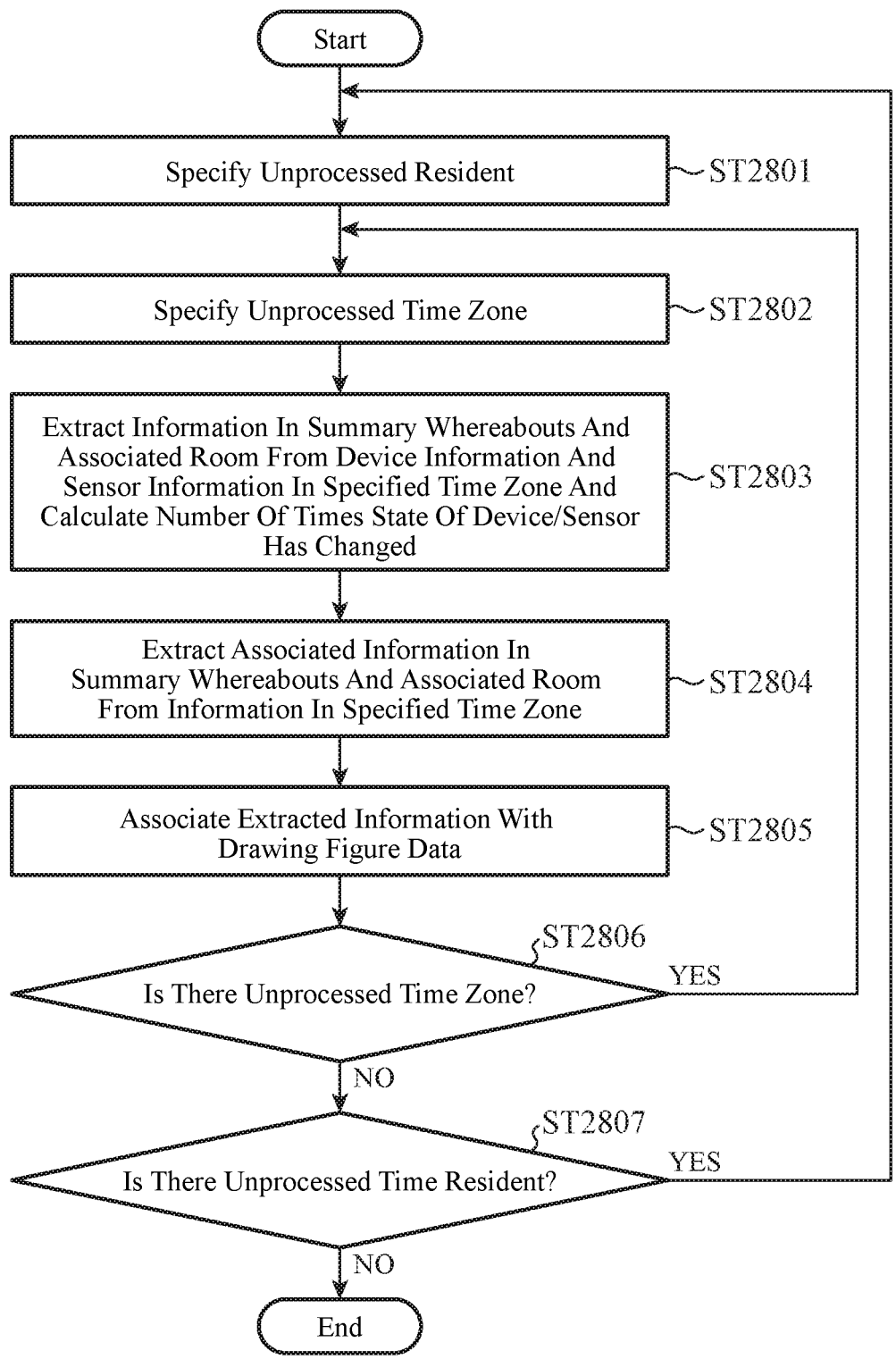
FIG. 29 is a flowchart for explaining details of an operation of an associated information imparting unit in step ST809 in the first embodiment.

Here, FIG. 29 is a flowchart for explaining details of an operation of the associated information imparting unit 108 in step ST809 in the first embodiment.

The behavior information imparting unit 107 specifies an unprocessed resident (hereinafter referred to as "association imparting target resident") on the basis of the drawing figure data output from the figure generating unit 106 in step ST807 (step ST2801).

For example, the associated information imparting unit 108 specifies resident A as an association imparting target resident.

Subsequently, the associated information imparting unit 108 specifies an unprocessed time zone (hereinafter referred to as "association imparting target time zone") regarding the association imparting target resident specified in step ST2801 (step ST2802).

For example, the associated information imparting unit 108 specifies the time zone of 6:00 to 10:00 on January 15 as an association imparting target time zone.

The associated information imparting unit 108 calculates the number of times the state of the device 3 or the sensor 2 has changed in summary whereabouts and each associated room in the association imparting target time zone specified in step ST2802 on the basis of the device information stored in the device information history storage unit 204 and the sensor information stored in the sensor information history storage unit 205 (step ST2803).

Specifically, the associated information imparting unit 108 calculates the number of times the state of the device 3 or the sensor 2 has changed in "kitchen" that is summary whereabouts of resident A in the time zone of 6:00 to 10:00 and "living room", "private room A", "washroom", and "dining room" that are associated rooms.

Hereinafter, an operation by the associated information imparting unit 108 in step ST2803 will be described in detail.

First, an operation of calculating the number of times the state of the device 3 or the sensor 2 has changed in "kitchen" that is summary whereabouts of resident A in the time zone of 6:00 to 10:00 by the associated information imparting unit 108 will be described.

The associated information imparting unit 108 refers to the device information and the sensor information, and extracts the device information and the sensor information acquired from "kitchen" among pieces of the device information and pieces of the sensor information in the time zone of 6:00 to 10:00. Then, the associated information imparting unit 108 calculates the number of times the state of the device 3 or the sensor 2 has changed on the basis of the extracted device information and sensor information.

The associated information imparting unit 108 only needs to determine whether information is the device information and sensor information acquired from "kitchen" on the basis of the layout information file 202 stored in the storage unit 20. The layout information file 202 defines a room in which the device 3 or the sensor 2 is installed (see FIG. 3).

In the device information, information acquired when the state of the device 3 was changed, for example, when lighting installed in the living room was turned ON, is associated with information regarding date and time when information was acquired (for example, see FIG. 4). In the device information, information regarding a change in state, for example, information indicating that a door of a refrigerator installed in the kitchen has opened, is also associated with information regarding date and time when information was acquired.

Therefore, the associated information imparting unit 108 determines, for example, from the layout information file 202 that a refrigerator is installed in "kitchen", and can determine that information indicating that a door of the refrigerator has opened, set in the device information is information obtained from "kitchen".

The associated information imparting unit 108 calculates the number of times the state of the device 3 or the sensor 2 has changed in "kitchen" by counting the number of records of the device information and the sensor information acquired from "kitchen" in the time zone of 6:00 to 10:00.

For example, the associated information imparting unit 108 extracts device information and sensor information in "kitchen" in the time zone of 6:00 to 10:00, and counts the number of times the state of the device 3 or the sensor 2 has changed. As a result, the associated information imparting unit 108 obtains the following information regarding the number of times of state changes.

(A) Number of times the refrigerator has opened and closed 6 times
(B) Lighting ON once
(C) Air conditioner ON once
(D) Room temperature 20 degrees
(E) IH cooking heater ON twice
(F) Ventilation fan ON once Note that the associated information imparting unit 108 calculates the number of times the state of the sensor 2 has changed as described above in a case where the sensor 2 is a sensor 2 (type A) for detecting an operation of a resident.

In a case where the sensor 2 is a sensor 2 of a type (type B) for measuring a physical quantity, such as a temperature sensor, the associated information imparting unit 108 acquires a final result in the time zone of 6:00 to 10:00 that is an association imparting target time zone. In a case where the sensor 2 is a sensor 2 of a type (type B) for measuring a physical quantity, such as a temperature sensor, the detection unit 101 periodically collects information at preset time intervals. Therefore, the associated information imparting unit 108 regards that the number of times the state of the sensor 2 has changed is zero. Then, the associated information imparting unit 108 acquires a final result in the association imparting target time zone, that is, the information collected by the detection unit 101 at 10:00 from each sensor 2.

Then, since the summary condition set by the summary condition setting unit 104 (see step ST804 in FIG. 8) designates "2" as an associated information extraction condition, the associated information imparting unit 108 extracts pieces of information regarding the top two numbers of state changes at maximum in descending order of the number among the pieces of information regarding the number of state changes.

That is, the associated information imparting unit 108 extracts two pieces of information regarding the number of state changes "(A) Number of times the refrigerator has opened and closed 6 times" and "(E) IH cooking heater ON twice".

Note that, as described above, the associated information imparting unit 108 calculates the number of times the state of the sensor 2 has changed in a case where the sensor 2 is a sensor 2 of type A. Therefore, as in the example, the associated information imparting unit 108 extracts information regarding the number of state changes for the number of cases designated in the summary condition in descending order among the pieces of information regarding the number of state changes in a case where the sensor 2 is a sensor of type A. In a case of a room in which the sensor 2 of type A is not present, the associated information imparting unit 108 extracts any two pieces of information among the pieces of information collected from the sensor 2 of type B.

The associated information imparting unit 108 associates two pieces of information regarding the number of state changes "(A) Number of times the refrigerator has opened and closed 6 times" and "(E) IH cooking heater ON twice" as associated information with "kitchen" that is summary whereabouts in the drawing figure data.

The associated information imparting unit 108 regards the other information (B), (C), (D), and (F) as reference associated information, and sets a reference destination of the reference associated information. The reference destination of the reference associated information is, for example, a dialog box. The associated information imparting unit 108 associates the reference associated information and the reference destination information with "kitchen" that is summary whereabouts in the drawing figure data. Here, the reference associated information of "(B) Lighting ON", "(C) Air conditioner ON", "(D) Room temperature 20 degrees", and "(F) Ventilation fan ON", and the dialog box indicating the reference associated information are associated with the drawing data. Note that the reference associated information and the reference destination information are included in the associated information.

Similarly, the associated information imparting unit 108 calculates the number of state changes of the device 3 or the sensor 2 for "living room", "private room A", "washroom", and "dining room" that are associated rooms to obtain information regarding the number of state changes. Then, the associated information imparting unit 108 extracts information regarding the number of state changes for the number of cases designated in the associated information extraction condition among the pieces of information regarding the number of state changes, and associates the extracted information as associated information with each associated room in the drawing figure data.

Now, return to the flowchart of FIG. 29.

The associated information imparting unit 108 extracts information deeply associated with summary whereabouts and each associated room in the association imparting target time zone specified in step ST2802 as associated information on the basis of the other information stored in the other information history storage unit 206 (step ST2804).

The other information stored in the other information history storage unit 206 is an image or a moving image acquired in each time zone, text information, or the like. For example, in a case where a camera installed in a room (not illustrated in FIG. 1) takes a moving image, the moving image data taken by the camera is associated with information specifying a room, such as time and room ID, and accumulated and stored as other information. For example, in a case where a television installed in a room (not illustrated in FIG. 1) is turned ON, information regarding a program being watched on the television is associated with information such as time and room ID, and accumulated and stored as other information. Note that information indicating that the television has been turned ON is stored as device information in the device information history storage unit 204 in this case.

For example, such other information only needs to be generated on the basis of information received from a camera, a television, or the like installed in a room by an associated information storage control unit (not illustrated in FIG. 1) and to be stored in the other information history storage unit 206.

The associated information imparting unit 108 associates the associated information extracted in step ST2803 and the associated information extracted in step ST2804 with the drawing figure data as attribute information (step ST2805).

FIG. 30 is a diagram illustrating an example of contents of drawing figure data associated with associated information as attribute information by the associated information imparting unit 108 in the first embodiment.

FIG. 30 illustrates, as an example, a case where the associated information imparting unit 108 associates associated information with the drawing figure data (see FIG. 28) to which information regarding behavior has been imparted by the behavior information imparting unit 107.

As illustrated in FIG. 30, for example, moving image data taken in "kitchen" is associated as associated information of "kitchen". Similarly, for example, information extracted on the basis of environmental information acquired in each associated room is associated as associated information of "living room" that is an associated room. Note that device information, sensor information, and other information referred to when the associated information imparting unit 108 extracts associated information are collectively referred to as environmental information.

The associated information imparting unit 108 determines whether or not there is an unprocessed time zone (step ST2806).

In step ST2806, if the associated information imparting unit 108 determines that there is no unprocessed time zone ("NO" in step ST2806), the process proceeds to step ST2807.

In step ST2806, if the associated information imparting unit 108 determines that there is an unprocessed time zone ("YES" in step ST2806), the process returns to step ST2802, and the subsequent processes are repeated.

Currently, there is an unprocessed time zone. Therefore, the process returns to step ST2802, and the associated information imparting unit 108 specifies, as the next time zone, the time zone of 10:00 to 14:00 as an association imparting target time zone, extracts information regarding the number of times the state of the device 3 or the sensor 2 has changed, other information, and the like as associated information in a similar manner to the time zone of 6:00 to 10:00, and associates the extracted information with drawing figure data.

As described above, the processes in step ST2802 to step ST2806 are repeated for resident A until there is no unprocessed time zone. That is, the associated information imparting unit 108 associates associated information as attribute information with the drawing figure data for resident A in all the time zones of 6:00 to 10:00, 10:00 to 14:00, 14:00 to 18:00, and 18:00 to 22:00.

In step ST2807, the associated information imparting unit 108 determines whether or not there is an unprocessed resident (step ST2807).

In step ST2807, if the associated information imparting unit 108 determines that there is no unprocessed resident ("NO" in step ST2807), the process ends.

In step ST2807, if the associated information imparting unit 108 determines that there is an unprocessed resident ("YES" in step ST2807), the process returns to step ST2801, and the subsequent processes are repeated. That is, the associated information imparting unit 108 repeats the processes after step ST2802 using resident B as an association imparting target resident. Since the processes after step ST2802 are similar to the contents described above, detailed description thereof is omitted.

As described above, the associated information imparting unit 108 associates associated information as attribute information with the drawing figure data for all the time zones for all the residents.

The associated information imparting unit 108 stores the drawing figure data associated with the associated information in the storage unit 20 and outputs the drawing figure data to the drawing unit 109.

Now, return to the flowchart of FIG. 8.

The drawing unit 109 displays a circle representing summary whereabouts for each time zone on the time axis as a parent node on the display device 4 on the basis of the drawing figure data output from the associated information imparting unit 108 in step ST809, and further displays a circle representing an associated room of the summary whereabouts below the circle representing the summary whereabouts in a hierarchical structure (step ST810).

FIG. 31 is a diagram illustrating an example of a screen displayed on the display device 4 by the drawing unit 109 in the first embodiment.

FIG. 31 illustrates, as an example, a result of analyzing a room that is whereabouts of a resident A by dividing a period of 6:00 to 22:00 on Jan. 15, 2017 by every four hours as a unit time in the above-described example.

FIG. 31 illustrates that the summary whereabouts is "kitchen" in the time zone of 6:00 to 10:00, "living room" in the time zone of 10:00 to 14:00, "private room A" in the time zone of 14:00 to 18:00", and "kitchen" in the time zone of 18:00 to 22:00.

In FIG. 31, as described above in the description of the operation of the figure generating unit 106 (see FIGS. 23, 24, and the like), the length of occupancy time during which each resident A stayed in each room in each time zone is reflected in the size of each circle representing summary whereabouts or each associated room. As described above in the description of the operation of the figure generating unit 106, the magnitude of the number of movements between rooms is reflected in a line segment connecting circles representing summary whereabouts and associated rooms.

For example, FIG. 31 illustrates the following contents for the time zone of 6:00 to 10:00.

(1-1) Summary whereabouts of resident A in the time zone of 6:00 to 10:00 is "kitchen", and the "kitchen" is a room where the occupancy time of resident A was the longest in the time zone of 6:00 to 10:00.

(1-2) A magnitude relationship of an accumulated value of occupancy time among summary whereabouts and associated rooms is expressed on the basis of the sizes of circles representing the summary whereabouts and associated rooms, a relationship of kitchen>living room>private room A>washroom>dining room is satisfied.

(1-3) The movement frequency of resident A between "kitchen" and "washroom" and the movement frequency of resident A between "kitchen" and "dining room" are higher than the movement frequency of resident A between "dining room" and "living room" or the movement frequency of resident A between "kitchen" and "private room A".

By confirming the screen as illustrated in FIG. 31, a user can understand how resident A spent in the time zone of 6:00 to 10:00 as follows from the contents of (1-1) to (1-3).

(2-1) Resident A stayed in "kitchen" for the longest time, and stayed in "living room" or "private room A" for the second longest time after the kitchen.

(2-2) The total time during which resident A stayed in "washroom" and the total time during which resident A stayed in "dining room" are shorter than the time during which resident A stayed in "living room" or "private room A". However, resident A frequently moved between each of "washroom" and "dining room" and "kitchen".

As described above, the behavior information imparting unit 107 associates information regarding behavior with the drawing figure data (see FIGS. 26, 28, and the like), and the associated information imparting unit 108 associates associated information with the drawing figure data (see FIGS. 29, 30, and the like).

Therefore, the drawing unit 109 can switch the content of the screen to be displayed on the display device 4 from the contents for displaying whereabouts as illustrated in FIG. 31 to the contents for displaying behavior or associated information on the basis of the drawing figure data.

Specifically, when screen switching instruction information is output from the reception unit 30, the drawing unit 109 switches the contents of a screen to be displayed on the display device 4 on the basis of the screen switching instruction information.

For example, by operating an input device and clicking a radio button for instructing screen switching on the screen, a user inputs a screen switch instruction to desired display contents. At this time, for example, the user operates the input device and also inputs information indicating desired display contents after switching. Note that a method for inputting information indicating desired display contents after switching is not limited thereto, and a user may select desired display contents after switching, for example, from a pop-up displayed list screen of display contents using the input device. On the list screen of the display contents, for example, information indicating the contents of a screen to be displayed on the display device 4, such as "display behavior" or "display associated information", is displayed. For example, when a user clicks a radio button for instructing screen switching using the input device, the drawing unit 109 only needs to display the pop-up screen as described above on the display device 4.

When receiving the switching instruction input from the user, the reception unit 30 outputs screen switching instruction information to the drawing unit 109. The drawing unit 109 switches a screen on the basis of the screen switching instruction information.

The screen switching instruction information includes information indicating desired display contents after switching, instructed by a user.

The drawing unit 109 can switch the contents of a screen to be displayed on the display device 4 for all the nodes in a batch or only for a node designated by a user. Note that the node refers to a figure representing summary whereabouts or each associated room.

When inputting a screen switching instruction to desired display contents, a user can select whether to perform switching for all the nodes in a batch or only for a designated node. For example, the drawing unit 109 displays "all node batch switching button" and "designated node switching button" together on the list screen of the display contents, and a user only needs to select whether to perform switching for all the nodes in a batch or only for a designated node from the list screen. When a user selects "designated node switching button", the user also designates a node by clicking a node to be switched, for example.

The screen switching instruction information output from the reception unit 30 to the drawing unit 109 includes information indicating whether to switch the contents of the screen for all the nodes in a batch or only for a designated node.

Note that the method for inputting a screen switching instruction by a user as described above is merely an example, and a user may input the screen switching instruction by another method.

For example, a user may select a circle representing "kitchen" on a screen displayed on the display device 4 with a mouse, may display a menu by right-clicking and select "display behavior", and may input a switching instruction to display information regarding behavior only for the circle representing "kitchen". Alternatively, the storage unit 20 may store a file for setting a display target, and the drawing unit 109 may acquire information to be displayed by being switched from the setting file.

Hereinafter, the operation of switching the contents of a screen displayed on the display device 4 by the drawing unit 109 in the first embodiment will be described in detail with an example.

First, a case where the drawing unit 109 switches the contents of a screen to be displayed on the display device 4 in a batch for all the nodes will be described with an example.

Note that it is assumed that the screen before switching is the screen as illustrated in FIG. 31.

For example, a user clicks a radio button for instructing screen switching from a screen displayed on the display device 4.

Then, for example, it is assumed that the user selects "display behavior" from the list screen of the display contents pop-up displayed on the display device 4. Note that it is assumed that the user also selects "all node batch switching button" on the list screen of the display contents at this time.

Figure 32:
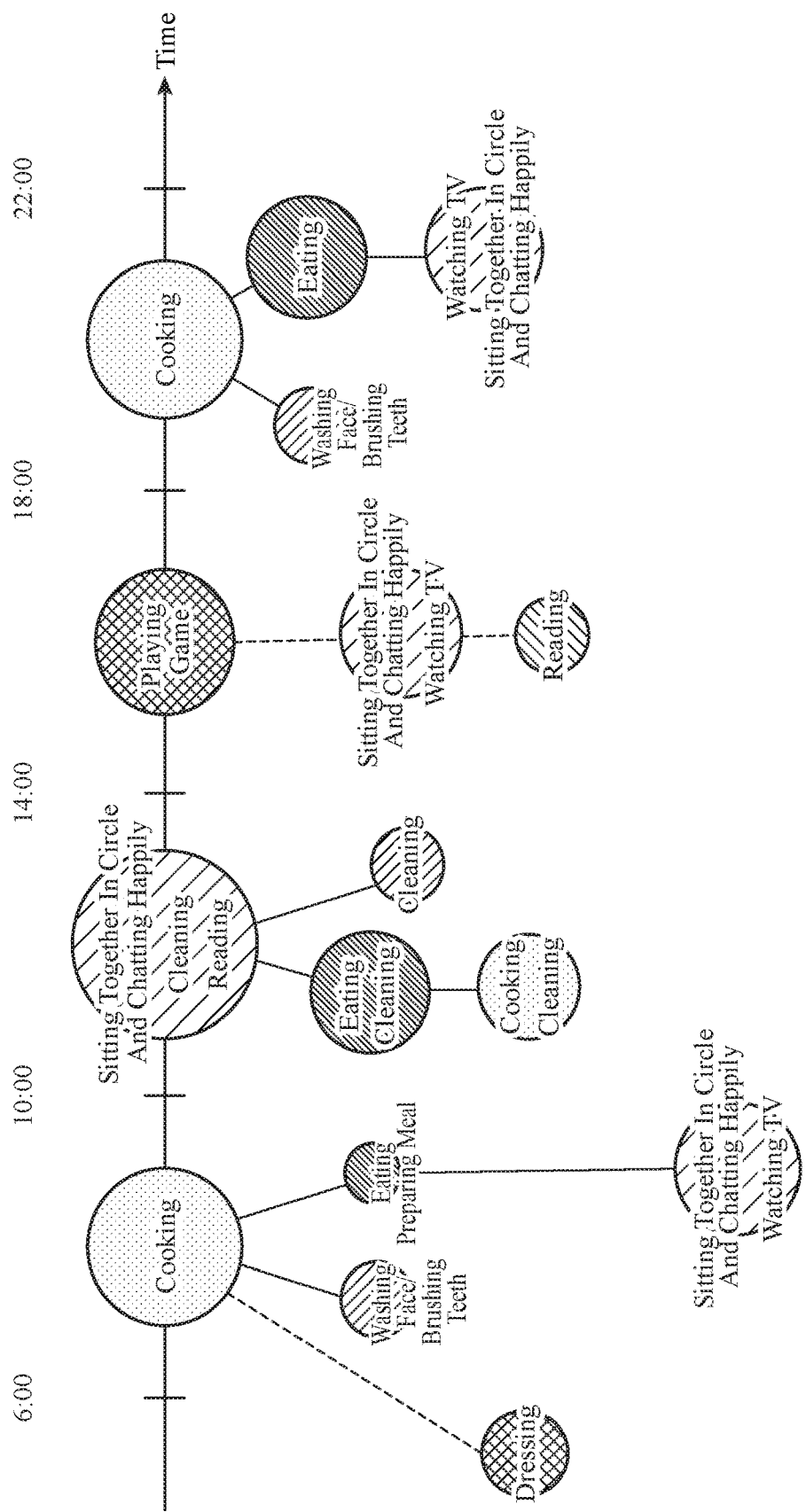
FIG. 32 is a diagram illustrating another example of the screen displayed on the display device by the drawing unit in the first embodiment.

Then, the drawing unit 109 switches from the screen as illustrated in FIG. 31 to the screen as illustrated in FIG. 32 and displays the screen on the display device 4.

In FIG. 32, information regarding behavior is displayed in circles representing summary whereabouts and associated rooms. The drawing unit 109 displays the information regarding behavior on the display device 4 on the basis of the drawing figure data. In FIG. 31, the drawing unit 109 displays a behavior name as information regarding behavior. The behavior name is appropriately preset.

For example, it is assumed that the user selects "display associated information" from the list screen of the display contents pop-up displayed on the display device 4. Note that it is assumed that the user also selects "all node batch switching button" on the list screen of the display contents at this time.

Then, the drawing unit 109 switches from the screen as illustrated in FIG. 31 to the screen as illustrated in FIG. 33A and displays the screen on the display device 4.

In FIG. 33A, information regarding associated information is displayed in circles representing summary whereabouts and associated rooms. The drawing unit 109 displays the associated information on the display device 4 on the basis of the drawing figure data.

Note that the drawing unit 109 does not display anything in a circle in a case where there is no associated information associated.

In a case where the reference associated information and the reference destination information are associated as associated information in the drawing figure data, as illustrated in FIG. 33B, the drawing unit 109 displays the reference associated information and the reference destination information on the display device 4 as associated information.

For example, in the drawing figure data, when reference associated information such as "lighting ON", "air conditioner ON", "room temperature 20 degrees", and "ventilator fan ON" is associated with a dialog box that is a reference source of the reference associated information in "kitchen" that is summary whereabouts, the drawing unit 109 first displays "other reference" indicating that there is reference associated information in a circle representing the summary whereabouts together with information indicating associated information. A user confirms the display and understands that there is associated information other than the top two. Then, in a case where the user desires to confirm details of the reference associated information, for example, the user operates the input device, clicks "other reference", and inputs a selection instruction. The reception unit 30 receives the selection instruction, and the drawing unit 109 displays a dialog box for displaying details of the reference associated information as a reference destination.

The above example illustrates a case where the drawing unit 109 switches from a screen displaying the name of whereabouts in a circle (see FIG. 31) to a screen displaying information regarding behavior in a circle (see FIG. 32), and a case where the drawing unit 109 switches from a screen displaying the name of whereabouts in a circle (see FIG. 31) to a screen displaying associated information in a circle (see FIGS. 33A and 33B). However, these are merely examples. For example, the drawing unit 109 can also switch from a screen displaying information regarding behavior in a circle (see FIG. 32) to a screen displaying associated information in a circle (see FIGS. 33A and 33B).

As described above, the drawing unit 109 can switch in such a manner that information regarding the name of whereabouts, information regarding behavior, or associated information is displayed on the basis of an instruction from a user for information to be displayed in a circle representing summary whereabouts or each associated room for each time zone.

Figure 34:
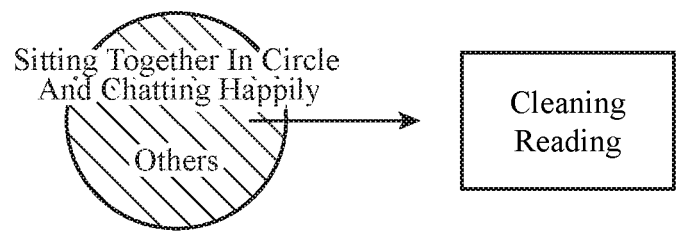
FIG. 34 is a diagram illustrating another example of the screen displayed on the display device by the drawing unit in the first embodiment.

The drawing unit 109 can change the number of pieces of information regarding behavior or associated information to be displayed in association with summary whereabouts or each associated room. For example, as illustrated in FIG. 34, the drawing unit 109 displays only one piece of information regarding behavior and displays the rest as "others" (diagram on the left side in FIG. 34). Note that FIG. 34 illustrates only a circle displaying only one piece of information regarding behavior and displaying the rest as "others" for simple description A user can input a detailed display instruction, for example, by operating an input device and clicking the circle displayed as "others". When receiving the detailed display instruction, the reception unit 30 outputs the detailed display instruction information to the drawing unit 109.

When the detailed display instruction information is output, the drawing unit 109 displays information regarding behavior collectively displayed as "others" (diagram on the right side in FIG. 34).

Note that the example illustrated in FIG. 34 illustrates the case where the drawing unit 109 displays only one piece of information regarding behavior and displays the rest as "others". However, the drawing unit 109 can perform similar control and can display only one piece of information indicating associated information and can display the rest as "others".

Next, a case where the drawing unit 109 switches the contents of a screen to be displayed on the display device 4 only for a designated node will be described with an example.

Note that it is assumed that the screen before switching is the screen as illustrated in FIG. 31.

For example, a user clicks a radio button for instructing screen switching from a screen displayed on the display device 4.

Then, for example, it is assumed that the user selects "display behavior" from the list screen of the display contents pop-up displayed on the display device 4. Note that it is assumed that the user also selects "designated node switching button" on the list screen of the display contents at this time. It is assumed that the user designates a circle representing "kitchen" in the time zone of 6:00 to 10:00 on the screen as a node to be switched.

Figure 35:
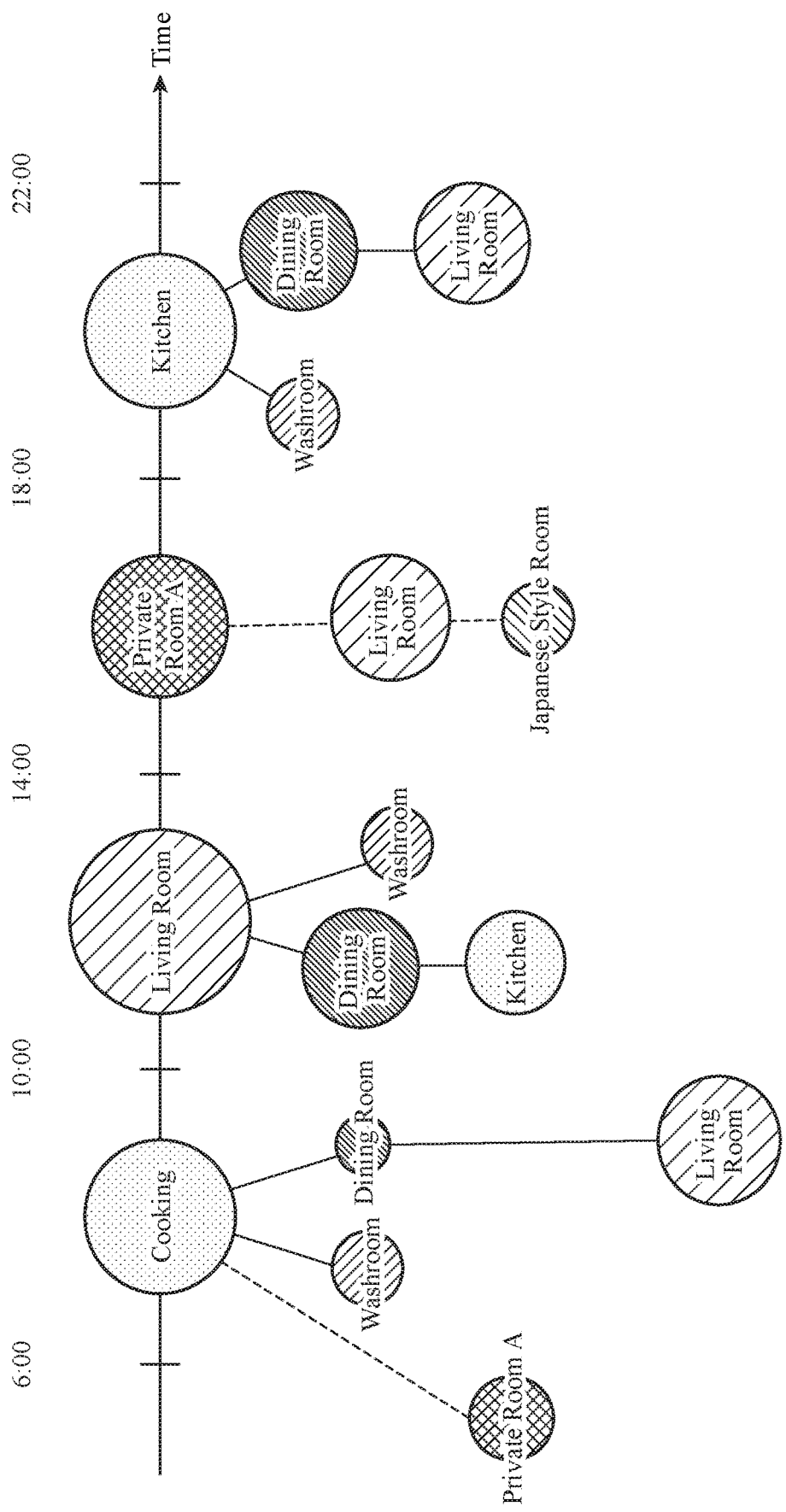
FIG. 35 is a diagram illustrating another example of the screen displayed on the display device by the drawing unit in the first embodiment.

Then, the drawing unit 109 switches from the screen as illustrated in FIG. 31 to the screen as illustrated in FIG. 35 and displays the screen on the display device 4.

In FIG. 35, information regarding behavior is displayed in a circle representing "kitchen" that is summary whereabouts in the time zone of 6:00 to 10:00.

The drawing unit 109 can also switch information to be displayed for a plurality of nodes.

For example, it is assumed that a user designates circles representing "kitchen", "private room A", "washroom", "dining room", and "living room" in the time zone of 6:00 to 10:00 on the screen.

Figure 36:
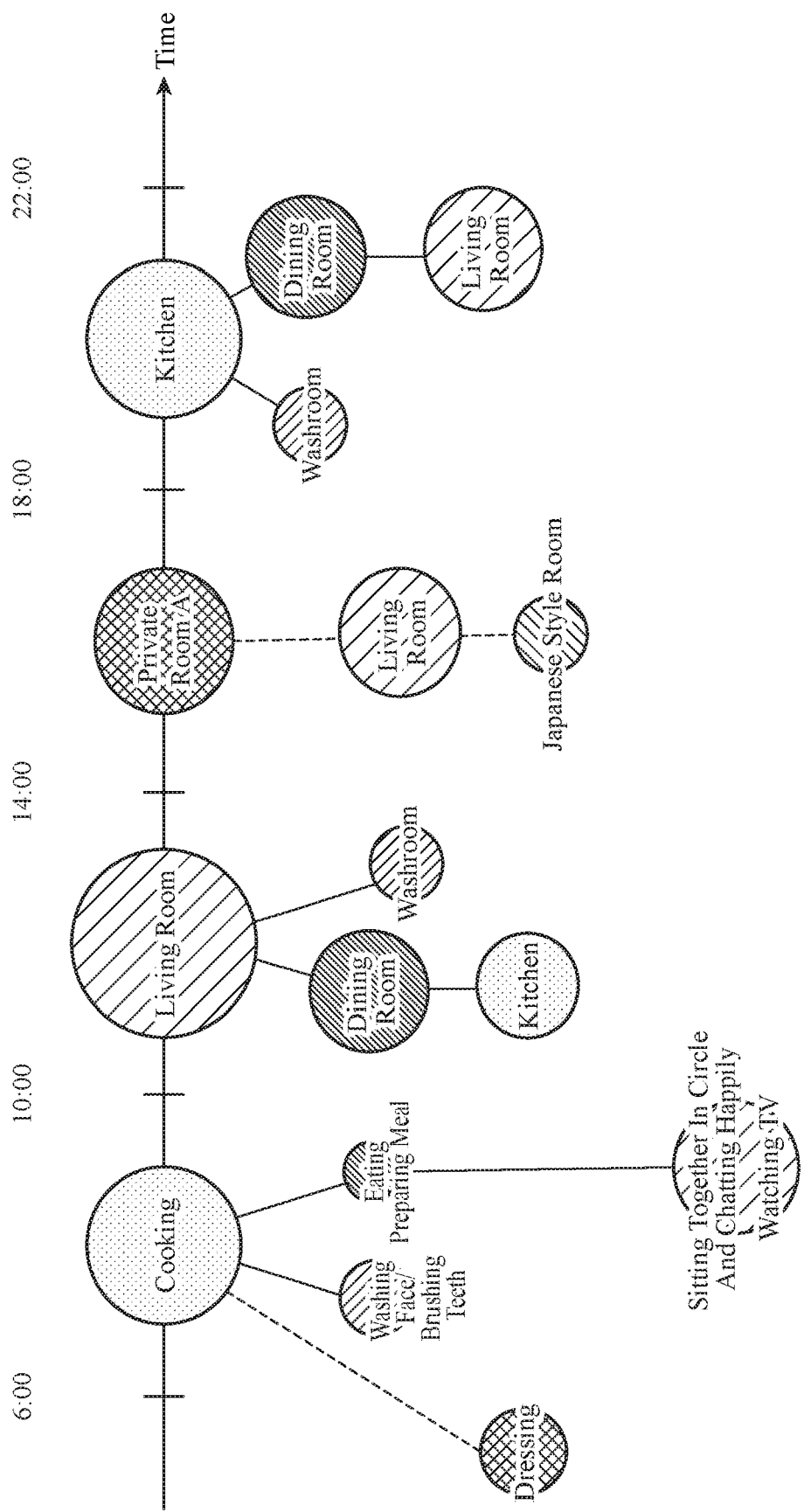
FIG. 36 is a diagram illustrating another example of the screen displayed on the display device by the drawing unit in the first embodiment.

Then, the drawing unit 109 switches from the screen as illustrated in FIG. 31 to the screen as illustrated in FIG. 36 and displays the screen on the display device 4.

For example, the drawing unit 109 can display associated information for a node designated by the user. Since a specific operation of displaying associated information is similar to that in a case where the contents of the screen to be displayed on the display device 4 are switched in a batch for all the nodes, detailed description thereof is omitted. The operation is different from that in the case where switching is performed in a batch for all the nodes only in that the drawing unit 109 displays associated information only for a designated node.

As described above, the drawing unit 109 can switch in such a manner that the name of whereabouts, information regarding behavior, or associated information is displayed only for information to be displayed in a designated circle on the basis of an instruction from a user for information to be displayed in a circle representing summary whereabouts or each associated room for each time zone.

Note that also in a case where the contents of the screen to be displayed on the display device 4 are switched only for a designated node, the drawing unit 109 can change the number of pieces of information regarding behavior or associated information to be displayed in association with summary whereabouts or each associated room (see FIG. 34).

The above describes the example in which the drawing unit 109 displays a circle representing summary whereabouts and a circle representing each associated room in a hierarchical structure. However, the drawing unit 109 can switch between display of the hierarchical structure and non-display thereof.

Specifically, for example, a user operates an input device and inputs a hierarchical instruction indicating whether to turn ON or OFF display in the hierarchical structure. When receiving the hierarchical instruction, the reception unit 30 outputs hierarchical instruction information including information indicating whether to turn ON or OFF display in the hierarchical structure to the drawing unit 109. The drawing unit 109 switches between display of the hierarchical structure and non-display thereof on the basis of the hierarchical instruction information.

For example, it is assumed that a user inputs a hierarchical instruction to turn OFF the display in the hierarchical structure from the screen as illustrated in FIG. 31. In this case, the drawing unit 109 displays a screen in which the display in the hierarchical structure is turned OFF from the screen as illustrated in FIG. 31 on the display device 4. In the first embodiment, turning OFF the display in the hierarchical structure means displaying only summary whereabouts on the time axis without displaying an associated room.

Figure 37:
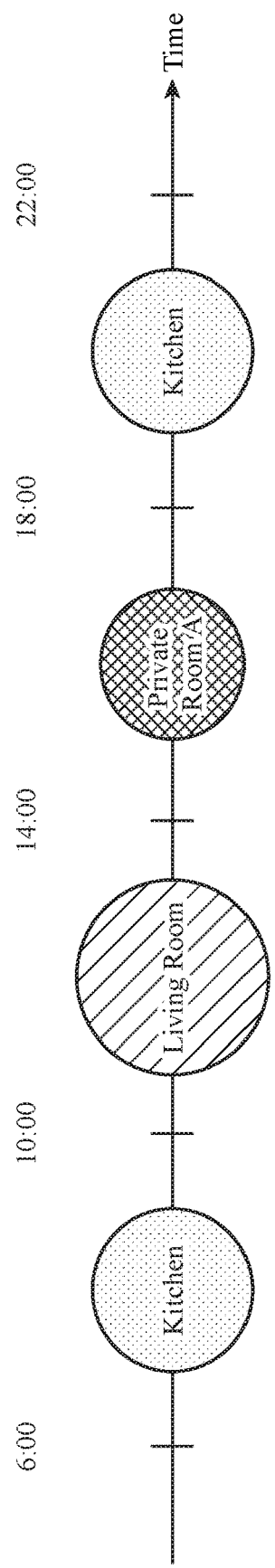
FIG. 37 is a diagram illustrating another example of the screen displayed on the display device by the drawing unit in the first embodiment.

Therefore, the drawing unit 109 switches from the screen as illustrated in FIG. 31 to the screen as illustrated in FIG. 37 and displays the screen on the display device 4.

The above describes the example in which the drawing unit 109 displays information regarding whereabouts in each time zone for one resident A per screen. However, the drawing unit 109 can also display information regarding whereabouts of a plurality of people on the same screen.

For example, a user only needs to designate residents who are targets for displaying information regarding whereabouts. The drawing unit 109 displays information regarding whereabouts of residents designated by the user on the same screen.

Figure 38:
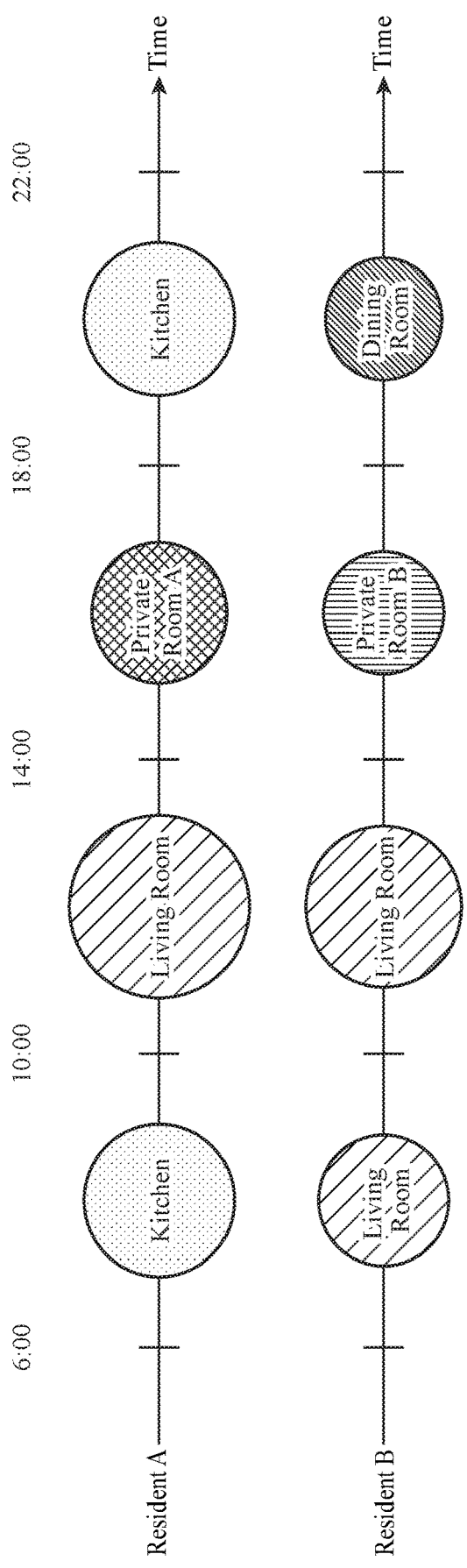
FIG. 38 is a screen example in a case where a drawing unit displays information regarding whereabouts of a plurality of people on the same screen in the first embodiment.

FIG. 38 is a screen example in a case where the drawing unit 109 displays information regarding whereabouts of a plurality of people on the same screen in the first embodiment.

In FIG. 38, information regarding whereabouts of resident A and resident B in the same time zone on the same day is displayed.

Note that FIG. 38 illustrates a screen example in a case where a user designates resident A and resident B in a state where display of the hierarchical structure is turned OFF and only summary whereabouts is displayed on the time axis.

For example, the drawing unit 109 can switch from the screen as illustrated in FIG. 31 to the screen as illustrated in FIG. 38 and can display the screen. That is, the drawing unit 109 not only switches information to be displayed in circles representing summary whereabouts and associated rooms, but also can switch a resident who is a target for displaying circles representing summary whereabouts and associated rooms.

Figure 39:
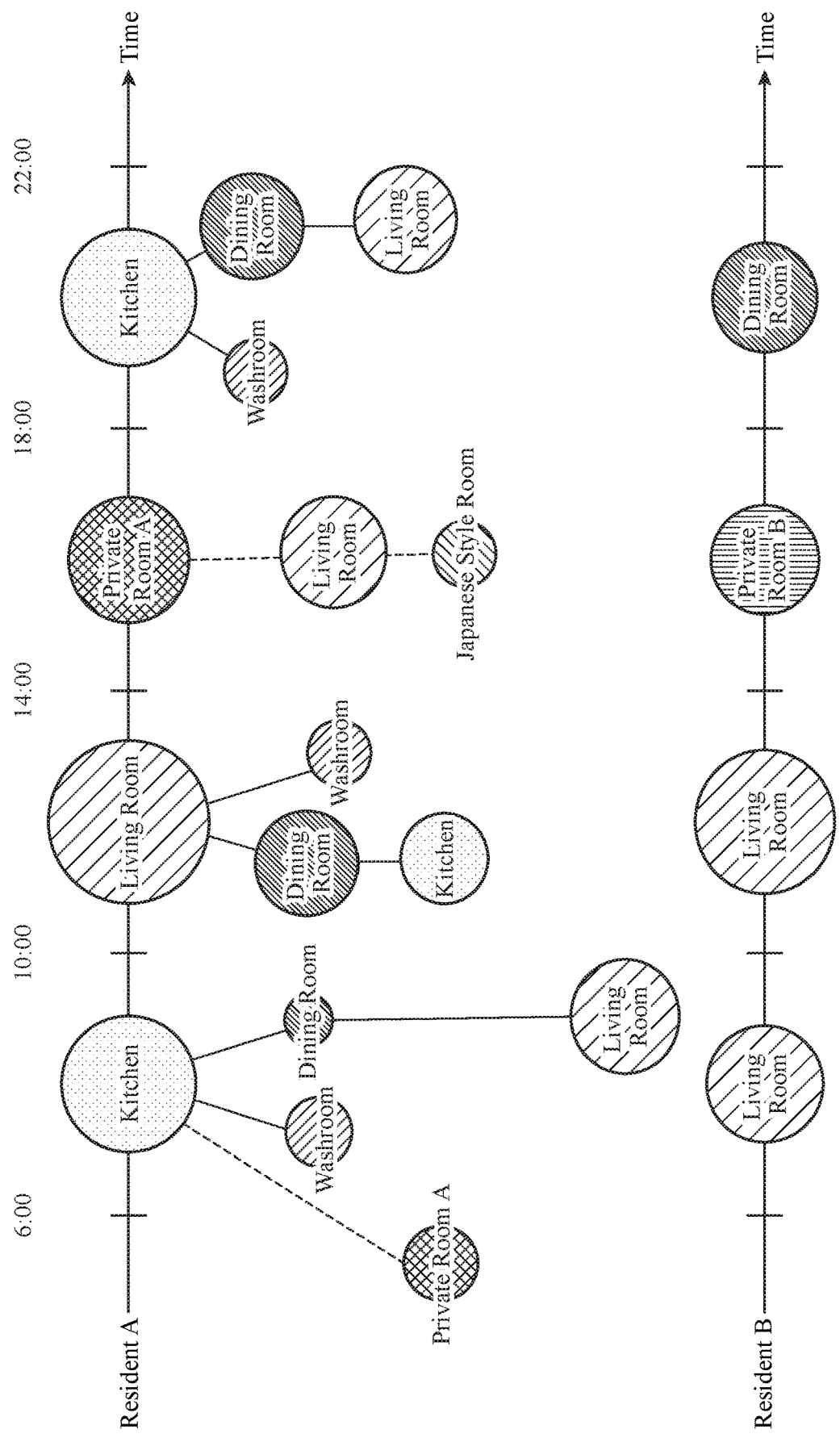
FIG. 39 is another screen example in a case where the drawing unit displays information regarding whereabouts of a plurality of people on the same screen in the first embodiment.

For example, in a case where a user designates display in the hierarchical structure to be ON for the resident A from the screen as illustrated in FIG. 38, the drawing unit 109 can switch to the screen as illustrated in FIG. 39. In this case, for example, the drawing unit 109 parallelly moves the information regarding whereabouts of resident B, which has been displayed on the screen illustrated in FIG. 38, and shifts the display position of the information regarding whereabouts of the resident B downward on the screen for display.

For example, in a case where a user further designates display in the hierarchical structure to be ON also for resident B or designates the hierarchical structure to be OFF for both residents A and B from the screen as illustrated in FIG. 39, the drawing unit 109 may switch the screen in such a manner that each associated room is displayed also for resident B or only summary whereabouts is displayed for both residents A and B on the basis of the designation from the user (see FIG. 38).

As described above, the drawing unit 109 can switch between display of the hierarchical structure to be displayed and non-display thereof depending on a resident when displaying information regarding whereabouts of a plurality of residents and information regarding each associated room.

Note that in the above example described with reference to FIGS. 38 and 39, for display of information regarding whereabouts of a plurality of people, the name of whereabouts is displayed in circles representing summary whereabouts and associated rooms. However, the information to be displayed in the circles representing summary whereabouts and associated rooms is not limited to the name of whereabouts. Also, in a case where the drawing unit 109 displays information regarding whereabouts of a plurality of people, the drawing unit 109 can display the name of whereabouts, information regarding behavior, or associated information as information to be displayed in circles representing summary whereabouts and associated rooms, and can also switch display of these pieces of information.

When a plurality of people is displayed side by side on one screen, the number of people to be displayed on one screen is arbitrary. The display device 4 can scroll, enlarge, and reduce a screen. A user only needs to confirm information regarding whereabouts of a plurality of people displayed by scrolling the screen or the like.

In the above description, the figure generating unit 106 calculates the radii of circles representing summary whereabouts and associated rooms or the length of a line segment connecting the circles on the basis of a predetermined formula.

The "constant" in the formula may be appropriately changed depending on the resolution or screen size of the display device 4.

As a result, for example, when a 24-inch monitor and a 15-inch tablet display information regarding summary whereabouts and each associated room as illustrated in FIG. 31, all the time zones are displayed on the horizontal axis on one screen.

The drawing unit 109 can also switch the screen for a node at the highest level in the hierarchy to be displayed on the display device 4. Specifically, a user inputs an instruction for a node at the highest level in the hierarchy to be displayed, and the drawing unit 109 determines the depth of the level of the node in the hierarchy to be displayed depending on the instruction.

As a result, even in a case where the level in the hierarchy is deep, it is possible to display only a level in the hierarchy desired by the user without displaying all the levels in the hierarchy, and visibility of the node can be improved.

In the first embodiment described above, in the behavior visualization device 1, one day that is a target period is divided by unit time, such as a time zone of 6:00 to 10:00. However, this is merely an example, and the unit for dividing the target period is not limited to hour. For example, in a case where a plurality of days is used as the target period, a plurality of days can be used as a unit for dividing the plurality of days. For example, a 1-week unit is used for one month, or a 1-month unit is used for one year.

In the first embodiment described above, the behavior visualization device 1 displays a result of analyzing, for each resident, whereabouts deeply associated with the resident, main behavior performed in the whereabouts, or associated information indicating association between the whereabouts deeply associated with the resident and the behavior. However, this is merely an example, and the behavior visualization device 1 can display a result of analyzing, for each group including a plurality of people, whereabouts deeply associated with the group, main behavior performed in the whereabouts, or associated information.

In this case, in each process of the important room extracting unit 105 and the figure generating unit 106 described in the above first embodiment (see FIGS. 14, 18, 21, 26, 29, and the like), the operation processed for each resident is replaced with an operation processed for every resident belonging to the group.

For example, when the occupancy time analyzing unit 1051 of the important room extracting unit 105 calculates an accumulated value of occupancy time of each room, in the above description, the accumulated value is calculated for one occupancy time analysis target resident (see FIG. 14). However, this operation is replaced with an operation for calculating an accumulated value of occupancy times of a plurality of residents belonging to the group. Similarly, for example, with respect to the movement frequency calculation operation in the movement frequency analyzing unit 1052 of the important room extracting unit 105, the movement frequency analyzing unit 1052 is replaced with an operation of summing up the movement frequencies of a plurality of residents belonging to the group.

FIG. 40 is a screen example in which the behavior visualization device 1 displays a result of analyzing deeply associated whereabouts, behavior, or associated information for every group including a plurality of people on the display device 4 in the first embodiment.

The above first embodiment describes, as an example, that the whereabouts estimating unit 102 estimates whereabouts of a resident on the basis of the sensor information acquired by the detection unit 101 from the human sensor (see FIG. 11 and the like). However, the sensor information used by the whereabouts estimating unit 102 for estimating whereabouts of a resident is not limited to that by the human sensor. The whereabouts estimating unit 102 may estimate whereabouts of a resident on the basis of sensor information acquired by the detection unit 101 from the sensor 2 other than the human sensor, such as a pressure sensor or a door opening/closing sensor.

In the first embodiment described above, as an example, the behavior visualization device 1 summarizes behavior of a target resident in each room in a house, but limitation thereto is not intended. The behavior visualization device 1 can summarize behavior in any target space. Examples of the any space include a store, a public space, a high-rise building, a factory, a school, a hospital, an office, and a facility.

In the first embodiment described above, as an example of the device 3, a home appliance, lighting, or the like installed in a house is assumed. However, as described above, the space including target whereabouts is not limited to a house. Therefore, the device 3 is also a device depending on a space including target whereabouts. A device depending on a space including target whereabouts is defined by the layout information file 202 or the like.

In the first embodiment described above, as an example, the behavior visualization device 1 summarizes behavior of a resident in each room in a house, but the whereabouts where behavior of a target is analyzed is not limited to "room". For example, the behavior visualization device 1 may analyze behavior of a target for each floor number such as the first floor or the second floor of a building, or may analyze behavior of a target for each specific area in a floor of a building. For example, the behavior visualization device 1 may analyze behavior of a target for each store of a shopping mall, or may analyze behavior of a target for each corner in a sales floor. For example, the behavior visualization device 1 may analyze behavior of a target for each work area of a factory.

In the first embodiment described above, in the behavior visualization device 1, when the drawing unit 109 displays a result of analyzing deeply associated whereabouts, behavior, or associated information for each resident on the display device 4, the drawing unit 109 arranges a figure representing summary whereabouts at the central time of each time zone on the time axis, but this is merely an example. For example, the drawing unit 109 may arrange a figure representing summary whereabouts at the first time of each time zone.

Figure 41A:
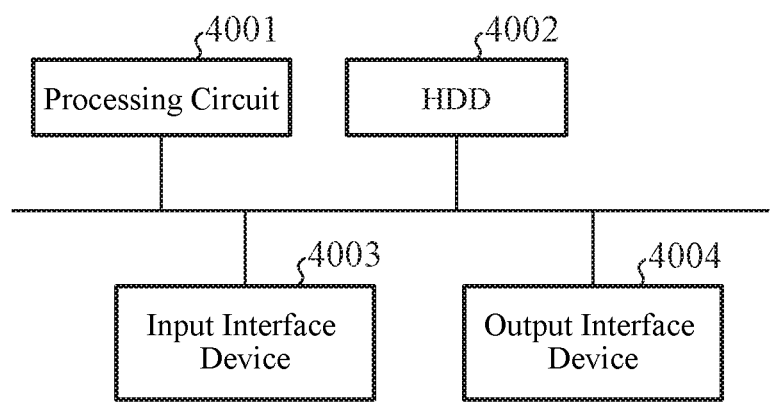
FIGS. 41A and 41B are diagrams illustrating an example of a hardware configuration of a behavior visualization device according to the first embodiment of the present invention.
Figure 41B:
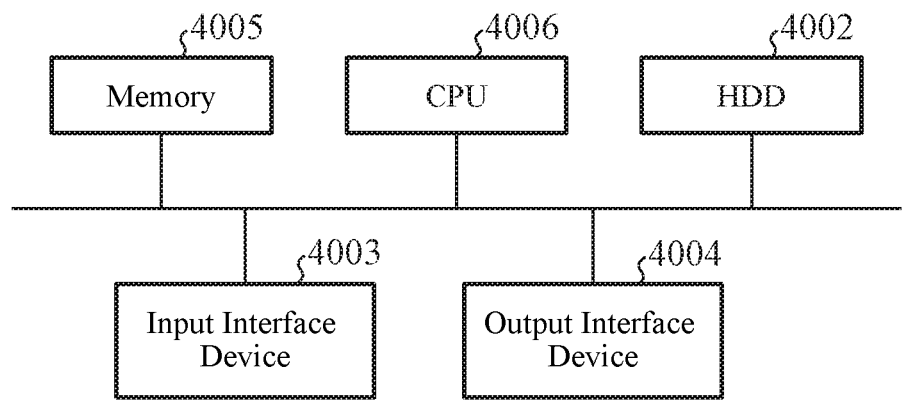

FIGS. 41A and 41B are diagrams illustrating an example of a hardware configuration of the behavior visualization device 1 according to the first embodiment of the present invention.

In the first embodiment of the present invention, the functions of the control unit 10 and the reception unit 30 are implemented by a processing circuit 4001. That is, the behavior visualization device 1 includes the processing circuit 4001 for analyzing deeply associated whereabouts, behavior, or associated information for each resident on the basis of information acquired from the sensor 2 and the device 3 and information stored in the storage unit 20 in advance, and controlling a process for displaying the analyzed result on the display device 4.

The processing circuit 4001 may be dedicated hardware as illustrated in FIG. 41A or a central processing unit (CPU) 4006 for executing a program stored in a memory 4005 as illustrated in FIG. 41B.

In a case where the processing circuit 4001 is dedicated hardware, for example, a single circuit, a composite circuit, a programmed processor, a parallel programmed processor, an application specific integrated circuit (ASIC), a field-programmable gate array (FPGA), or a combination thereof corresponds to the processing circuit 4001.

In a case where the processing circuit 4001 is the CPU 4006, the functions of the control unit 10 and the reception unit 30 are implemented by software, firmware, or a combination of software and firmware. That is, the control unit 10 and the reception unit 30 are implemented by a processing circuit such as the CPU 4006 or a system large-scale integration (LSI) for executing a program stored in a hard disk drive (HDD) 4002 or the memory 4005. It can also be said that the program stored in the HDD 4002, the memory 4005, or the like causes a computer to execute procedures or methods of the control unit 10 and the reception unit 30. Here, for example, a nonvolatile or volatile semiconductor memory such as random access memory (RAM), read only memory (ROM), flash memory, erasable programmable read only memory (EPROM), or electrically erasable programmable read-only memory (EEPROM); a magnetic disk, a flexible disk, an optical disc, a compact disc, a mini disc, or a digital versatile disc (DVD) corresponds to the memory 4005.

Note that some of the functions of the control unit 10 and the reception unit 30 may be implemented by dedicated hardware, and some of the functions may be implemented by software or firmware. For example, the function of the control unit 10 can be implemented by the processing circuit 4001 as dedicated hardware, and the function of the reception unit 30 can be implemented by reading out and executing a program stored in the memory 4005 by the processing circuit.

The memory 4005 stores sensor information acquired from the sensor 2, device information acquired from the device 3, data being processed by the processing circuit 4001, and the like. The storage unit 20 is constituted by the memory 4005, for example.

The behavior visualization device 1 includes an input interface device 4003 and an output interface device 4004 for communicating with an external device such as the sensor 2, the device 3, or the display device 4.

As described above, the behavior visualization device 1 summarizes behavior of a target and visualizes the behavior using a hierarchical structure on the basis of an idea that whereabouts of a target, behavior, and information obtained in each whereabouts are associated with one another, and can facilitate understanding of whereabouts of a target, behavior, or the like.

Figure 42A:
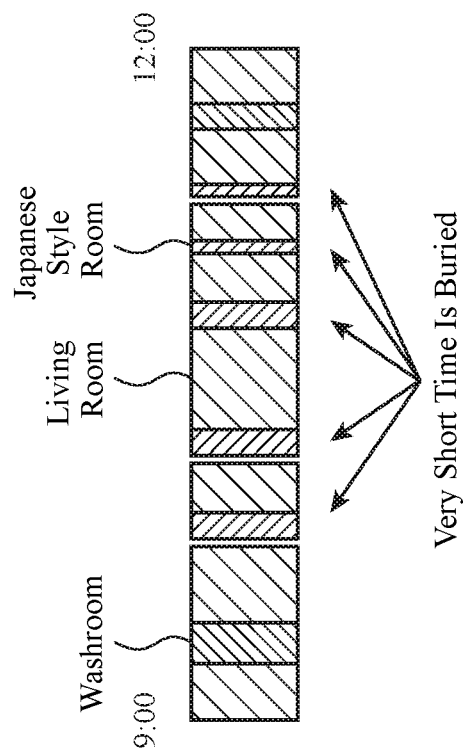
FIG. 42 is a diagram for explaining a method for expressing behavior and whereabouts with a horizontal bar graph with a horizontal axis as a time axis in related art.

For example, in a method for expressing behavior or whereabouts with a horizontal bar graph with the horizontal axis as the time axis as in related art, in a case where a target stays in the same room for a long time, the width of the bar graph of the corresponding part increases, and visibility is high. However, in a case of short-term whereabouts, the width of the bar graph is very narrow, and therefore visibility is very poor disadvantageously. In particular, whereabouts sandwiched between parts having large areas is buried. In a case where there is a room where a person stays for a very short time at one time, but which is frequently visited, it is considered that the room is deeply associated with the person. However, in a case of expression with the horizontal bar graph with the horizontal axis as the time axis, even a room is frequently visited, if stay time in the room at one time is short, a region representing the room has a narrow horizontal width and is buried (for example, FIG. 42A).

Note that the same applies to a case where behavior is visualized in addition to whereabouts. In a case where the time of behavior performed at one time is short, but the behavior is frequently performed, the behavior is considered to be deeply associated with a person. However, in a case of expression with the horizontal bar graph, if the time of behavior performed at one time is short, even if the behavior is frequently performed, visibility is lowered.

Figure 42B:
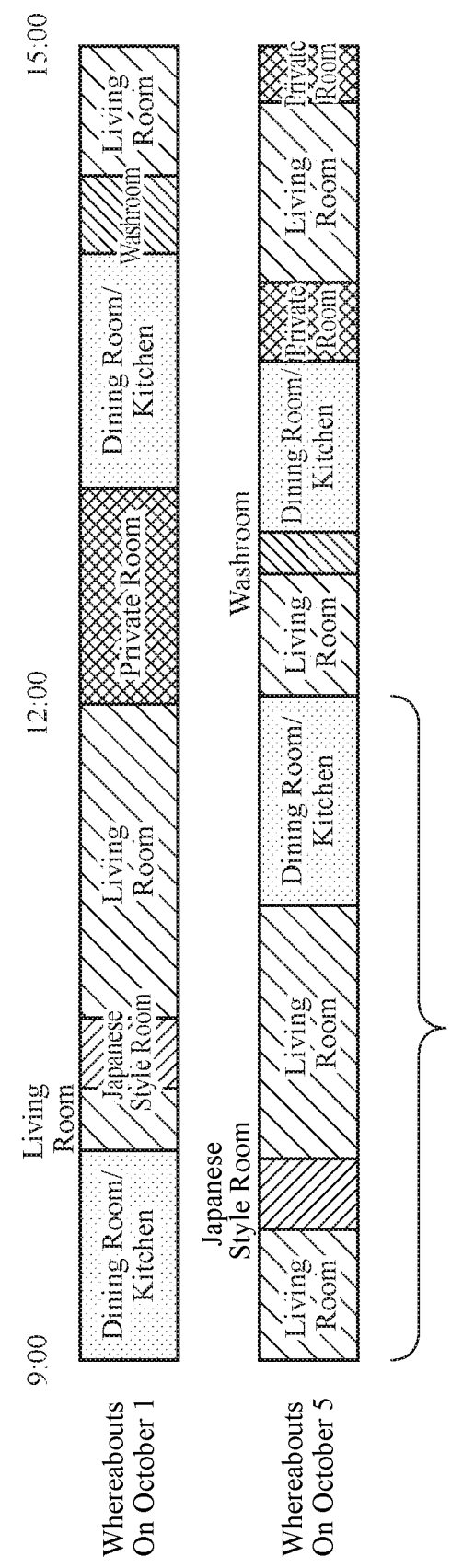

Furthermore, in the method for expressing whereabouts with the horizontal bar graph with the horizontal axis as the time axis, it is difficult to understand characteristics of the whereabouts. For example, in FIG. 42B, in the time zone of 9:00 to 12:00, the total time during which a person stayed in the living room is equal between October 1 and October 5. However, in a case where the horizontal bar graphs for a plurality of days are arranged on one screen, it is difficult to find such characteristics.

A place where a person is located (whereabouts), behavior performed there, and information obtained in the room are considered to be associated with one another. However, in related art, whereabouts and behavior are visualized independently of each other, and therefore it is difficult to understand association between whereabouts and behavior. In a case where a measured value is displayed as it is as in a case where a numerical value obtained by the coordinates of the movement trajectory, an acceleration sensor, or the like is plotted, it is difficult to understand association between whereabouts where a target stays mainly, or connection or association between behaviors of a target.

Meanwhile, as described above, the behavior visualization device 1 according to the first embodiment summarizes behavior of a target of interest, analyzes whereabouts deeply associated with the target, main behavior performed in the whereabouts, association between the whereabouts deeply associated with the target and the behavior, and the like on the time axis, and visualizes a result of analysis on the time axis using a hierarchical structure. Therefore, visibility of information indicating whereabouts of the target, behavior, and the like is improved, and a user can easily understand whereabouts of the target, behavior, and the like.

The behavior visualization device 1 according to the first embodiment can switch in such a manner that information regarding the name of whereabouts, information regarding behavior, or associated information is displayed for information to be displayed in a circle representing summary whereabouts or each associated room. As a result, a user can easily understand association between whereabouts of the target and behavior.

The behavior visualization device 1 according to the first embodiment performs visualization by reflecting the length of time during which a target stayed in whereabouts in the size of a figure representing the whereabouts of the target, and reflecting the magnitude of the number of movements between a plurality of whereabouts of the target in a line segment connecting a plurality of figures representing the plurality of whereabouts of the target. As a result, the user can easily understand association between whereabouts where a target mainly stays, for example.

As described above, the behavior visualization device 1 according to the first embodiment includes: the summary condition setting unit 104 for setting a summary condition for extracting whereabouts deeply associated with a target of interest; the important room extracting unit 105 (important whereabouts extracting unit) for extracting whereabouts deeply associated with the target of interest in each of a plurality of time zones on the basis of whereabouts information indicating whereabouts of the target of interest and a summary condition set by the summary condition setting unit 104; the figure generating unit 106 for calculating the areas of figure regions of figures representing whereabouts deeply associated with the target of interest, extracted by the important room extracting unit 105, and a distance between the figure regions, and generating drawing figure data for displaying a figure representing whereabouts deeply associated with the target of interest in a hierarchical structure;

and the drawing unit 109 for displaying drawing figure data generated by the figure generating unit 106 on the display device 4. Therefore, by summarizing behavior of the target of interest and visualizing information regarding the behavior of the target using the hierarchical structure, information indicating the behavior of the target of interest can be visualized so as to facilitate visual recognition thereof.

Second Embodiment

In the first embodiment, the behavior visualization device 1 stores, in the storage unit 20, device information based on information received by the detection unit 101 from each device 3 in a room or sensor information based on information received by the detection unit 101 from each sensor 2 in the room. The whereabouts estimating unit 102 estimates whereabouts of a resident and stores the whereabouts information in the whereabouts history storage unit 207. The behavior estimating unit 103 estimates behavior of a resident and stores the behavior information in the behavior history storage unit 209.

The second embodiment will describe an embodiment in which whereabouts of a target, behavior, or the like is analyzed on the basis of device information, sensor information, whereabouts information, behavior information, and other information that have already been acquired and stored in the storage unit 20, and the analysis result is visualized.

Figure 43:
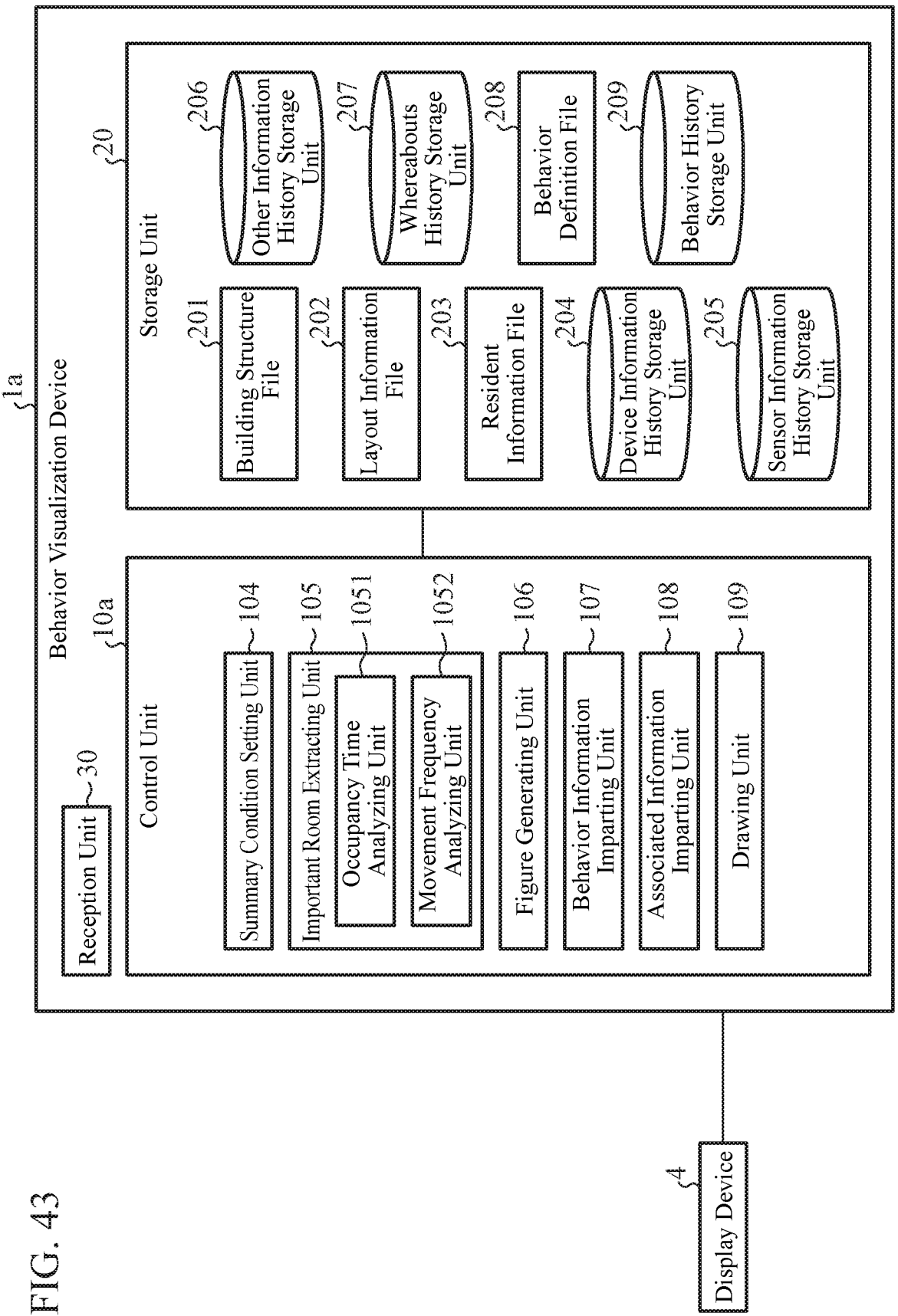
FIG. 43 is a block diagram illustrating a configuration example of a behavior visualization device according to a second embodiment.

FIG. 43 is a block diagram illustrating a configuration example of a behavior visualization device 1a according to the second embodiment.

Since the behavior visualization device 1a detects information of a sensor 2 or a device 3 in real time and does not estimate whereabouts or behavior of a resident, compared with the behavior visualization device 1 described with reference to FIG. 1 in the first embodiment, the sensor 2 and the device 3 are not connected to a network.

As illustrated in FIG. 43, in a case where the behavior visualization device 1a includes a storage unit 20 and the behavior visualization device 1a further includes a display device 4, the behavior visualization device 1a can have a configuration not connected to a network.

In FIG. 43, similar components to those in the behavior visualization device 1 described with reference to FIG. 1 in the first embodiment are denoted by the same reference numerals, and their redundant description is omitted.

The behavior visualization device 1a is different from the behavior visualization device 1 according to the first embodiment in that the behavior visualization device 1a does not include the detection unit 101, the whereabouts estimating unit 102, or the behavior estimating unit 103.

The storage unit 20 stores in advance device information, sensor information, whereabouts information, behavior information, and other information acquired in the past. For example, at the time point of morning of May 20, 2017, various types of information up to May 19, 2017 are stored as a history. The history of various types of information can be stored in the storage unit 20 using a medium such as universal serial bus (USB) or compact disc-recordable (CD-R). For example, the behavior visualization device 1a may acquire the history of various types of information from another computer device or the like via a network.

The operations of a summary condition setting unit 104, an important room extracting unit 105, a figure generating unit 106, a behavior information imparting unit 107, an associated information imparting unit 108, and a drawing unit 109 of the behavior visualization device 1a are similar to the operations of the summary condition setting unit 104, the important room extracting unit 105, the figure generating unit 106, the behavior information imparting unit 107, the associated information imparting unit 108, and the drawing unit 109 of the behavior visualization device 1 according to the first embodiment, described in the first embodiment. Therefore, their redundant description is omitted.

Since a hardware configuration of the behavior visualization device 1a is similar to the configuration described with reference to FIG. 41 in the first embodiment, their redundant description is omitted.

As described above, according to the second embodiment, similar to the first embodiment, by summarizing behavior of a target of interest and visualizing information regarding behavior of the target using a hierarchical structure, information indicating behavior of the target of interest can be visualized so as to facilitate visual recognition thereof.

Third Embodiment

The third embodiment will describe an embodiment in which when an accumulated value of occupancy time of a target or a movement frequency is analyzed, and drawing figure data is generated and displayed on a display device 4, the drawing figure data is stored in association with a summary condition used at the time of analysis, a plurality of summary conditions is switched, and information associated with whereabouts of a target or the like is displayed.

Note that also in the third embodiment, as in the first embodiment, as an example, the behavior visualization device 1b summarizes behavior of a resident in a house and visualizes information regarding whereabouts or behavior of a resident using a hierarchical structure.

Figure 44:
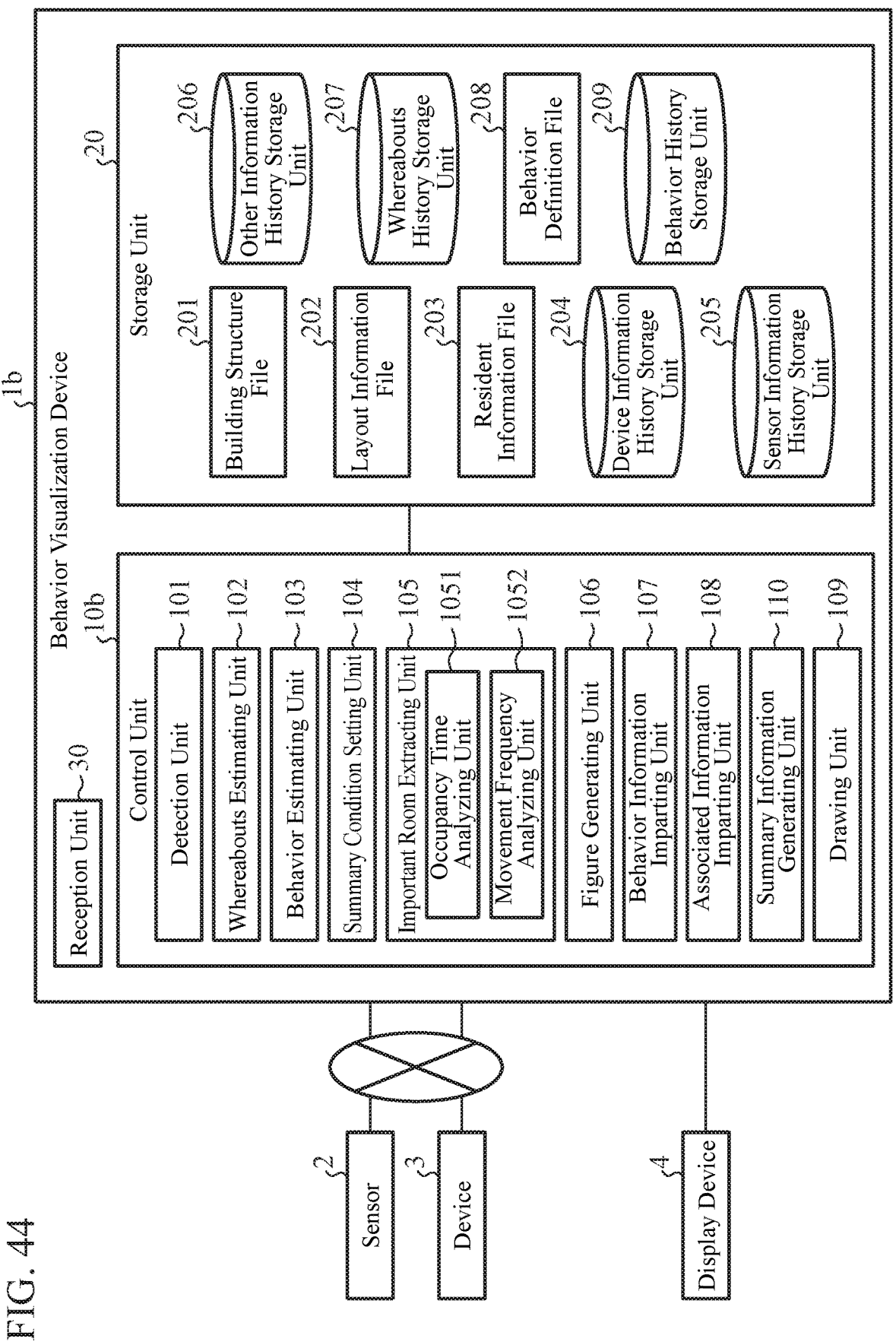
FIG. 44 is a block diagram illustrating a configuration example of a behavior visualization device according to a third embodiment.

FIG. 44 is a block diagram illustrating a configuration example of the behavior visualization device 1b according to the third embodiment.

In FIG. 44, similar components to those in the behavior visualization device 1 described with reference to FIG. 1 in the first embodiment are denoted by the same reference numerals, and their redundant description is omitted.

The behavior visualization device 1b according to the third embodiment is different from the behavior visualization device 1 according to the first embodiment only in that a control unit 10b includes a summary information generating unit 110.

The summary information generating unit 110 generates summary information associating a summary condition with drawing figure data generated by the figure generating unit 106, associated with information regarding behavior by a behavior information imparting unit 107, and associated with associated information by an associated information imparting unit 108.

Since a hardware configuration of the behavior visualization device 1b is similar to the configuration described with reference to FIG. 41 in the first embodiment, their redundant description is omitted.

An operation of the behavior visualization device 1b according to the third embodiment will be described below.

Note that as for an operation of the behavior visualization device 1b, their redundant description of a similar operation to the behavior visualization device 1 described in the first embodiment is omitted, and only an operation different from the behavior visualization device 1 according to the first embodiment will be described below.

When the figure generating unit 106 generates drawing figure data, the behavior information imparting unit 107 associates information regarding behavior with the drawing figure data, and the associated information imparting unit 108 associates associated information with the drawing figure data (see step ST807 to step ST809 in FIG. 8), the summary information generating unit 110 generates summary information.

An example of the contents of the summary information generated by the summary information generating unit 110 is illustrated below.

(A) ID for specifying a person to be processed
(B) Summary condition ID
  a. Start date and time
  b. End date and time
  c. Unit time of summary
  d. Specific condition for period (time)
  e. Summary extraction condition
  f. Degree-of-occupancy extraction level
  g. Movement frequency extraction level
  h. Behavior extraction condition
  i. Associated information extraction condition
(C) Summary information
  a. Summary condition ID
  b. Summary time zone ID
  c. Time zone
  d. Summary whereabouts ID
  e. Figure ID corresponding to summary whereabouts
  f. ID of room deeply associated with summary whereabouts (ID of associated room)
  g. Figure ID corresponding to each associated room
  h. Figure ID of line segment
(D) Figure data
  a. Figure ID
  b. Figure coordinates
  c. Attribute (color, type of line, and the like)

In the summary information, "(A) ID for specifying a person to be processed" is an ID for identifying a resident.

"(B) Summary condition ID" is an ID for identifying a summary condition. "(B) Summary condition ID" has detailed information a to i for specific summary conditions.

"(C) Summary information" is drawing figure data generated by the figure generating unit 106, associated with information regarding behavior by the behavior information imparting unit 107, and associated with associated information by the associated information imparting unit 108, and has detailed information a to h for all the time zones. Note that the various IDs may be imparted appropriately or by referring to the storage unit 20, for example, when the figure generating unit 106 generates drawing figure data.

"a. Summary condition ID" corresponds to "(B) summary condition ID".

"b. Summary time zone ID" is an ID for identifying each time zone set by dividing a target period for each unit time.

"c. Time zone" is each time zone. For example, "c. Time zone" is a time zone obtained by dividing a specific day into four time zones of 6:00 to 10:00, 10:00 to 14:00, 14:00 to 18:00, and 18:00 to 22:00, such as a time zone of "6:00 to 10:00".

"d. Summary whereabouts ID" is a room ID of summary whereabouts extracted by an occupancy time analyzing unit 1051 of an important room extracting unit 105.

"e. Figure ID corresponding to summary whereabouts" is an ID for uniquely identifying a figure representing summary whereabouts in drawing figure data generated by the figure generating unit 106.

"f ID of room deeply associated with summary whereabouts" is an ID of an associated room extracted by the occupancy time analyzing unit 1051 and a movement frequency analyzing unit 1052 of the important room extracting unit 105. In a case where a plurality of associated rooms is extracted, each of the rooms has an ID.

"g. Figure ID corresponding to each associated room" is an ID for uniquely identifying a figure representing an associated room in the drawing figure data generated by the figure generating unit 106.

"h. Line segment ID" is an ID for identifying each line segment connecting summary whereabouts and an associated room or connecting associated rooms.

"(D) Figure data" is data related to each figure in the drawing figure data generated by the figure generating unit 106.

"a. Figure ID" is an ID for identifying each figure in the drawing figure data, and corresponds to the figure IDs of e, g, and h in "(C) Summary information".

"b. Figure coordinates" are figure coordinates such as the center coordinates of a circle representing summary whereabouts or an associated room.

"c. Attribute (color, line type, and the like)" is attribute information when drawing figure data is drawn, such as color, the type of a line segment type, or the like.

The summary information generating unit 110 can hold generated summary information in a class, XML format, or the like.

The summary information generating unit 110 stores the generated summary information in the storage unit 20 and outputs the summary information to a drawing unit 109.

The drawing unit 109 displays a summary condition ID list screen on the display device 4 on the basis of the summary information generated by the summary information generating unit 110 and stored in the storage unit 20.

A user confirms the summary condition ID list screen and selects a summary condition ID to be visualized. When a reception unit 30 receives selection of the summary condition ID from the user, the drawing unit 109 displays details of a summary condition corresponding to the selected summary condition ID.

The user confirms the details of the displayed summary condition. In a case where the summary condition is to be displayed, the user inputs a summary information display instruction, for example, by pressing a display button displayed on a screen of the display device 4.

When receiving input of the summary information display instruction, the reception unit 30 outputs the summary information display instruction to the drawing unit 109.

When the summary information display instruction is output, the drawing unit 109 refers to the storage unit 20, acquires summary whereabouts or a figure ID of an associated room in each time zone on the basis of corresponding summary information, and displays the screens as illustrated in FIGS. 31 to 33A and 33B on the display device 4 with reference to coordinate data or attribute information corresponding to each figure ID.

As described above, in the behavior visualization device 1b according to the third embodiment, the summary information generating unit 110 generates summary information on the basis of drawing figure data and stores the summary information. Therefore, an analysis result of behavior of a resident once analyzed in the behavior visualization device 1b can be immediately called and displayed. A user can display information associated with whereabouts of a target or the like depending on a desired summary condition.

By simultaneously calling a plurality of summary conditions once used for analysis for a specific resident or a group including a plurality of people, results of a plurality of days can be displayed side by side.

For example, the behavior visualization device 1b can display analysis results of behavior on Jul. 5, 2017 and behavior on Jul. 10, 2017 for a specific resident A side by side on the display device 4.

As described above, according to the third embodiment, similar to the first and second embodiments, by summarizing behavior of a target of interest and visualizing information regarding behavior of the target using a hierarchical structure, information indicating behavior of the target of interest can be visualized so as to facilitate visual recognition thereof. The behavior visualization device 1b according to the third embodiment includes the summary information generating unit 110 for generating summary information associating a summary condition with drawing figure data generated by the figure generating unit 106. As a result, information regarding summarized behavior of a target can be reused and displayed. Therefore, processing efficiency of a process of summarizing behavior of the target can be improved.

Fourth Embodiment

The fourth embodiment will describe an embodiment in which the behavior visualization device 1b described in the third embodiment analyzes behavior of a target and visualizes the analysis result using device information, sensor information, whereabouts information, behavior information, and other information that have already been acquired and stored in the storage unit 20.

Figure 45:
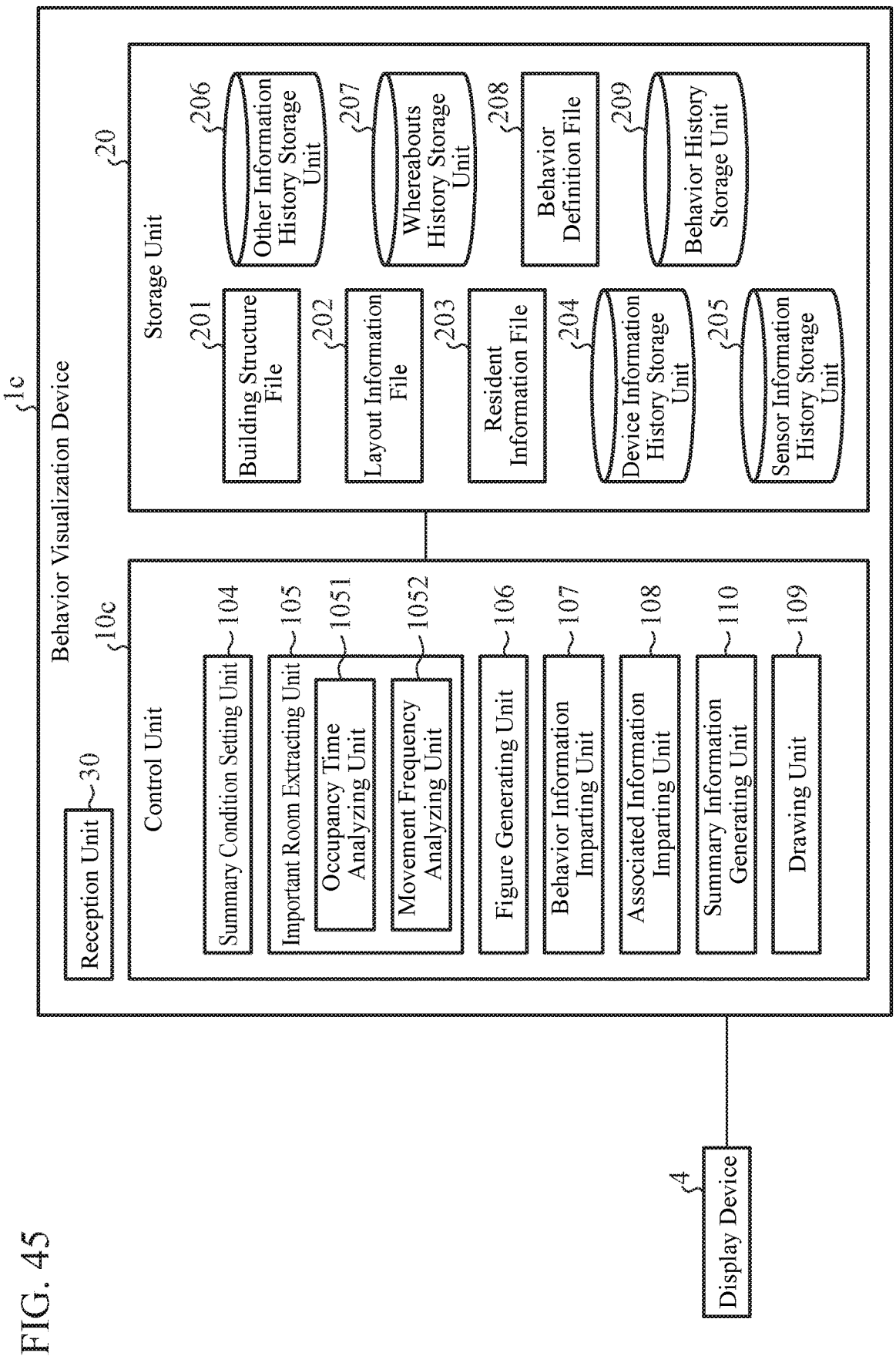
FIG. 45 is a block diagram illustrating a configuration example of a behavior visualization device according to a fourth embodiment.

FIG. 45 is a block diagram illustrating a configuration example of a behavior visualization device 1c according to the fourth embodiment.

In FIG. 45, similar components to those in the behavior visualization device 1a described with reference to FIG. 43 in the second embodiment are denoted by the same reference numerals, and their redundant description is omitted.

The behavior visualization device 1c is different from the behavior visualization device 1a according to the second embodiment in including a summary information generating unit 110.

The storage unit 20 stores in advance device information, sensor information, whereabouts information, behavior information, and other information acquired in the past.

Since a hardware configuration of the behavior visualization device 1c is similar to the configuration described with reference to FIG. 41 in the first embodiment, their redundant description is omitted.

The specific operations of a summary condition setting unit 104, an important room extracting unit 105, a figure generating unit 106, a behavior information imparting unit 107, an associated information imparting unit 108, and a drawing unit 109 of the behavior visualization device 1c are similar to the specific operations of the summary condition setting unit 104, the important room extracting unit 105, the figure generating unit 106, the behavior information imparting unit 107, the associated information imparting unit 108, and the drawing unit 109 of the behavior visualization device 1b according to the third embodiment. Therefore, their redundant description is omitted.

As described above, according to the fourth embodiment, similar to the first and second embodiments, by summarizing behavior of a target of interest and visualizing information regarding behavior of the target using a hierarchical structure, information indicating behavior of the target of interest can be visualized so as to facilitate visual recognition thereof. Similar to the third embodiment, information regarding summarized behavior of a target can be reused and displayed. Therefore, processing efficiency of a process of summarizing behavior of the target can be improved.

The behavior visualization devices 1 to 1c according to the first to fourth embodiments described above each include the behavior information imparting unit 107 and the associated information imparting unit 108. However, the behavior visualization devices 1 to 1c may display only whereabouts of each resident, display whereabouts of each resident and associated information, or display whereabouts of each resident and information regarding behavior.

In the behavior visualization devices 1 to 1c, in a case only whereabouts of each resident is displayed, the storage unit 20 does not include the behavior history storage unit 209 or the other information history storage unit 206, and each of the control units 10 to 10c does not include the behavior information imparting unit 107 or the associated information imparting unit 108. Since other components are as described in the first to fourth embodiments, their redundant description is omitted.

In the behavior visualization devices 1 to 1c, in a case whereabouts of each resident and associated information are displayed, the storage unit 20 does not include the behavior history storage unit 209, and each of the control units 10 to 10c does not include the behavior information imparting unit 107. Since other components are as described in the first to fourth embodiments, their redundant description is omitted.

In the behavior visualization devices 1 to 1c, in a case whereabouts of each resident and information regarding behavior are displayed, the storage unit 20 does not include the other information history storage unit 206, and each of the control units 10 to 10c does not include the associated information imparting unit 108. Since other components are as described in the first to fourth embodiments, their redundant description is omitted.

Fifth Embodiment

The first to fourth embodiments illustrate an embodiment in which by using a specific resident as a target of interest and using a room in a house as whereabouts, the behavior visualization devices 1 to 1c identify a resident in a room in a house, analyze a deeply associated room, main behavior performed in the room, association between the deeply associated room and behavior, and the like for each resident or each group including a plurality of residents, and visualize these using a hierarchical structure.

The fifth embodiment will describe an embodiment in which by using an unspecified large number of people as a target of interest, a behavior visualization device analyzes and visualizes how a space is used by an unspecified large number of people. How a space is used by an unspecified large number of people means, for example, in which time zone and in which whereabouts there are a large or small number of people, or which whereabouts is deeply associated with which whereabouts.

In the following description, as an example, an unspecified large number of people who visit a shopping center are used as a target, and a store in the shopping center is used as whereabouts. A behavior visualization device identifies whether or not an unspecified large number of people exist in a store in a shopping center, and visualizes information regarding a store deeply associated with the unspecified large number of people using a hierarchical structure.

In the following description, an unspecified large number of people to be a target of interest are simply referred to as "people".

Figure 46:
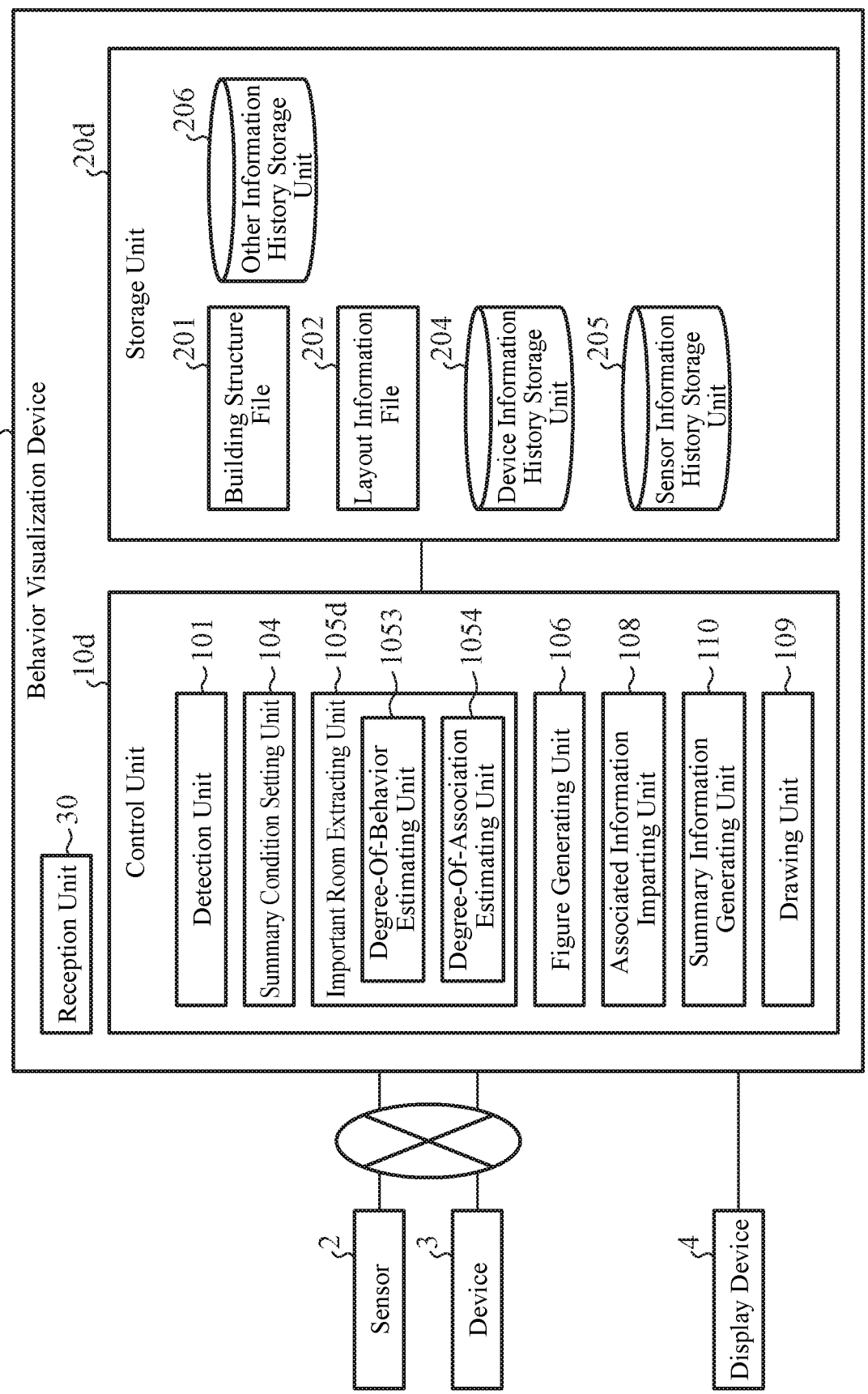
FIG. 46 is a block diagram illustrating a configuration example of a behavior visualization device according to a fifth embodiment.

FIG. 46 is a block diagram illustrating a configuration example of a behavior visualization device 1d according to the fifth embodiment.

In FIG. 46, similar components to those in the behavior visualization device 1 described with reference to FIG. 1 in the first embodiment are denoted by the same reference numerals, and their redundant description is omitted. In FIG. 46, a summary information generating unit 110 has a similar configuration to the summary information generating unit 110 included in the behavior visualization device 1b described with reference to FIG. 44 in the third embodiment. Therefore, components thereof are denoted by the same reference numerals, and their redundant description is omitted.

The behavior visualization device 1d is different from the behavior visualization device 1 described in the first embodiment in that an important room extracting unit 105d of a control unit 10d does not include an occupancy time analyzing unit 1051 or a movement frequency analyzing unit 1052 and includes a degree-of-behavior estimating unit 1053 and a degree-of-association estimating unit 1054. The behavior visualization device 1d is different from the behavior visualization device 1 according to the first embodiment in that the control unit 10d does not include a whereabouts estimating unit 102, a behavior estimating unit 103, and a behavior information imparting unit 107. The behavior visualization device 1d is different from the behavior visualization device 1 in that the storage unit 20d does not include a resident information file 203, a behavior definition file 208, a whereabouts history storage unit 207, and a behavior history storage unit 209.

Since a hardware configuration of the behavior visualization device 1d is similar to the configuration described with reference to FIG. 41 in the first embodiment, their redundant description is omitted.

The important room extracting unit 105d extracts a store deeply associated with people for each time zone set by dividing a target period by unit time on the basis of a summary condition set by a summary condition setting unit 104.

Note that in the fifth embodiment, as in the first embodiment, as an example, the unit time for dividing the target period on the basis of the summary condition is set to several hours. Therefore, the important room extracting unit 105d extracts a store deeply associated with people in each time zone in a target period. In the following description, the unit time for dividing the target period is assumed to be several hours.

The degree-of-behavior estimating unit 1053 of the important room extracting unit 105d refers to a building structure file 201, a layout information file 202, a device information history storage unit 204, and a sensor information history storage unit 205 of the storage unit 20d, and estimates how much people are performing behavior for each time zone in each store as the "degree of behavior" on the basis of a summary condition set by the summary condition setting unit 104, and extracts a store having the highest "degree of behavior" as summary whereabouts.

The degree-of-behavior estimating unit 1053 searches for a store having the second highest "degree of behavior" after the summary whereabouts from the top according to a rank designated in a summary condition on the basis of the summary condition, and extracts the store as an associated room.

The degree-of-behavior estimating unit 1053 outputs information regarding summary whereabouts and an associated room for each time zone to the degree-of-association estimating unit 1054 of the important room extracting unit 105d in association with information regarding the time zone.

The degree-of-association estimating unit 1054 receives information regarding summary whereabouts and an associated room in each time zone, output from the degree-of-behavior estimating unit 1053, and estimates the degree of association regarding the summary whereabouts and the associated room for each time zone.

The degree-of-association estimating unit 1054 outputs information regarding the degree of association estimated for each time zone to the figure generating unit 106 together with the information regarding summary whereabouts and an associated room extracted by the degree-of-behavior estimating unit 1053.

Note that a sensor 2 and a device 3 connected to the behavior visualization device 1d via a network illustrated in FIG. 46 are installed in a store that is whereabouts of people.

The behavior visualization device 1d summarizes behavior of people on the basis of information acquired from the sensor 2 or the device 3, visualizes information regarding a store deeply associated with people or the like using a hierarchical structure, and displays the information on the display device 4.

Next, an operation of the behavior visualization device 1d according to the fifth embodiment will be described.

Figure 47:
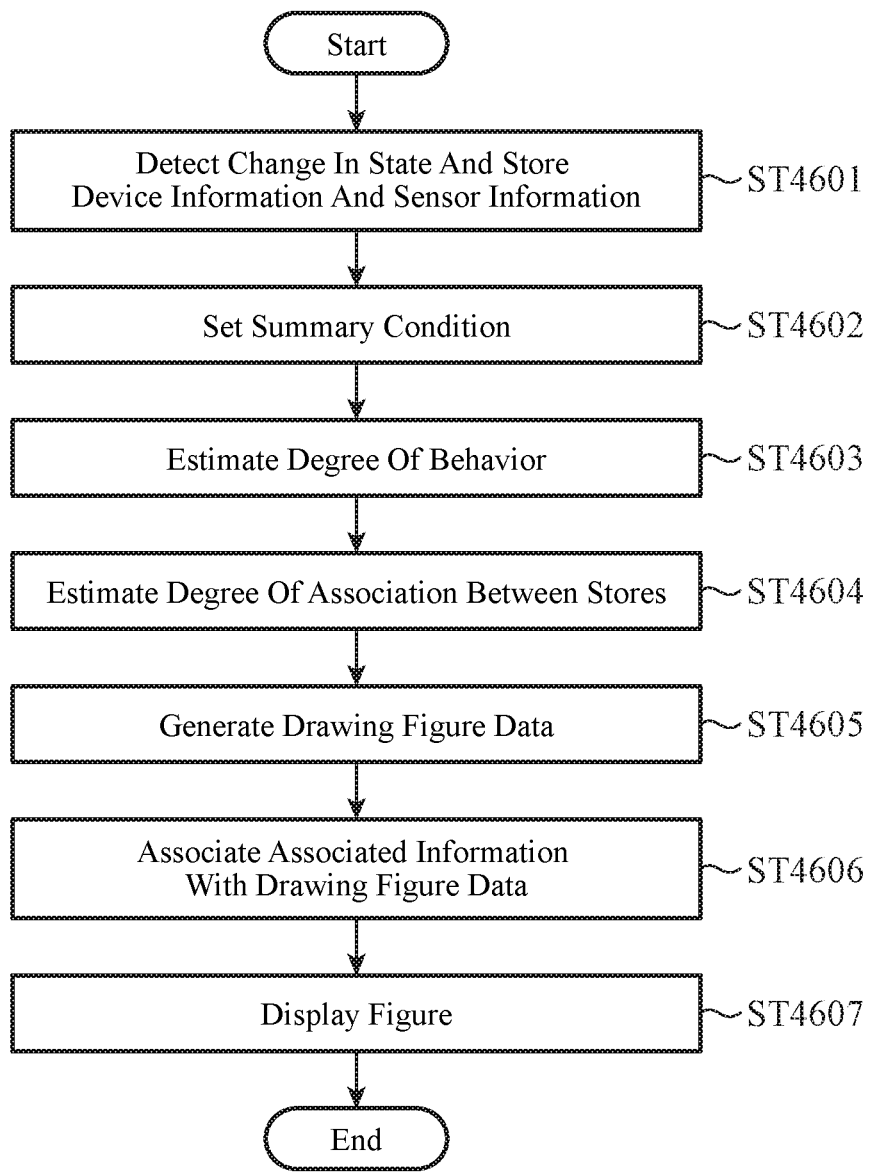
FIG. 47 is a flowchart for explaining an operation of a behavior visualization device in the fifth embodiment.

FIG. 47 is a flowchart for explaining an operation of the behavior visualization device 1d in the fifth embodiment.

A detection unit 101 receives information from various devices 3 and various sensors 2 in a store. On the basis of information received from various devices 3 and various sensors 2 in a store, the detection unit 101 detects changes in the states of the devices 3 and the sensors 2 and stores the detection information in the device information history storage unit 204 and the sensor information history storage unit 205 of the storage unit 20 as device information and sensor information associated with date and time information, respectively (step ST4601). A specific operation is similar to that in step ST801 in FIG. 8 described in the first embodiment.

The summary condition setting unit 104 sets the summary condition on the basis of the summary condition setting instruction information output from the reception unit 30 or the preset summary condition setting instruction information (step ST4602). A specific operation is similar to that in step ST804 in FIG. 8 described in the first embodiment.

The summary condition setting unit 104 sets the following summary conditions, for example.

(A) Unit of a target period
(B) Start date and time and end date and time
(C) Specific condition for period or time zone
(D) Unit time for summarizing information regarding people (unit day)
(E) Condition for extracting a store deeply associated with people in a target time zone
Degree-of-behavior extraction level
(F) Condition for extracting associated information The summary condition setting unit 104 sets a unit of a target period to be processed, such as one day, one week, or one month as the unit of a target period (A).

The summary condition setting unit 104 sets start date and time and end date and time of a target period for analyzing and visualizing a store or the like deeply associated with people as the date and time (B).

As for the specific condition (C), when a specific condition is imparted to the unit of a target period (A), the summary condition setting unit 104 sets the specific condition. Examples of the specific condition include specific days of the week, weekends and holidays only, and weekdays only.

The summary condition setting unit 104 sets a unit time as an analysis unit indicating the degree of granularity on the time axis for analyzing a store deeply associated with people for the unit of the target period (A) as the unit time (D). For example, as the unit time (D), an analysis unit such as "2-hour unit", "1-week unit", or "1-month unit" is set.

Note that an operation for analyzing a store deeply associated with people on the basis of the condition set as the unit time (D) will be described later.

When the summary condition setting unit 104 sets, as the extraction condition (E), a plurality of time zones by dividing a target period from the start date and time to the end date and time for analyzing and visualizing a store or the like deeply associated with people by the unit time (D), the summary condition setting unit 104 sets an extraction condition for extracting a store deeply associated with people in each time zone.

In the fifth embodiment, an index called "degree of behavior" is used as an index for extracting a store deeply associated with people. The degree-of-behavior estimating unit 1053 of the important room extracting unit 105d estimates how much people are performing behavior in each store as the "degree of behavior". Specifically, the degree-of-association estimating unit 1054 estimates that "the degree of behavior is high" in a state where many people are gathered or many people come and go, and estimates that "the degree of behavior is low" in a state where there are not many people. The summary condition setting unit 104 sets "degree-of-behavior extraction level" designating the maximum degree of behavior to be extracted as the extraction condition (E). Note that details of an operation of the degree-of-behavior estimating unit 1053 will be described later.

When the summary condition setting unit 104 sets, as the extraction condition (F), a plurality of time zones by dividing a target period from the start date and time to the end date and time for analyzing and visualizing a store or the like deeply associated with people by the unit time (D), the summary condition setting unit 104 sets an extraction condition for extracting main information in each of the set time zones as associated information. The information obtained in each time zone is, for example, device information, sensor information, or other information stored in the other information history storage unit 206, such as an image or a video. Specifically, for example, the summary condition setting unit 104 sets, as the extraction condition in (F), an extraction condition designating the maximum number of pieces of information to be extracted as associated information deeply associated with people from various types of information including device information, sensor information, and other information.

The set values of the conditions (A) to (F) as described above are stored in advance, as in the first to fourth embodiments, in a place that can be referred to by the summary condition setting unit 104 of the storage unit 20 as summary condition setting instruction information. The summary condition setting unit 104 reads the summary condition setting instruction information and sets the summary conditions as described above. A summary condition setting screen display control unit (not illustrated) of the behavior visualization device 1d may display a GUI screen for designating set values of the conditions (A) to (F) on the display device 4. A user may operate the input device from the GUI screen and may designate set values each time the behavior visualization device 1d performs operation. The reception unit 30 may receive information regarding the set values, may store the information in a place that can be referred to by the summary condition setting unit 104 of the storage unit 20d as summary condition setting instruction information. The summary condition setting unit 104 may read the summary condition setting instruction information stored by the reception unit 30 and may set the summary conditions as described above.

In the fifth embodiment, the behavior visualization device 1d sets the target period to a period of Oct. 1, 2017 to Oct. 31, 2017, divides the target period by every week consisting of Sunday to Saturday, and summarizes stores deeply associated with people for the one week. That is, the summary condition setting unit 104 sets a summary condition in which a period of Oct. 1, 2017 to Oct. 31, 2017 is set as (A), and seven days are set as (D) for the above summary condition. Note that, for simple description, hereinafter, the description of the year is omitted and only the month and date are described appropriately for the target period of Oct. 1, 2017 to Oct. 31, 2017.

The summary condition setting unit 104 stores information regarding the set summary condition in the storage unit 20d and outputs the information to the important room extracting unit 105.

Now, return to the flowchart of FIG. 47.

The important room extracting unit 105d refers to the building structure file 201, the layout information file 202, the device information history storage unit 204, and the sensor information history storage unit 205 of the storage unit 20, and extracts a store deeply associated with people in each time zone on the basis of the summary condition set by the summary condition setting unit 104 in step ST4602.

First, the degree-of-behavior estimating unit 1053 of the important room extracting unit 105d refers to the building structure file 201, the layout information file 202, the device information history storage unit 204, and the sensor information history storage unit 205 of the storage unit 20, and estimates how much people are performing behavior in each store for each week (October 1 to Oct. 7, 2017, October 8 to Oct. 14, 2017 . . . ) as the "degree of behavior". Then, the degree-of-behavior estimating unit 1053 extracts a store having the highest "degree of behavior" as summary whereabouts. The degree-of-behavior estimating unit 1053 searches for a room having the second highest "degree of behavior" after the summary whereabouts from the top according to a rank designated in a summary condition, and extracts the room as an associated room (step ST4603).

Figure 48:
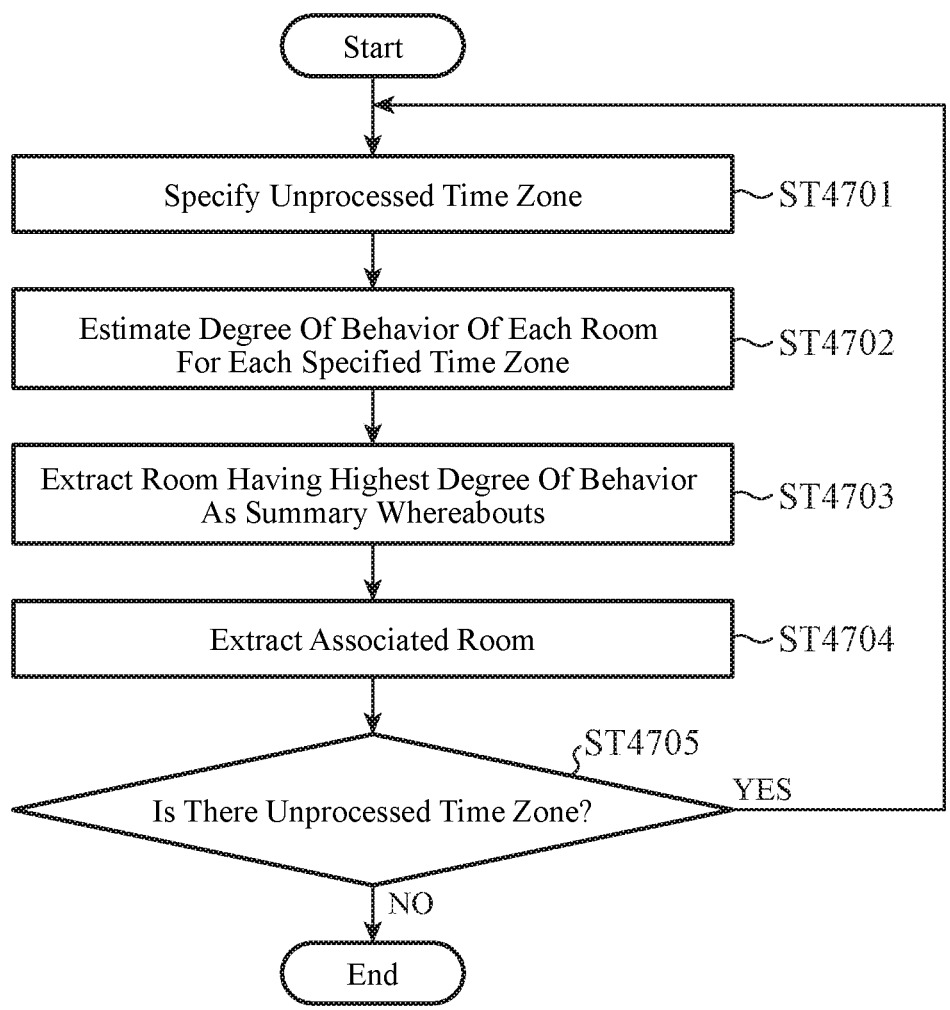
FIG. 48 is a flowchart for explaining details of an operation of extracting summary whereabouts and an associated room in each week by a degree-of-behavior estimating unit of an important room extracting unit in the fifth embodiment.

Here, FIG. 48 is a flowchart for explaining details of an operation of extracting summary whereabouts and an associated room in each week by the degree-of-behavior estimating unit 1053 of the important room extracting unit 105d in the fifth embodiment.

As an example, by using the following conditions as the summary condition set by the summary condition setting unit 104, an operation of the degree-of-behavior estimating unit 1053 will be described according to the flowchart of FIG. 48 with a specific example.

(A) Unit of a target period: one month (B) Start date and time and end date and time: Oct. 1, 2017 to Oct. 31, 2017

(C) Specific condition for period (time): none (D) Unit time for summarizing information regarding people (unit day): seven days (E) Condition for extracting whereabouts deeply associated with people in a target time zone Degree-of-behavior extraction level: 3

(F) Condition for extracting associated information: 3

First, the degree-of-behavior estimating unit 1053 specifies an unprocessed time zone (hereinafter referred to as "degree-of-behavior estimation target time zone") among a plurality of time zones set by dividing a target period corresponding to the unit of a target period (A), the date and time (B), and the specific condition (C) set in the summary condition by the unit time (unit day) (D) (step ST4701). Specifically, for example, the degree-of-behavior estimating unit 1053 first specifies a time zone of October 1 to October 7 in the target period of October 1 to Oct. 31, 2017 as a degree-of-behavior estimation target time zone.

The degree-of-behavior estimating unit 1053 refers to the building structure file 201, the layout information file 202, the device information history storage unit 204, and the sensor information history storage unit 205 of the storage unit 20*d*, and estimates the degree of behavior for each store in the time zone of October 1 to October 7 specified in step ST4701 (step ST4702).

Figures 49, 50:
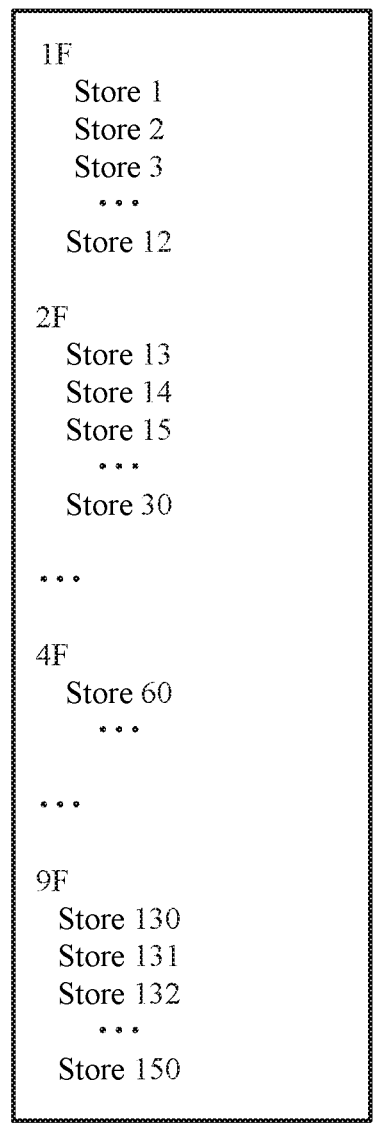
FIG. 49 is a diagram illustrating an example of contents of a building structure file in the fifth embodiment.
FIG. 50 is a diagram illustrating an example of contents of a layout information file in the fifth embodiment.

Here, FIG. 49 is a diagram illustrating an example of contents of the building structure file 201 in the fifth embodiment.

In the building structure file 201 illustrated in FIG. 49, 150 stores in a shopping mall including nine floors are defined for each floor. Note that although not illustrated in FIG. 49, the building structure file 201 defines, in addition to the stores, connection information indicating whether people can directly move between stores.

FIG. 50 is a diagram illustrating an example of contents of the layout information file 202 in the fifth embodiment.

The layout information file 202 illustrated in FIG. 50 defines the type and sensor ID of the sensor 2 installed in a store defined in the building structure file 201.

Figures 51, 52:
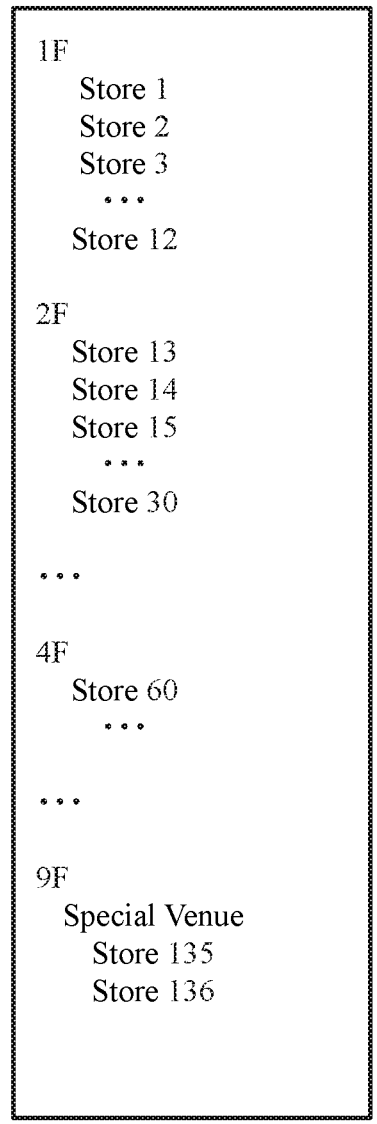
FIG. 51 is a diagram illustrating another example of the contents of the building structure file in the fifth embodiment.
FIG. 52 is a diagram illustrating another example of the contents of the layout information file in the fifth embodiment.

Note that in a case where the layout of a floor in a shopping mall is changed for a specific period, for example, due to setting up of a special venue in the shopping mall, the building structure file 201 and the layout information file 202 corresponding to this period are defined (see, for example, FIGS. 51 and 52). For example, in the layout information file 202 illustrated in FIG. 52, the store ID 1000 is an ID indicating a special venue, and it is defined that a human sensor of sensor ID 500 is installed in the special venue.

Figures 53, 54:
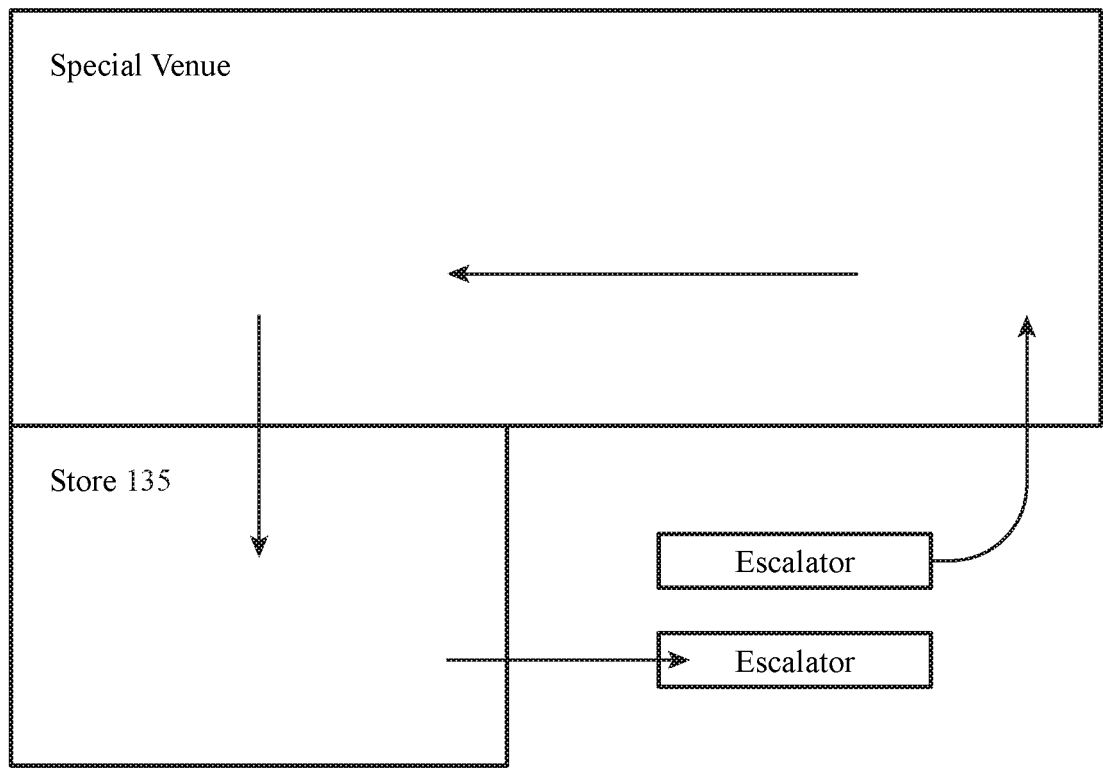
FIG. 53 is a diagram illustrating an example of contents of sensor information stored in a sensor information history storage unit in the fifth embodiment.
FIG. 54 is a diagram illustrating an example of a floor structure in a case where a special venue is set up in the fifth embodiment.

FIG. 53 is a diagram illustrating an example of contents of sensor information stored in the sensor information history storage unit 205 in the fifth embodiment.

The sensor information history storage unit 205 stores sensor information associating the status of the sensor 2 with the date and time and information regarding a store. Note that the sensor information is generated by detecting a change in the state of the sensor 2 by the detection unit 101 on the basis of information acquired from each sensor 2 defined in the layout information file 202, and associating the detection information with date and time information.

In the fifth embodiment, as an example, a special venue for a limited period is set up in a shopping mall, and the building structure file 201 and the layout information file 202 define the contents as illustrated in FIGS. 51 and 52, respectively.

Now, return to the flowchart of FIG. 48.

The degree-of-behavior estimating unit 1053 refers to the sensor information history storage unit 205 and acquires sensor information in the degree-of-behavior estimation target time zone specified in step ST4701. Then, the degree-of-behavior estimating unit 1053 calculates the detection number of times the sensor 2 has been turned ON for each store defined in the building structure file 201, and estimates the calculated number of times as the degree of behavior (step ST4702).

The degree-of-behavior estimating unit 1053 extracts a store having the highest degree of behavior as summary whereabouts among stores the degrees of behavior of which have been estimated in step ST4702 (step ST4703).

For example, it is assumed that a special venue is set up on the ninth floor during a time zone of October 1 to October 7 that is a degree-of-behavior estimation target time zone (see FIG. 54), and the degree of behavior estimated in the special venue is the highest. In this case, the degree-of-behavior estimating unit 1053 extracts the special venue as summary whereabouts.

The degree-of-behavior estimating unit 1053 extracts another store having the second deepest association with people after summary whereabouts in the degree-of-behavior estimation target time zone as an associated room on the basis of the summary condition set by the summary condition setting unit 104 (see step ST4602 in FIG. 47) (step ST4704).

As described above, the summary condition setting unit 104 sets a degree-of-behavior extraction level of the extraction condition (E) in the summary condition as follows.

Degree-of-behavior extraction level: 3

Since an area having the highest degree of behavior is a special venue, and the special venue has already been extracted as summary whereabouts, the degree-of-behavior estimating unit 1053 extracts stores having the second highest and third highest degree of behavior as associated rooms. For example, if the stores having the second highest and third highest degrees of behavior are store 135 (store on the same ninth floor as the special venue) and store 60 (store on the fourth floor), the degree-of-behavior estimating unit 1053 extracts the store 135 and the store 60 as associated rooms.

The degree-of-behavior estimating unit 1053 determines whether or not there is an unprocessed time zone in the target period of October 1 to Oct. 31, 2017 (step ST4705).

In step ST4705, if the degree-of-behavior estimating unit 1053 determines that there is no unprocessed time zone ("NO" in step ST4705), the process ends.

In step ST4705, if the degree-of-behavior estimating unit 1053 determines that there is an unprocessed time zone ("YES" in step ST4705), the process returns to step ST4701, and the subsequent processes are repeated. That is, by using seven days from the next Sunday to Saturday as a degree-of-behavior estimation target time zone, the degree-of-behavior estimating unit 1053 extracts summary whereabouts and an associated room for the degree-of-behavior estimation target time zone.

Here, the degree-of-behavior estimating unit 1053 estimates the degree of behavior for seven days from October 8 to October 15, and moves to a process of extracting summary whereabouts and an associated room.

The degree-of-behavior estimating unit 1053 performs the above process for all the time zones obtained by dividing the target period of October 1 to Oct. 31, 2017 by every seven days.

The degree-of-behavior estimating unit 1053 stores information associated with information regarding the degree of behavior in summary whereabouts, an associated room, and each store (referred to as post-degree-of-behavior-estimation information) in each time zone in the storage unit 20*d*, and outputs the information to the degree-of-association estimating unit 1054 of the important room extracting unit 105*d*.

Now, return to the flowchart of FIG. 47.

The degree-of-association estimating unit 1054 of the important room extracting unit 105d estimates the degree of association between stores on the basis of the post-degree-of-behavior-estimation information output from the degree-of-behavior estimating unit 1053 in step ST4604 (step ST4604).

Figure 55:
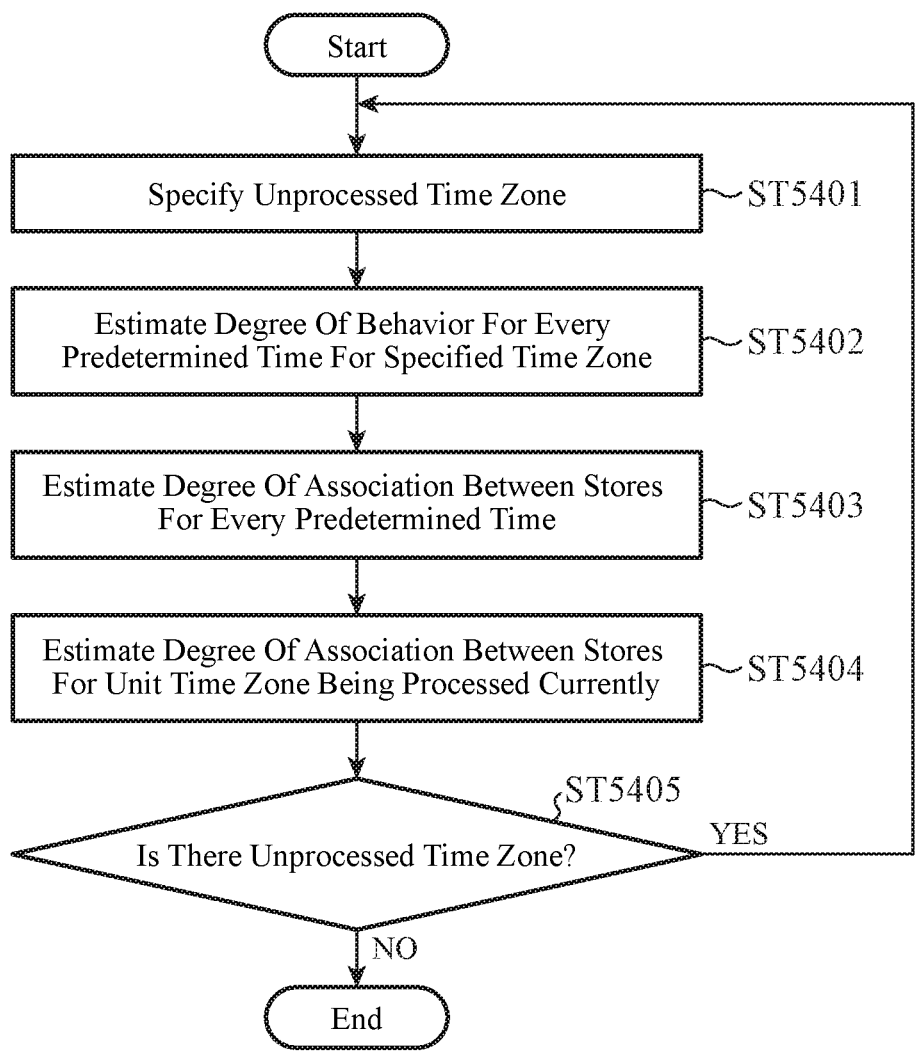
FIG. 55 is a flowchart for explaining details of an operation of estimating the degree of association between stores in each week by a degree-of-association estimating unit of an important room extracting unit in the fifth embodiment.

Here, FIG. 55 is a flowchart for explaining details of an operation of estimating the degree of association between stores in each week by the degree-of-association estimating unit 1054 of the important room extracting unit 105d in the fifth embodiment.

First, the degree-of-association estimating unit 1054 specifies an unprocessed time zone (hereinafter referred to as "degree-of-association estimation target time zone") among a plurality of time zones set by dividing a target period corresponding to the unit of a target period (A), the date and time (B), and the specific condition (C) set in the summary condition by the unit time (unit day) (D) (step ST5401). Specifically, for example, the degree-of-association estimating unit 1054 specifies a time zone of October 1 to October 7 in the target period of October 1 to Oct. 31, 2017 as a degree-of-association estimation target time zone.

The degree-of-association estimating unit 1054 estimates the degree of behavior between stores for all the stores extracted by the degree-of-behavior estimating unit 1053 (see steps ST4703 and ST4704 in FIG. 48) for every predetermined time in the time zone of October 1 to October 7 specified in step ST5401 (step ST5402). Note that, for example, a user only needs to determine how much the predetermined time is to be in advance and to store the predetermined time as a parameter in the storage unit 20d, and the degree-of-association estimating unit 1054 only needs to acquire the stored parameter.

For example, if the predetermined time is determined to be 30 minutes in advance, the degree-of-association estimating unit 1054 estimates the degree of behavior for every 30 minutes in three stores of the special venue, the store 135, and the store 60 extracted by the degree-of-behavior estimating unit 1053 from October 1 to October 7.

Specifically, for example, the degree-of-association estimating unit 1054 refers to the sensor information history storage unit 205, first acquires sensor information for every hour on October 1, and estimates, every 30 minutes, the detection number of times the sensor 2 has been turned ON in each of the special venue, the store 135, and the store 60 as the degree of behavior. As a result, for example, it is assumed that the degree-of-association estimating unit 1054 estimates the following degree of behavior for 30 minutes from 10:00 to 10:30 on October 1.

Special venue: 532 times
Store 135: 468 times
Store 60: 237 times

Similarly, the degree-of-association estimating unit 1054 divides October 1 for every 30 minutes, such as 10:30 to 11:00 or 11:00 to 11:30 on October 1, and estimates the degree of behavior in each of the special venue, the store 135, and the store 60 every 30 minutes.

The degree-of-association estimating unit 1054 calculates the degree of association between stores by the following (formula 4) every 30 minutes for the store extracted by the degree-of-behavior estimating unit 1053 (step ST5403). Specifically, the degree-of-association estimating unit 1054 selects two stores in order from the plurality of stores extracted by the degree-of-behavior estimating unit 1053, and calculates the degree of association between the two selected stores. In the following (formula 4), the two stores selected in order by the degree-of-association estimating unit 1054 are referred to as room 1 and room 2.

(Degree of association between room 1 and room 2)=|Degree of behavior in room 1−degree of behavior in room 2|     (formula 4)

That is, the degree of association between room 1 and room 2 is an absolute value of a difference between the degree of behavior in room 1 and the degree of behavior in room 2.

The degree-of-association estimating unit 1054 estimates that the degree of association is high in a case where a value of the degree of association is equal to or less than a threshold, and estimates that the degree of association is low in a case where a value of the degree of association is equal to or more than the threshold. Note that the threshold is preset by a user, for example, and stored as a parameter in the storage unit 20d. The degree-of-association estimating unit 1054 only needs to acquire information regarding the threshold with reference to the storage unit 20d.

For example, in a case where the threshold is 100, the degree-of-association estimating unit 1054 estimates the degree of association for the special venue, the store 135, and the store 60 as follows.

Degree of association between special venue and store 135: high
Degree of association between special venue and store 60: low
Degree of association between store 135 and store 60: low The degree-of-association estimating unit 1054 sums up the estimation results of degrees of association between stores estimated every 30 minutes in step ST5403, and estimates the degree of association between stores for the degree-of-association estimation target time zone (step ST5404). Specifically, the degree-of-association estimating unit 1054 sums up each of "high" and "low" of the degree of association estimated every 30 minutes for the special venue, the store 135, and the store 60 for seven days from October 1 to October 7, and quantifies the larger one ("high" or "low").

For example, in a case where the degree of association is expressed by two stages "high" and "low", the degree-of-association estimating unit 1054 quantifies the degree of association "high" as 0.7 and the degree of association "low" as 0.3. For example, how to quantify the degree of association only needs to be defined in advance by a user and to be stored as a parameter in the storage unit 20d.

In the above example, the degree-of-association estimating unit 1054 estimates and quantifies the degree of association in two stages of "high" and "low", but the level at which the degree-of-association estimating unit 1054 quantifies the degree of association is not limited to two stages. For example, the degree-of-association estimating unit 1054 may quantify the degree of association in multiple stages or with continuous numerical values of 0 to 1.0.

The degree-of-association estimating unit 1054 determines whether or not there is an unprocessed time zone in the target period of October 1 to Oct. 31, 2017 (step ST5405).

In step ST5405, if the degree-of-association estimating unit 1054 determines that there is no unprocessed time zone ("NO" in step ST5405), the process ends.

In step ST5405, if the degree-of-association estimating unit 1054 determines that there is an unprocessed time zone ("YES" in step ST5405), the process returns to step ST5401, and the subsequent processes are repeated. That is, by using seven days from the next Sunday to Saturday as a degreeof-association estimation target time zone, the degree-of-association estimating unit 1054 estimates the degree of association between stores regarding the degree-of-association estimation target time zone.

Here, the degree-of-association estimating unit 1054 moves to a process of estimating the degree of association for seven days from October 8 to October 15.

The degree-of-association estimating unit 1054 performs the above process for all the time zones obtained by dividing the target period of October 1 to Oct. 31, 2017 by every seven days.

The degree-of-association estimating unit 1054 stores information regarding the estimated degree of association in the storage unit 20d and outputs the information to the figure generating unit 106. The degree-of-association estimating unit 1054 adds the information regarding the degree of association to the post-degree-of-behavior-estimation information acquired from the degree-of-behavior estimating unit 1053, and outputs the information to the figure generating unit 106 as post-degree-of-association estimation information.

Now, return to the flowchart of FIG. 47.

In step ST4604, the figure generating unit 106 calculates the areas of figure regions of figures representing summary whereabouts and an associated room, and a distance between the figure regions on the basis of the post-degree-of-association estimation information output from the degree-of-association estimating unit 1054, and generates drawing figure data (step ST4605).

Specifically, the figure generating unit 106 generates drawing figure data for displaying a figure representing summary whereabouts for each time zone as a parent node on the time axis, and displaying a figure representing an associated room below the figure representing the summary whereabouts in a hierarchical structure.

Note that in the fifth embodiment, as in the first to fourth embodiments, the figure generating unit 106 generates drawing figure data by regarding a figure representing each of summary whereabouts and associated rooms as a circle.

Figure 56:
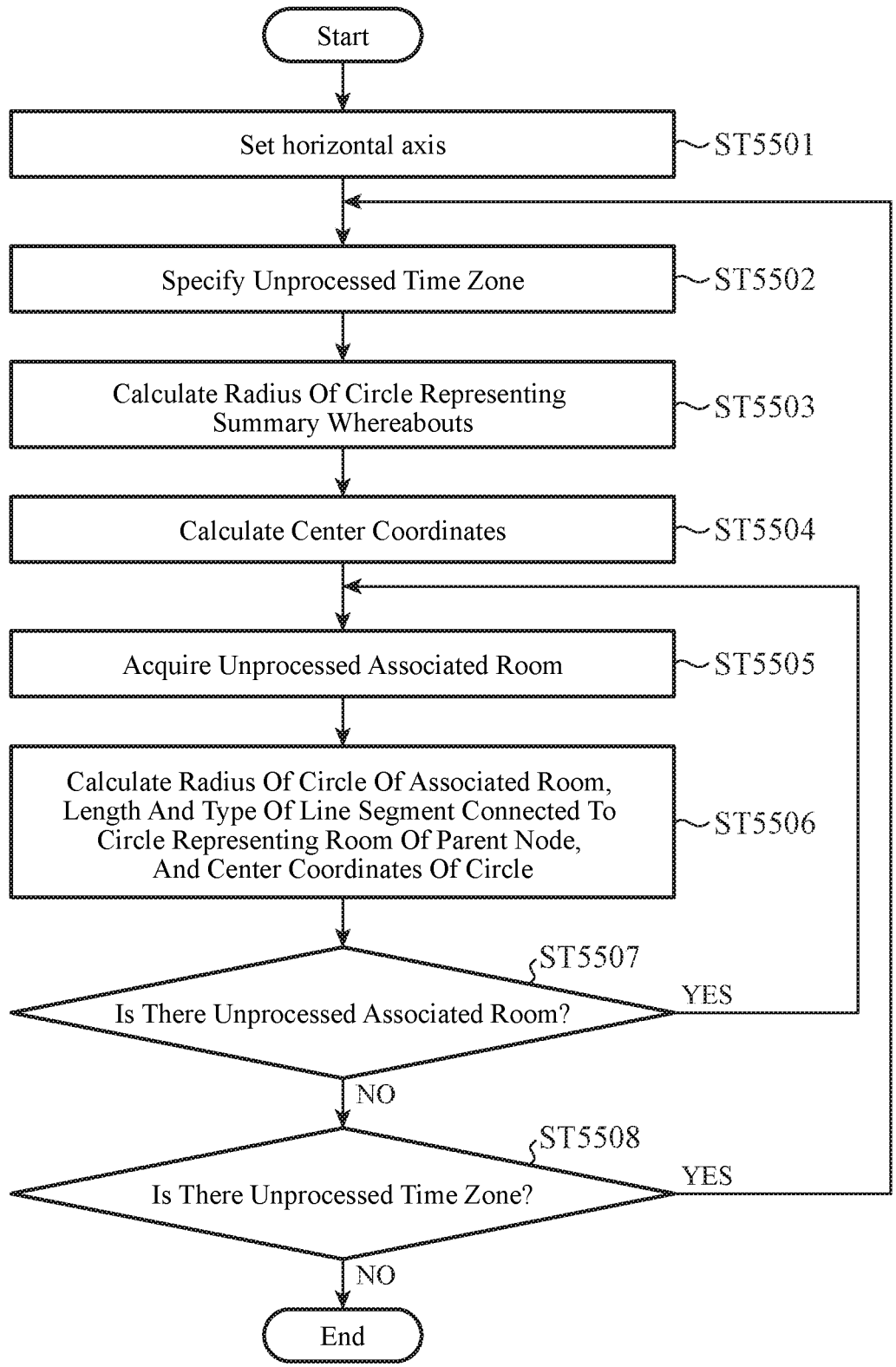
FIG. 56 is a flowchart for explaining details of an operation of generating drawing figure data by a figure generating unit in the fifth embodiment.

Here, FIG. 56 is a flowchart for explaining details of an operation of generating drawing figure data by the figure generating unit 106.

First, the figure generating unit 106 generates time axis data for drawing a scale for each time zone with the horizontal axis as the time axis (step ST5501). For example, in the above example, the figure generating unit 106 generates time axis data for drawing a scale indicating four time zones of October 1 to October 7, October 8 to October 14, October 15 to October 21, October 22 to October 28, and October 29 to October 31.

The figure generating unit 106 specifies an unprocessed time zone (hereinafter referred to as "drawing target time zone") (step ST5502). For example, the figure generating unit 106 specifies the time zone of October 1 to October 7 as a drawing target time zone.

The figure generating unit 106 determines the size of a figure region of a figure representing summary whereabouts in the drawing target time zone specified in step ST5502 (hereinafter referred to as "drawing target summary whereabouts") on the basis of the post-degree-of-association estimation information output from the degree-of-association estimating unit 1054 of the important room extracting unit 105d (step ST5503). Specifically, the figure generating unit 106 calculates the radius of a circle representing the drawing target summary whereabouts using the following (formula 5), and determines the size of the circle representing the drawing target summary whereabouts.

(Radius of circle representing drawing target summary whereabouts)=(Degree of behavior of drawing target summary whereabouts in time zone to be processed)/(total value of degrees of behavior of all stores in time zone)*(constant)    (formula 5)

The drawing target summary whereabouts is a special venue. If, in the time zone of October 1 to October 7, the detection number of times the sensor 2 has been turned ON in a special venue is 1028605, and the total detection number the sensor 2 has been turned ON in all the stores is 2571512, the figure generating unit 106 calculates the radius of a circle representing the special venue as follows on the basis of (formula 5).

(Radius of circle representing special venue)
=1028605/2571512*300=120

Note that the constant is 300 in this case.

Then, the figure generating unit 106 calculates coordinates on the time axis for arranging the figure representing the drawing target summary whereabouts at the center time of the drawing target time zone on the time axis data generated in step ST5501 with respect to the drawing target summary whereabouts (step ST5504). Specifically, the figure generating unit 106 calculates the center coordinates of a circle representing the special venue.

In step ST4604, the figure generating unit 106 specifies an unprocessed associated room (hereinafter referred to as "drawing target associated room") among the associated rooms associated with the drawing target summary whereabouts on the basis of the post-degree-of-association estimation information output from the degree-of-association estimating unit 1054 (step ST5505).

For example, the figure generating unit 106 first specifies "store 135" as a drawing target associated room.

The figure generating unit 106 calculates the radius of a circle representing the drawing target associated room specified in step ST5505, the length and type of a line segment connecting the drawing target associated room and a circle representing an upper node thereof, and the center coordinates of the circle representing the drawing target associated room on the time axis data generated in step ST5501 (step ST5506).

Figure 57:
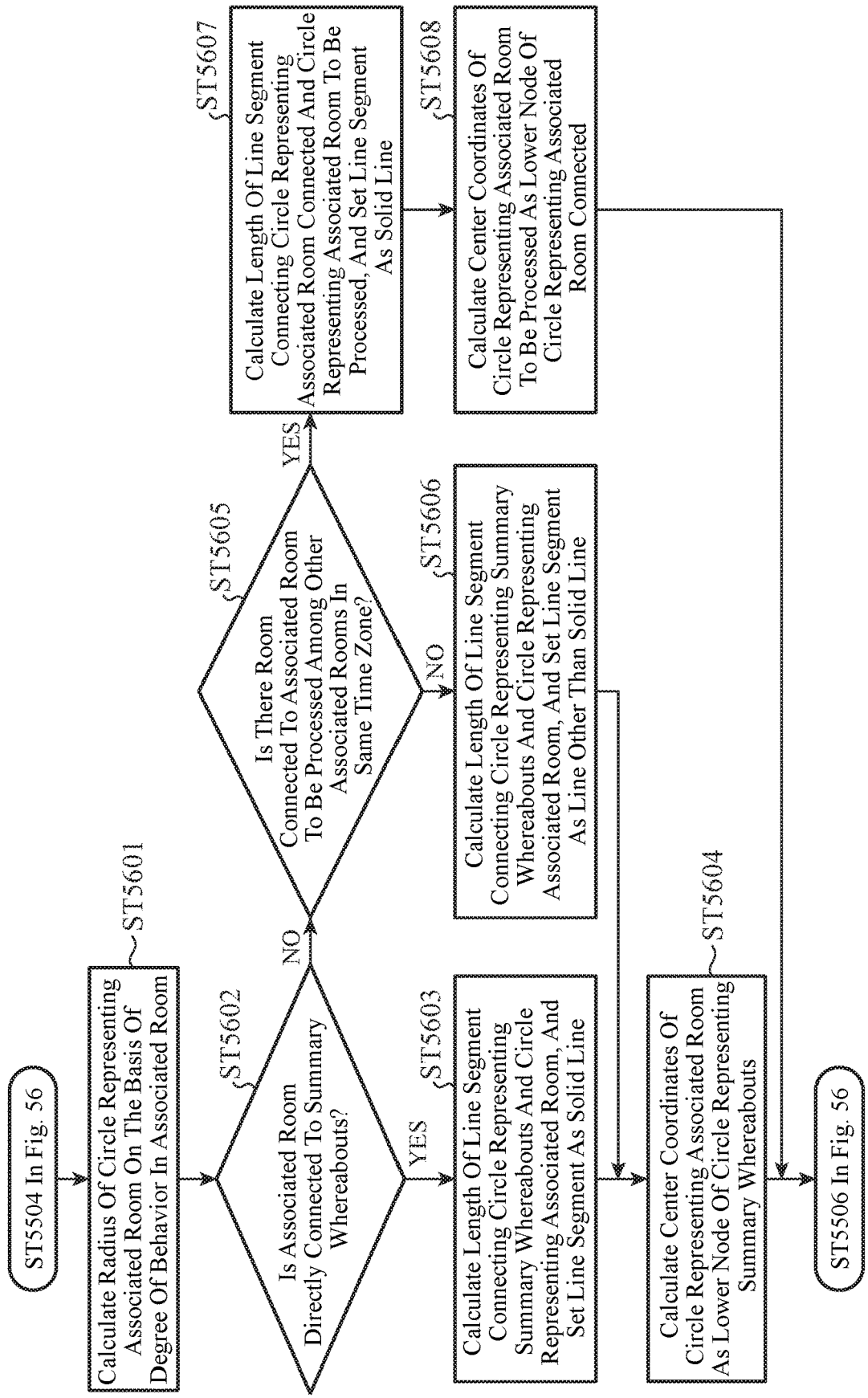
FIG. 57 is a flowchart for explaining details of an operation of a figure generating unit in step ST5506 of FIG. 56 in the fifth embodiment.

Here, FIG. 57 is a flowchart for explaining details of an operation of the figure generating unit 106 in step ST5506 of FIG. 56 in the fifth embodiment.

First, the figure generating unit 106 calculates the radius of a circle representing the drawing target associated room in the drawing target time zone on the basis of the degree of behavior of the drawing target associated room in the drawing target time zone according to the following (formula 6) (step ST5601).

(Radius of circle representing drawing target associated room)=(Degree of behavior of drawing target associated room in drawing target time zone)/(total value of degrees of behavior of all stores in time zone)*(constant)    (formula 6)

Currently, the drawing target associated room is "store 135". It is assumed that the detection number of times the sensor 2 has been turned ON in store 135 in the time zone of October 1 to October 7 that is a drawing target time zone is 668593.

In this case, the figure generating unit 106 calculates the radius of a circle representing "store 135" as follows.

(Radius of circle representing store 135)=668593/
2571512*300=78

Note that the constant is 300 in this case.

Subsequently, the figure generating unit 106 refers to the building structure file 201 stored in the storage unit 20*d*, and determines whether the drawing target associated room is directly connected to the drawing target summary whereabouts (step ST5602). Specifically, the figure generating unit 106 determines whether store 135 is directly connected to the special venue.

In step ST5602, if the figure generating unit 106 determines that the drawing target associated room is directly connected to the drawing target summary whereabouts ("YES" in step ST5602), the process proceeds to step ST5603.

In step ST5602, if the figure generating unit 106 determines that the drawing target associated room is not directly connected to the drawing target summary whereabouts ("NO" in step ST5602), the process proceeds to step ST5605.

In the building structure file 201, since store 135 is connected to the special venue (see FIG. 54), the process proceeds to step ST5603.

In step ST5603, the figure generating unit 106 calculates the length of a line segment connecting a circle representing the drawing target summary whereabouts and a circle representing the drawing target associated room, and sets the type of the line segment as a solid line (step ST5603).

Specifically, the figure generating unit 106 calculates the length of a line segment connecting a circle representing "special venue" that is drawing target summary whereabouts and a circle representing "store 135" that is a drawing target associated room.

The figure generating unit 106 sets the type of a line segment connecting a circle representing "special venue" and a circle representing "store 135" as a solid line.

In the fifth embodiment, the figure generating unit 106 calculates, for two rooms (referred to as room 1 and room 2), the length of a line segment connecting a circle representing room 1 and a circle representing room 2 using the following (formula 7).

(Length of line segment connecting circle representing room 1 and circle representing room 2)=1/(degree of association in drawing target time zone)*(constant)   (formula 7)

From the above (formula 7), the figure generating unit 106 calculates the length of the line segment connecting a circle representing "special venue" and a circle representing "store 135" as follows.

(Length of line segment connecting circle representing special venue and circle representing store 135)=1/0.7*20=29

Note that the constant is 20 in this case.

Subsequently, the figure generating unit 106 calculates the center coordinates of a circle representing a drawing target associated room using the circle representing the drawing target associated room as a lower node of a circle representing drawing target summary whereabouts (step ST5604).

That is, the figure generating unit 106 calculates the center coordinates of a circle representing "store 135" using the circle representing "store 135" as a lower node of a circle representing "special venue". The process in the case where the drawing target associated room is "store 135" is thus completed.

Now, return to the flowchart of FIG. 56.

In step ST5507, the figure generating unit 106 determines whether or not there is an unprocessed associated room (step ST5507).

In step ST5507, if the figure generating unit 106 determines that there is no unprocessed associated room ("NO" in step ST5507), the process proceeds to step ST5508.

In step ST5507, if the figure generating unit 106 determines that there is an unprocessed associated room ("YES" in step ST5507), the process returns to step ST5505, and the subsequent processes are repeated. That is, the figure generating unit 106 specifies the next unprocessed associated room as a drawing target associated room, and calculates the radius of a circle representing the drawing target associated room or the like (step ST5506).

In the above example, since there is "store 60" as an unprocessed associated room, the figure generating unit 106 uses "store 60" as a drawing target associated room (step ST5505) and performs the process in step ST5506.

Details of the process in step ST5506 for the "store 60" will be described again with reference to FIG. 57. Note that the detailed description of the contents already described in the process in FIG. 57 is omitted.

In step ST5601, the figure generating unit 106 calculates the radius of a circle representing "store 135" on the basis of the degree of behavior of "store 135" in a drawing target time zone (October 1 to October 7).

In step ST5602, the figure generating unit 106 determines that the drawing target associated room is not directly connected to the drawing target summary whereabouts ("NO" in step ST5602) because "store 60" is on the fourth floor (see FIG. 51) and is not directly connected to "special venue" on the ninth floor, and the process proceeds to step ST5605.

The figure generating unit 106 determines whether there is an associated room (referred to as "connection associated room") directly connected to "store 60" that is a drawing target associated room among the other associated rooms in the drawing target time zone (step ST5605).

In step ST5605, if the figure generating unit 106 determines that there is a connection associated room of "store 60" that is a drawing target associated room ("YES" in step ST5605), the process proceeds to step ST5607.

In step ST5605, if the figure generating unit 106 determines that there is no connection associated room of "store 60" that is a drawing target associated room ("NO" in step ST5605), the process proceeds to step ST5606.

Since "store 135" that is another associated room is on the ninth floor and is not a connection associated room of "store 60", the process proceeds to step ST5606.

In step ST5606, the figure generating unit 106 calculates the length of a line segment connecting a circle representing the drawing target summary whereabouts and a circle representing the drawing target associated room using the above (formula 7), and sets the type of the line segment as a line other than a solid line (for example, dotted line) (step ST5606).

Specifically, the figure generating unit 106 calculates the length of a line segment connecting a circle representing "special venue" that is drawing target summary whereabouts and a circle representing "store 60" that is a drawing target associated room, and sets the line segment as a dotted line.

Then, the figure generating unit 106 calculates the center coordinates of a circle representing "store 60" as a lower node of a circle representing "special venue" that is summary whereabouts (step ST5604).

The process in the case where the drawing target associated room is "store 60" is thus completed.

As described above, the figure generating unit 106 determines a positional relationship between a circle representing "special venue" that is summary whereabouts and circles representing "store 135" and "store 60" that are associated rooms, and the length, type, and color of a line segment connecting these circles in the time zone of October 1 to October 7. The figure generating unit 106 sets an appropriate color for a circle representing each store by changing the color for each store.

Note that in the above description, detailed description of the operations in step ST5607 and step ST5608 is omitted, but the operations in step ST5607 and step ST5608 are as follows.

In step ST5607, the figure generating unit 106 calculates the length of a line segment connecting a circle representing the drawing target associated room and a circle representing the connection associated room using the above (formula 7), and sets the type of the line segment as a solid line.

In step ST5608, the figure generating unit 106 calculates the center coordinates of a circle representing a drawing target associated room using the circle representing the drawing target associated room as a lower node of a circle representing a connection associated room.

Now, return to the flowchart of FIG. 56.

All the associated rooms have been processed in the time zone of October 1 to October 7. Therefore, in step ST5507, the figure generating unit 106 determines that there is no unprocessed associated room ("NO" in step ST5507), and the process proceeds to step ST5508.

In step ST5508, the figure generating unit 106 determines whether or not there is an unprocessed time zone (step ST5508).

In step ST5508, if the figure generating unit 106 determines that there is no unprocessed time zone ("NO" in step ST5508), the process ends.

In step ST5508, if the figure generating unit 106 determines that there is an unprocessed time zone ("YES" in step ST5508), the process returns to step ST5502, and the subsequent processes are repeated. That is, the figure generating unit 106 specifies the next unprocessed time zone as a drawing target time zone, and generates drawing figure data for displaying summary whereabouts and associated rooms in the drawing target time zone.

Currently, there is an unprocessed time zone. Therefore, for example, the figure generating unit 106 specifies a time zone of October 8 to October 14 as a drawing target time zone, the process returns to step ST5502, and the subsequent processes are repeated.

Since the processes after step ST2102 are similar to the processes described above, detailed description thereof is omitted.

As described above, the figure generating unit 106 generates drawing figure data for displaying a figure representing summary whereabouts for each time zone on the time axis as a parent node on the basis of information regarding a connection relationship between stores, summary whereabouts and an associated room extracted by the important room extracting unit 105*d*, the degree of behavior in the summary whereabouts and the associated room, and the degree of association between the two stores, and displaying the figure representing the associated room below the figure representing the summary whereabouts in a hierarchical structure.

The figure generating unit 106 stores the generated drawing figure data in the storage unit 20*d* and outputs the drawing figure data to the associated information imparting unit 108.

Note that in the above description, the "constant" of the formula for calculating the radius of a circle or the length of a line segment connecting the circles is not a fixed value. For example, a user can change "constant" depending on the resolution or screen size of the display device 4 for displaying the drawing figure data generated by the figure generating unit 106.

The associated information imparting unit 108 associates device information, sensor information, and associated information such as an image or a video with the drawing figure data representing summary whereabouts and an associated room, output in step ST4605 on the basis of the device information stored in the device information history storage unit 204, the sensor information stored in the sensor information history storage unit 205, and other information stored in the other information history storage unit 206 (step ST4606). A specific operation of the associated information imparting unit 108 is similar to that in the first embodiment.

The summary information generating unit 110 generates summary information by associating a summary condition with drawing figure data (see steps ST4605 and ST4606 in FIG. 47) generated by the figure generating unit 106 and associated with associated information by the associated information imparting unit 108.

A specific operation of the summary information generating unit 110 is similar to that in the third embodiment.

The drawing unit 109 displays a circle representing summary whereabouts for each time zone on the time axis as a parent node on the display device 4 on the basis of the drawing figure data output from the associated information imparting unit 108, and further displays a circle representing an associated room of the summary whereabouts below the circle representing the summary whereabouts in a hierarchical structure (step ST4607). The drawing unit 109 can also display the summary whereabouts and associated information of the associated room on the display device 4.

Figure 58:
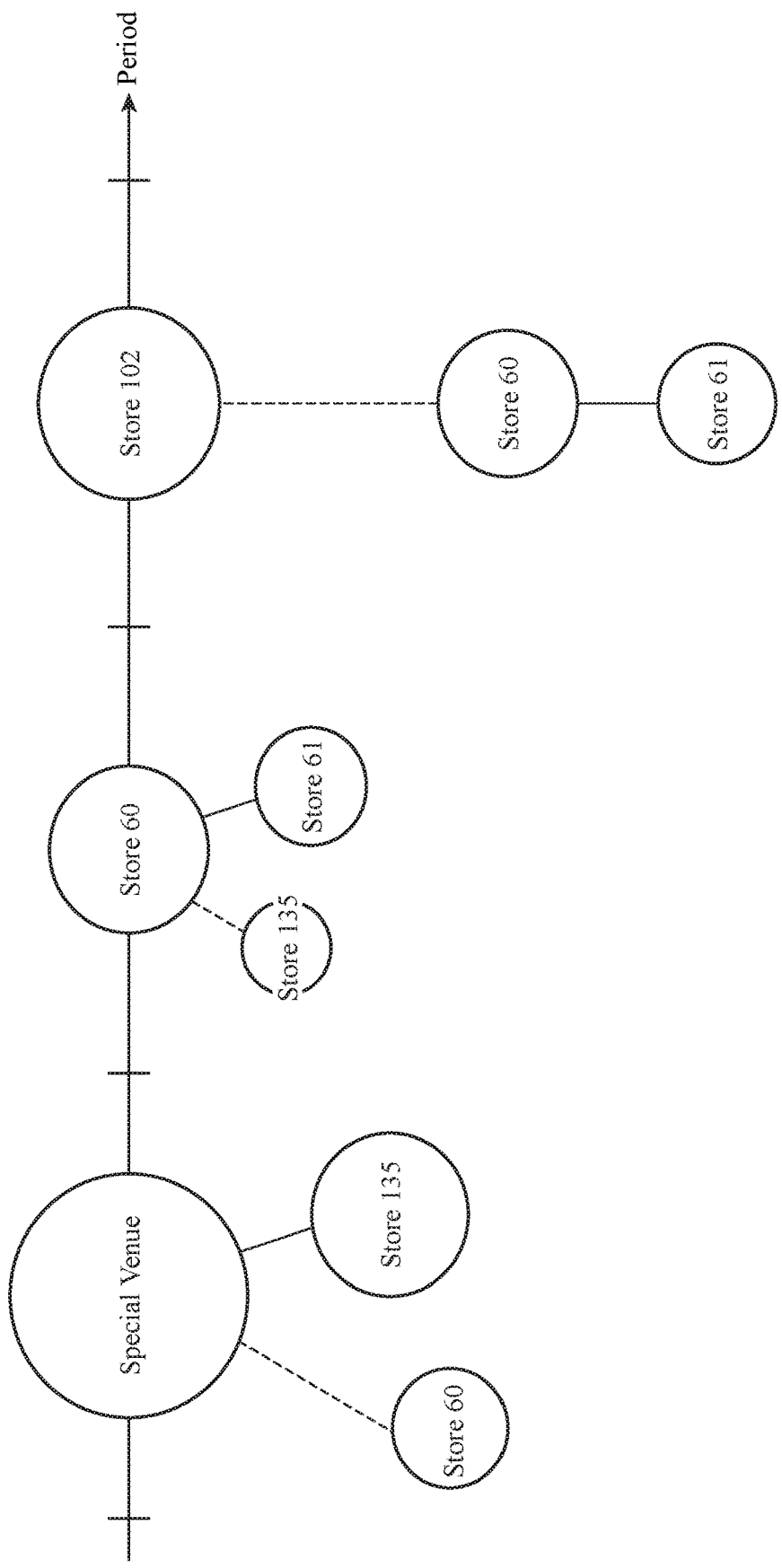
FIG. 58 is a diagram illustrating an example of a screen displayed on a display device by a drawing unit in the fifth embodiment.

FIG. 58 is a diagram illustrating an example of a screen to be displayed on the display device 4 by the drawing unit 109 in the fifth embodiment.

FIG. 58 illustrates, as an example, a result of analyzing a store that is whereabouts of an unspecified large number of people by dividing a target period of October 1 to Oct. 31, 2017 for every week in the above-described example. Note that in FIG. 58, only the period of October 1 to October 21 is displayed. However, a user can scroll the display in the time axis direction by operating an input device such as a mouse or a touch panel. The drawing unit 109 changes the period for display on the display device 4 depending on an instruction input from the user. The user can also display the entire period of October 1 to October 31 on one screen, for example, by operating the input device and inputting a reduced display instruction. The drawing unit 109 changes the period or the amount of information to be displayed on the display device 4 depending on an instruction input from the user.

FIG. 58 illustrates a state in which the name of a store deeply associated with people is displayed in each node.

Since the radius of a circle is calculated on the basis of the degree of behavior, it can be considered that the larger the circle is, the larger the number of customers is, or the more frequent the traffic of people is at the store.

Here, for example, it is assumed that such an event as described below was held in a period of October 1 to October 21.

From October 1 to October 7, a special venue for a limited period was set up on the ninth floor.

From October 8 to October 14, the special venue for a limited period was closed, and business was as usual.

From October 15 to October 21, store 102 held a sale.

By checking the screen as illustrated in FIG. 58, the user can understand the following from the size of a circle, the length of a line segment connecting the circles, and the type of the line segment.

About October 1 to October 7

In the special venue setting period (October 1 to October 7), a larger number of people visited the store than in normal times (October 8 to October 14) and visited the special venue.

Store 135 adjacent to the special venue was visited by a larger number of people than in normal times due to setting of the special venue.

A large number of people visited store 60 on a floor other than the ninth floor.

About the same number of people were detected in the same time zone in the special venue as in store 135. However, store 60 is not deeply associated with the time zone in which people were detected in the special venue.

(Since the special venue and store 135 are directly connected to each other on the same floor, it is estimated that there is a high probability that a person moves therebetween. However, store 60 is on a different floor from the special venue, and it is estimated that a probability that a person who has visited the special venue visits store 60 is low.)

About October 8 to October 14

In normal times, there are many people who visit store 60 throughout the shopping mall.

The number of customers visiting store 61 on the same floor as store 60 is the second largest after store 60. On the other floors, there are many customers visiting store 135.

Store 60, store 61, and store 135 are estimated to have about the same degree of congestion in the same time zone.

About October 15 to October 21

In normal times, the degree of detection of people at store 60 is high. However, store 102 held a sale, and therefore the most people were detected in store 102 in this period.

Store 60 has the same degree of detection of people as store 61 in the same time zone. However, the degree of detection of people at store 102 is in a different time zone from that at store 60 (correlation between store 102 and store 60 is low).

The drawing unit 109 can switch between displaying information regarding a store and displaying associated information for display contents on each node displayed on the display device 4.

Figure 59:
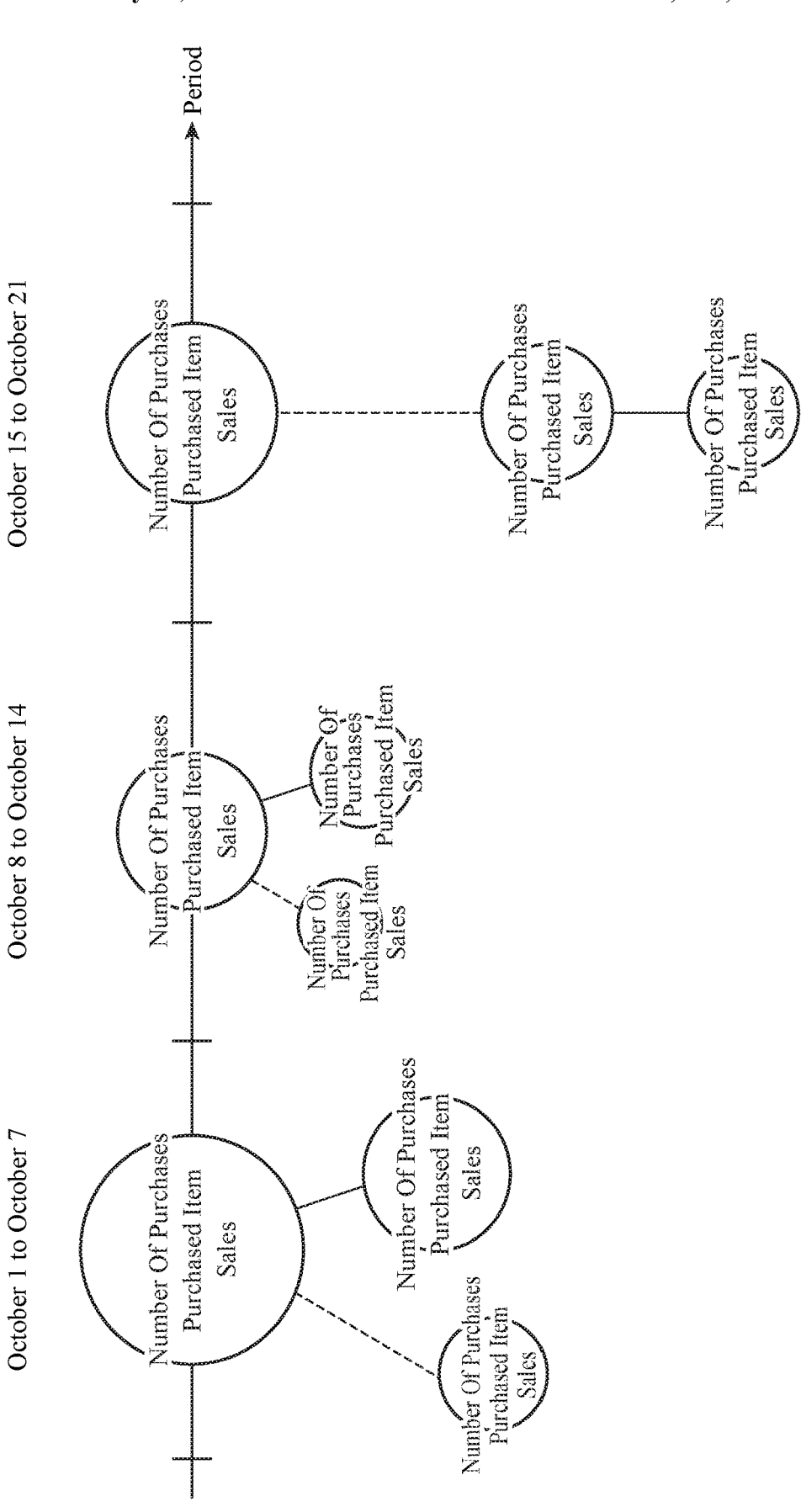
FIG. 59 is a diagram illustrating an example of a screen in which a drawing unit has switched information displayed on each node from the name of a store deeply associated with a person to associated information as illustrated in FIG. 58 in the fifth embodiment.

FIG. 59 is a diagram illustrating an example of a screen in which the drawing unit 109 has switched information displayed on each node from the name of a store deeply associated with people to associated information as illustrated in FIG. 58 in the fifth embodiment.

FIG. 59 illustrates an example in which the associated information imparting unit 108 associates information regarding the number of purchases, a purchased item, or sales as associated information with the drawing figure data.

Note that in FIG. 59, for easy understanding, item names of associated information including "number of purchases", "purchased item", and "sales" are illustrated on each node. However, actually, a specific number is displayed in the portion of "number of purchases", a specific product name is displayed in the portion of "purchased item", and a specific number is displayed in the portion of "sales".

The number of purchases, purchased item, and sales illustrated in the node representing the special venue from October 1 to October 7 indicate the results at the special venue in the period of October 1 to October 7.

The drawing unit 109 can perform various switching operations in addition to the switching operation as described above. A specific operation by which the drawing unit 109 switches display contents on each node is similar to that described with reference to FIGS. 31 to 39 and the like in the first embodiment. The drawing unit 109 is different between the fifth embodiment and the first embodiment only in that the drawing unit 109 in the fifth embodiment does not display information regarding behavior, and that summary whereabouts and whereabouts represented as an associated room are whereabouts of a specific resident in the first embodiment but whereabouts of an unspecified large number of people in the fifth embodiment.

For example, also in the fifth embodiment, like the contents illustrated in the operation example of the first embodiment, switching can be performed in such a manner that associated information is displayed only in a designated node in a state where a store name is displayed in each node (see FIG. 58).

Figure 60:
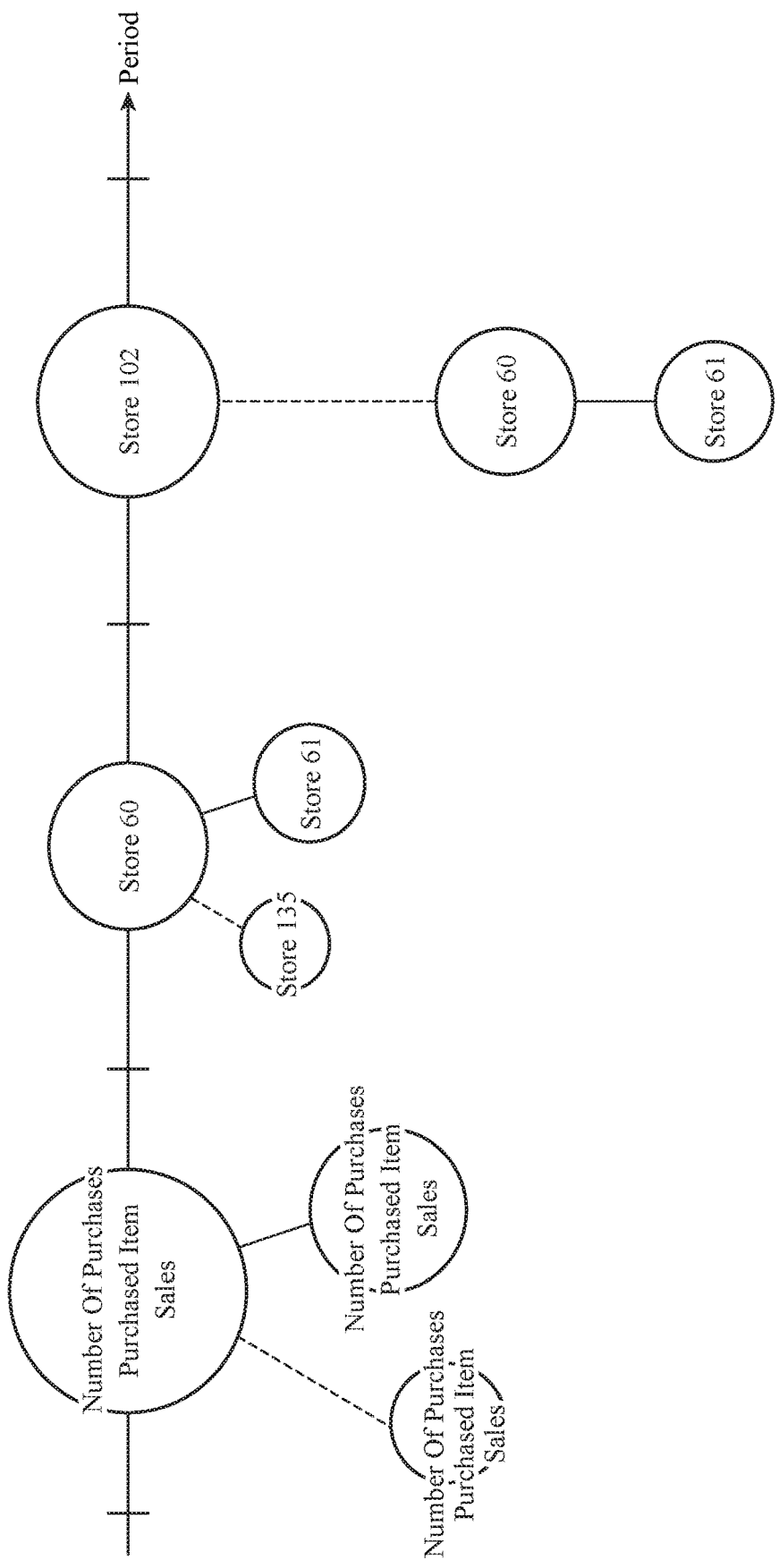
FIG. 60 is a diagram illustrating an example of a screen displayed on a display device by a drawing unit in the fifth embodiment.

For example, FIG. 60 illustrates a screen example in which information to be displayed in each node is switched to associated information only in the period of October 1 to October 7.

Note that in the fifth embodiment described above, when the degree-of-association estimating unit 1054 calculates the degree of association between two stores, the degree of association is calculated as an absolute value of a difference in the degree of behavior between the two stores. However, a formula for calculating the degree of association is not limited to the formula described above. For example, the degree-of-association estimating unit 1054 can calculate the degree of association between two stores by using another general method for calculating a distance between stores, the degree of similarity between stores, or correlation between stores.

In this way, even in a case where an unspecified large number of people are used as a target, the behavior visualization device 1d extracts a store where many people gather or a store where people are actively moving for each time zone obtained by dividing a target period as a store deeply associated with a person in the time zone, and visualizes the extracted store in association with a relationship between stores or associated information collected from each store. As a result, a user can easily compare characteristics in each time zone or characteristics between the time zones in a target period.

In the fifth embodiment described above, the behavior visualization device 1d has the configuration as illustrated in FIG. 46, and the behavior visualization device 1d includes the detection unit 101, collects information from the sensor 2 or the device 3 in real time, and stores the collected information as sensor information or device information in the storage unit 20d. However, the configuration of the behavior visualization device 1d is not limited thereto. For example, the behavior visualization device 1d may store sensor information or device information that has been already acquired in the storage unit 20d in advance, may analyze a store or the like where many people gather on the basis of the sensor information or the device information stored in advance, and may display the analysis result on the display device 4.

Figure 61:
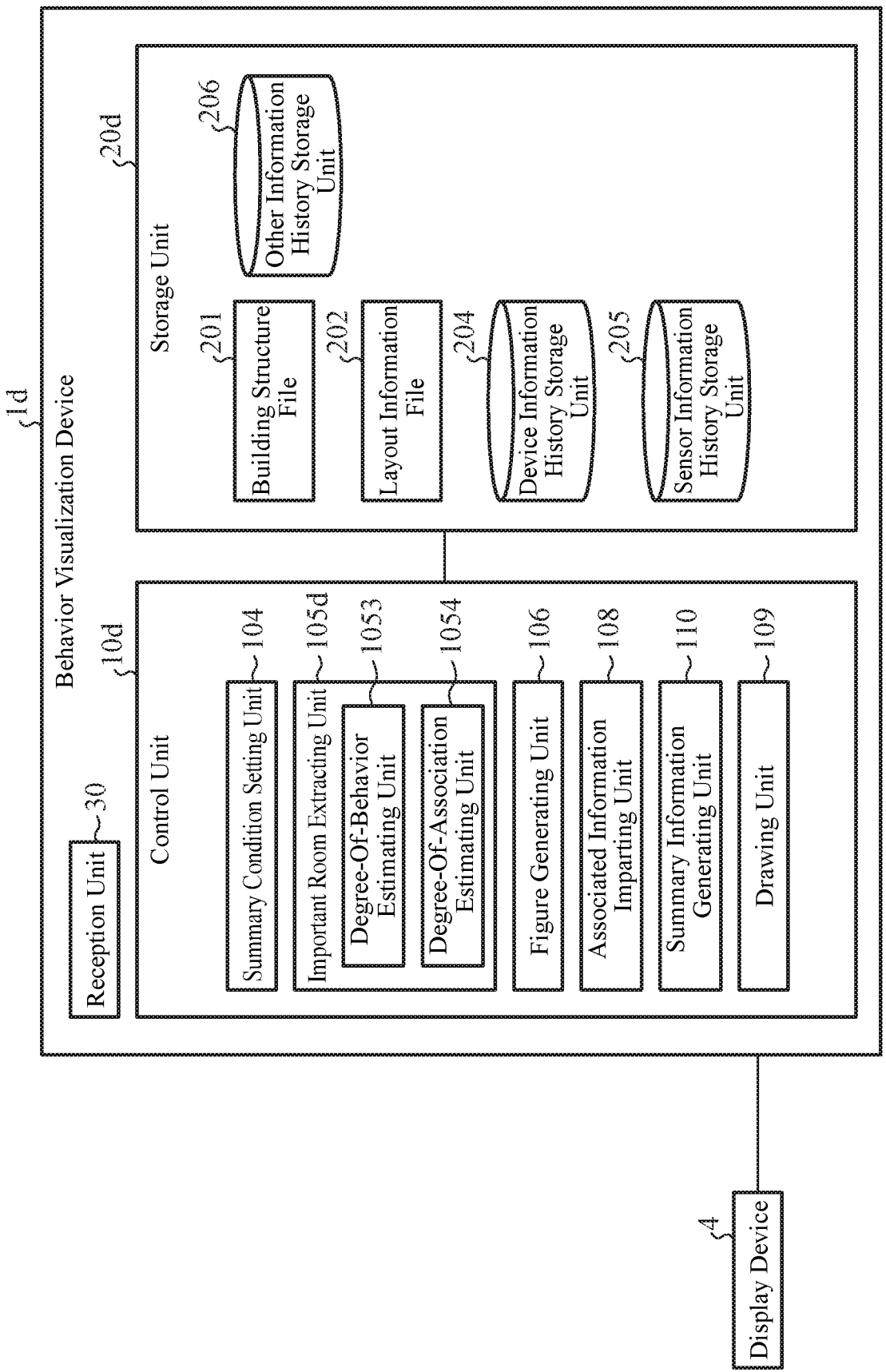
FIG. 61 is a configuration diagram illustrating an example of a configuration of a behavior visualization device in a case where a behavior visualization device analyzes a store or the like where many people gather on the basis of sensor information or device information stored in advance in the fifth embodiment.

FIG. 61 is a configuration diagram illustrating an example of a configuration of the behavior visualization device 1d in a case where the behavior visualization device 1d analyzes a store or the like where many people gather on the basis of the sensor information or the device information stored in advance in the fifth embodiment.

The behavior visualization device 1d illustrated in FIG. 61 is different from the behavior visualization device 1d illustrated in FIG. 46 only in that the behavior visualization device 1d illustrated in FIG. 61 does not include the detection unit 101. Other components and operations are similar to those of the behavior visualization device 1d illustrated in FIG. 46. Therefore, the components are denoted by the same reference numerals, and their redundant description is omitted.

In the fifth embodiment described above, the behavior visualization device 1d includes the summary information generating unit 110, but the behavior visualization device 1d does not need to include the summary information generating unit 110. In this case, the behavior visualization device 1d has a configuration in which the summary information generating unit 110 has been removed from the configurations illustrated in FIGS. 46 and 61.

As described above, the behavior visualization device 1d according to the fifth embodiment includes: the summary condition setting unit 104 for setting a summary condition for extracting whereabouts deeply associated with a target of interest; the important room extracting unit 105d (important whereabouts extracting unit) for extracting whereabouts deeply associated with the target of interest in each of a plurality of time zones on the basis of sensor information or device information indicating a change in state of a sensor or a device installed within a range to be whereabouts of the target of interest and a summary condition set by the summary condition setting unit 104; the figure generating unit 106 for calculating the areas of figure regions of figures representing whereabouts deeply associated with the target of interest, extracted by the important room extracting unit 105d, and a distance between the figure regions, and generating drawing figure data for displaying a figure representing whereabouts deeply associated with the target of interest in a hierarchical structure; and the drawing unit 109 for displaying drawing figure data generated by the figure generating unit 106 on the display device. Therefore, even in a case where an unspecified large number of people are used as a target of interest, by summarizing behavior of a target of interest and visualizing information regarding the behavior of the target using a hierarchical structure, information indicating behavior of the target of interest can be visualized so as to facilitate visual recognition thereof.

Sixth Embodiment

In the fifth embodiment, the degree-of-behavior estimating unit 1053 estimates the degree of behavior using information of the building structure file 201, layout information, device information, and sensor information.

The sixth embodiment will describe an embodiment in which the degree-of-behavior estimating unit 1053 estimates the degree of behavior using whereabouts information.

Figure 62:
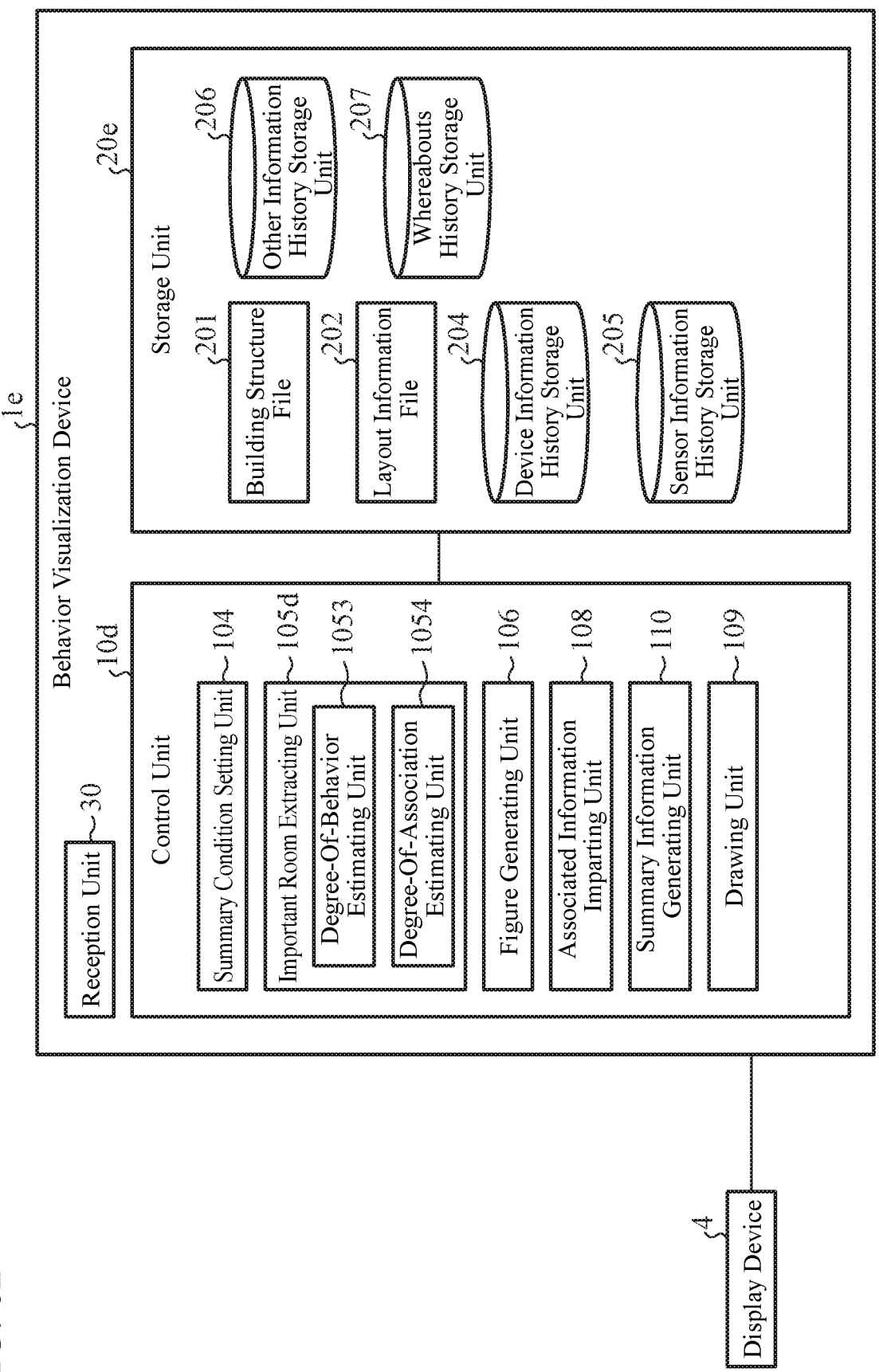
FIG. 62 is a block diagram illustrating a configuration example of a behavior visualization device according to a sixth embodiment.

FIG. 62 is a block diagram illustrating a configuration example of a behavior visualization device 1e according to the sixth embodiment.

In FIG. 62, similar components to those in the behavior visualization device 1d described with reference to FIG. 61 in the fifth embodiment are denoted by the same reference numerals, and their redundant description is omitted.

Similar to the configuration of the behavior visualization device 1d described with reference to FIG. 61 in the fifth embodiment, the behavior visualization device 1e according to the sixth embodiment illustrated in FIG. 62 analyzes a store or the like where an unspecified large number of people gather as a store deeply associated with people on the basis of sensor information or device information that has been already acquired, stored in the storage unit 20d in advance, and displays the analysis result on the display device 4.

The behavior visualization device 1e is different from the behavior visualization device 1d described with reference to FIG. 61 in the fifth embodiment in that a storage unit 20e includes a whereabouts history storage unit 207. Since the whereabouts history storage unit 207 has a similar configuration to the whereabouts history storage unit 207 described with reference to FIG. 1 in the first embodiment. Therefore, components thereof are denoted by the same reference numerals, and their redundant description is omitted.

In the sixth embodiment, the whereabouts history storage unit 207 stores a result of estimating at which whereabouts people are located among whereabouts defined in a building structure file 201 as whereabouts information associated with information regarding the terminal IDs of smartphones and the like carried by people and date and time information. The result of estimating at which whereabouts people are located is acquired by, for example, a method based on the radio wave intensity of a beacon. In the behavior visualization device 1e as illustrated in FIG. 62, for example, whereabouts information acquired by another PC or the like is stored in the whereabouts history storage unit 207 of the storage unit 20e.

Since a hardware configuration of the behavior visualization device 1e is similar to the configuration described with reference to FIG. 41 in the first embodiment, their redundant description is omitted.

Next, an operation of the behavior visualization device 1e according to the sixth embodiment will be described.

In the following description, as in the fifth embodiment, as an example, the behavior visualization device 1e analyzes whereabouts and the like of an unspecified large number of people in a store of a shopping center, and visualizes the analysis result using a hierarchical structure.

In the sixth embodiment, as in the fifth embodiment, the behavior visualization device 1e sets the target period to a period of Oct. 1, 2017 to Oct. 31, 2017, divides the target period by every seven days from Sunday to Saturday, and summarizes stores deeply associated with people for the seven days.

Figure 63:
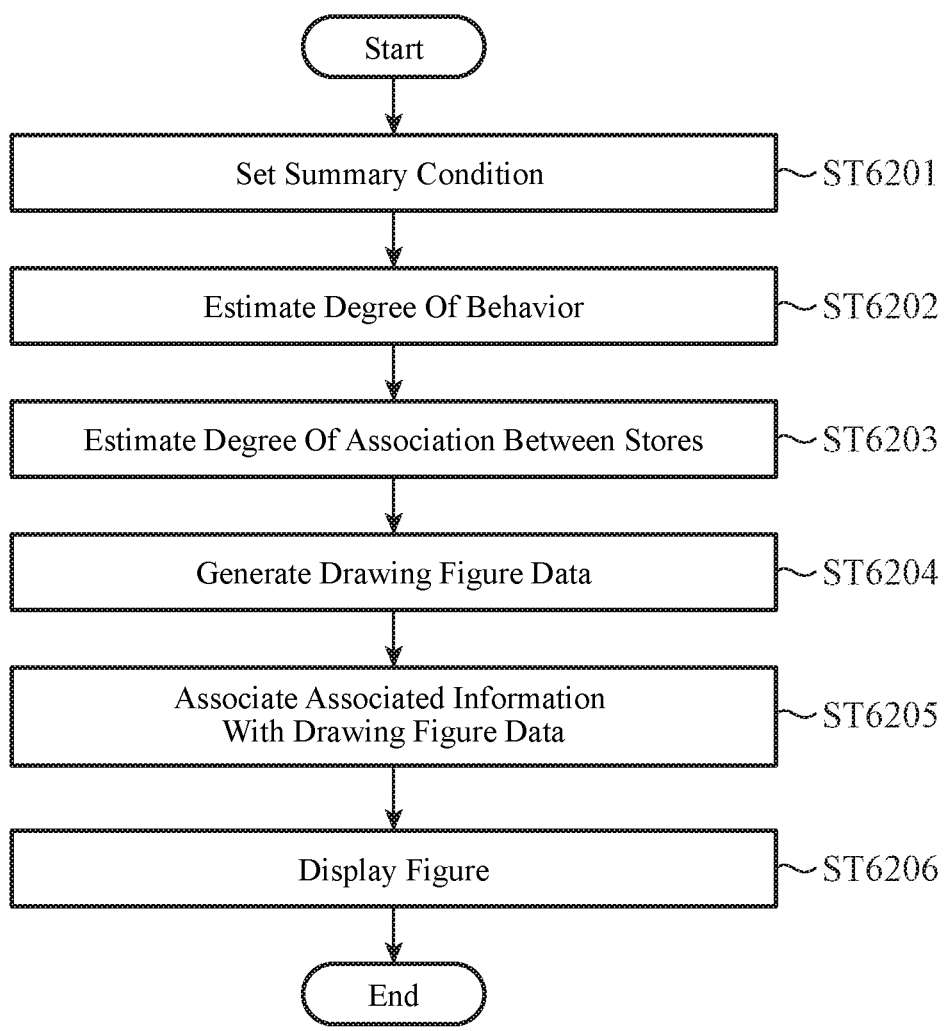
FIG. 63 is a flowchart for explaining an operation of a behavior visualization device in the sixth embodiment.

FIG. 63 is a flowchart for explaining an operation of the behavior visualization device 1e in the sixth embodiment.

The summary condition setting unit 104 sets a summary condition (step ST6201). A specific operation is similar to that in step ST4602-1 in FIG. 47 described in the fifth embodiment.

The degree-of-behavior estimating unit 1053 of the important room extracting unit 105d refers to the building structure file 201 of the storage unit 20 and the whereabouts information stored in the whereabouts history storage unit 207, and estimates how much people are performing behavior for each week (October 1 to Oct. 7, 2017, October 8 to Oct. 14, 2017 . . . ) in each store as the "degree of behavior". Then, the degree-of-behavior estimating unit 1053 extracts a store having the highest "degree of behavior" as summary whereabouts. The degree-of-behavior estimating unit 1053 searches for a room having the second highest "degree of behavior" after the summary whereabouts from the top according to a rank designated in a summary condition, and extracts the store as an associated room (step ST6202).

Figure 64:
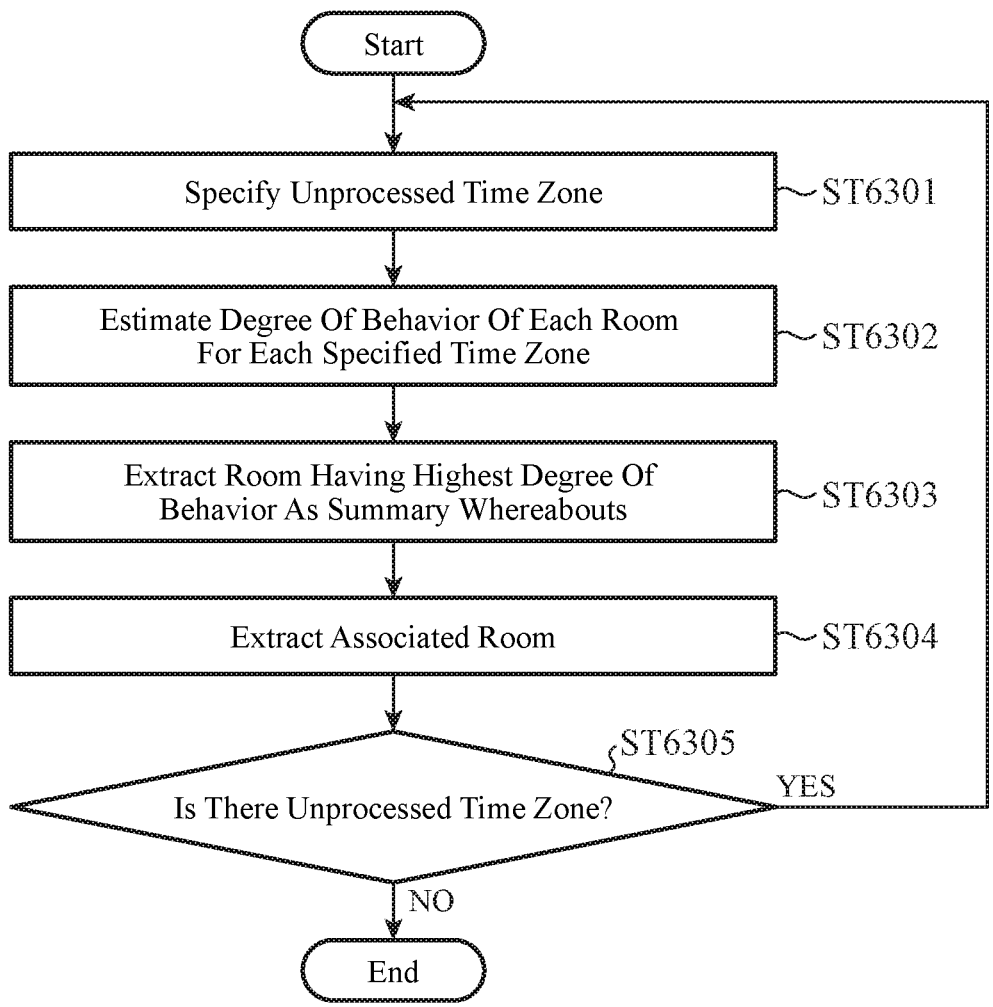
FIG. 64 is a flowchart for explaining details of an operation of extracting summary whereabouts and an associated room in each week by a degree-of-behavior estimating unit of an important room extracting unit in the sixth embodiment.

Here, FIG. 64 is a flowchart for explaining details of an operation of extracting summary whereabouts and an associated room in each week by the degree-of-behavior estimating unit 1053 of the important room extracting unit 105*d* in the sixth embodiment.

As an example, by using the following conditions as the summary condition set by the summary condition setting unit 104, an operation of the degree-of-behavior estimating unit 1053 will be described according to the flowchart of FIG. 64 with a specific example.

(A) Unit of a target period: one month (B) Start date and time and end date and time: Oct. 1, 2017 to Oct. 31, 2017

(C) Specific condition for period (time): none (D) Unit time for summarizing information regarding people (unit day): seven days (E) Condition for extracting whereabouts deeply associated with people in a target time zone Degree-of-behavior extraction level: 3

(F) Condition for extracting associated information: 3

First, the degree-of-behavior estimating unit 1053 specifies an unprocessed time zone (hereinafter referred to as "degree-of-behavior estimation target time zone") (step ST6301). A specific operation is similar to that in step ST4701 in FIG. 48 described in the fifth embodiment. First, the degree-of-behavior estimating unit 1053 sets a period of October 1 to October 7 as a degree-of-behavior estimation target time zone.

The degree-of-behavior estimating unit 1053 refers to the whereabouts history storage unit 207 of the storage unit 20*e*, and estimates the degree of behavior for each store during the period of October 1 to October 7 specified in step ST6301 (step ST6302).

Note that it is assumed that the contents of the building structure file 201 are, for example, the contents described with reference to FIGS. 49 and 51 in the fifth embodiment. In the building structure file 201, for a nine-story shopping mall, 150 stores opened in the shopping mall are defined for each floor.

The degree-of-behavior estimating unit 1053 acquires whereabouts information in the degree-of-behavior estimation target time zone (October 1 to October 7) from the whereabouts history storage unit 207, calculate the number of times whereabouts of people have been detected for each store, and estimates the number of times as the degree of behavior.

The degree-of-behavior estimating unit 1053 extracts a store having the highest degree of behavior as summary whereabouts among the stores the degrees of behavior of which have been estimated in step ST6302 (step ST6303). A specific operation is similar to that in step ST4703 in FIG. 48.

For example, the degree-of-behavior estimating unit 1053 extracts a special venue as summary whereabouts.

The degree-of-behavior estimating unit 1053 extracts another store deeply associated with people in the degree-of-behavior estimation target time zone as an associated room on the basis of a summary condition set by the summary condition setting unit 104 (see step ST6201 in FIG. 63) (step ST6304). A specific operation is similar to that in step ST4704 in FIG. 48.

As described above, the summary condition setting unit 104 sets the extraction condition (E) in the summary condition as follows.

Degree-of-behavior extraction level: 3

Since an area having the highest degree of behavior is a special venue, and the special venue has already been extracted as summary whereabouts, the degree-of-behavior estimating unit 1053 extracts store 135 (store on the same ninth floor as the special venue) and store 60 (store on the fourth floor) having the second highest and third highest degrees of behavior as associated rooms.

The degree-of-behavior estimating unit 1053 determines whether there is an unprocessed time zone in the target period of October 1 to Oct. 31, 2017 (step ST6305). A specific operation is similar to that in step ST4705 in FIG. 48.

In step ST6305, if there is no unprocessed time zone ("NO" in step ST6305), the process ends, and if there is an unprocessed time zone ("YES" in step ST6305), the process returns to step ST6304, and the subsequent processes are repeated.

The degree-of-behavior estimating unit 1053 stores information associated with information regarding the degree of behavior in summary whereabouts, an associated room, and each store (hereinafter referred to as post-degree-of-behavior-estimation information) in each time zone in the storage unit 20*d*, and outputs the information to the degree-of-association estimating unit 1054 of the important room extracting unit 105*d*.

Now, return to the flowchart of FIG. 63.

The degree-of-association estimating unit 1054 of the important room extracting unit 105*d* estimates the degree of association between stores on the basis of the post-degree-of-behavior-estimation information output from the degree-of-behavior estimating unit 1053 in step ST6202 (step ST6203).

Figure 65:
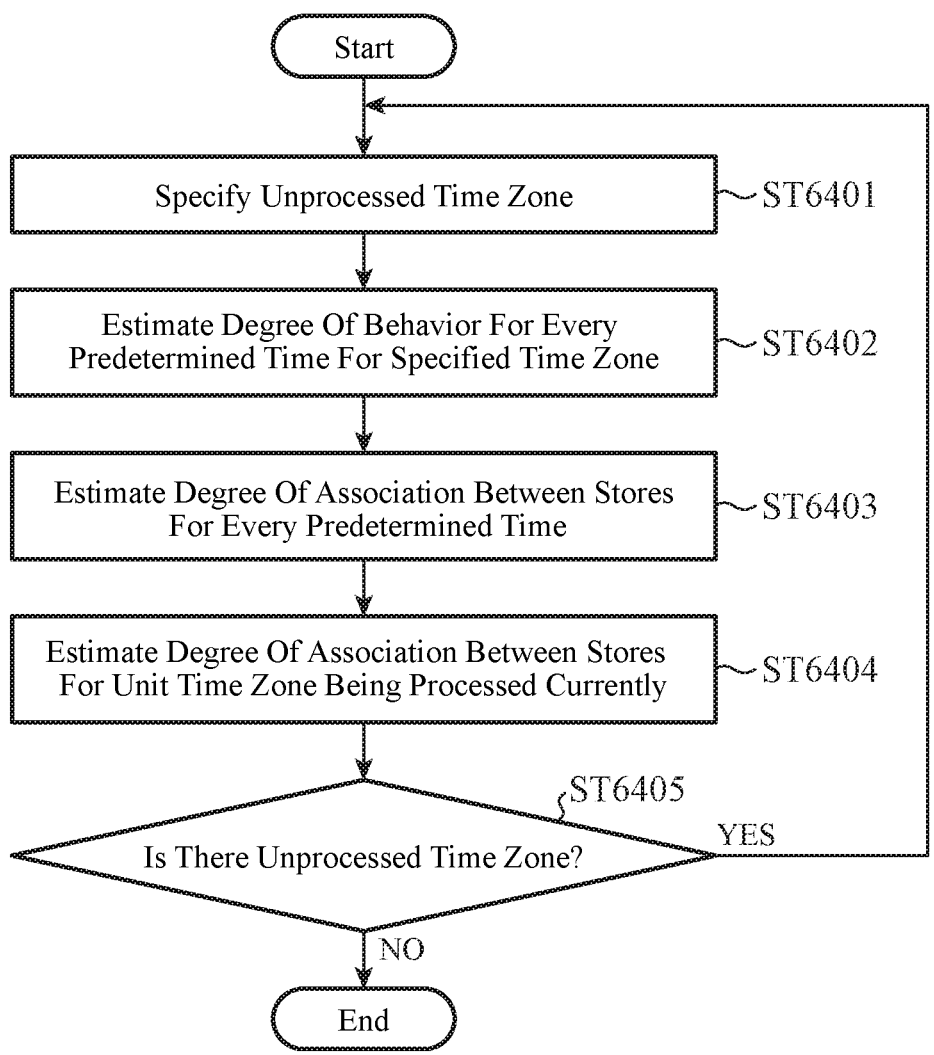
FIG. 65 is a flowchart for explaining details of an operation of estimating the degree of association between stores in each week by a degree-of-association estimating unit of an important room extracting unit in the sixth embodiment.

Here, FIG. 65 is a flowchart for explaining details of an operation of estimating the degree of association between stores in each week by the degree-of-association estimating unit 1054 of the important room extracting unit 105*d* in the sixth embodiment.

First, the degree-of-association estimating unit 1054 specifies an unprocessed time zone (hereinafter referred to as "degree-of-association estimation target time zone") (step ST6401). A specific operation is similar to that in step ST5401 in FIG. 55 described in the fifth embodiment. For example, the degree-of-association estimating unit 1054 first sets a period of October 1 to October 7 as a degree-of-association estimation target time zone.

The degree-of-association estimating unit 1054 estimates the degree of behavior between stores for all the stores extracted by the degree-of-behavior estimating unit 1053 (see steps ST6303 and ST6304 in FIG. 64) for every predetermined time in the period of October 1 to October 7 specified in step ST6401 (step ST6402).

For example, if the predetermined time is determined to be 30 minutes in advance as in the fifth embodiment, the degree-of-association estimating unit 1054 estimates the degree of behavior for every 30 minutes in three stores of the special venue, the store 135, and the store 60 extracted by the degree-of-behavior estimating unit 1053 from October 1 to Oct. 7, 2017.

Specifically, the degree-of-association estimating unit 1054 first acquires whereabouts information for every hour on October 1 from the whereabouts history storage unit 207, and estimates the number of times the whereabouts of people have been acquired in the special venue, the store 135, and the store 60 as the degree of behavior.

Since specific operations in steps ST6403 to ST6405 are similar to those in steps ST5403 to ST5405 in FIG. 55 described in the fifth embodiment, detailed description thereof is omitted.

The degree-of-association estimating unit 1054 stores information regarding the estimated degree of association in the storage unit 20*d* and outputs the information to the figure generating unit 106. In addition to the information regarding the estimated degree of association, the degree-of-association estimating unit 1054 outputs information regarding summary whereabouts and an associated room acquired from the degree-of-behavior estimating unit 1053, and information regarding the degree of behavior in the summary whereabouts and the associated room to the figure generating unit 106.

Now, return to the flowchart of FIG. 63.

Since specific operations in steps ST6204 to ST6206 are similar to those in steps ST4605 to ST4607 in FIG. 47 described in the fifth embodiment, detailed description thereof is omitted.

Note that in the sixth embodiment described above, as illustrated in FIG. 62, the behavior visualization device 1e includes the summary information generating unit 110, but limitation thereto is not intended, and the behavior visualization device 1e does not need to include the summary information generating unit 110.

In the sixth embodiment described above, as illustrated in FIG. 62, the behavior visualization device 1e does not include a detection unit 101, but limitation thereto is not intended, and the behavior visualization device 1e may include the detection unit 101.

The configuration of the behavior visualization device 1e in this case is a configuration obtained by adding the whereabouts history storage unit 207 to the configuration of the behavior visualization device 1d described with reference to FIG. 46 in the fifth embodiment.

As described above, according to the sixth embodiment, even in a case where an unspecified large number of people are used as a target of interest, by summarizing behavior of a target of interest and visualizing information regarding the behavior of the target using a hierarchical structure, information indicating behavior of the target of interest can be visualized so as to facilitate visual recognition thereof.

In the fifth and sixth embodiments described above, the behavior visualization devices 1d and 1e each include the associated information imparting unit 108. However, limitation thereto is not intended. By displaying only whereabouts of people (summary whereabouts and an associated room) without displaying associated information, the behavior visualization devices 1d and 1e may visualize a store deeply associated with an unspecified large number of people and a relationship between the stores.

In this case, as the configurations of each of the behavior visualization devices 1d and 1e, in FIGS. 46 and 62, each of the storage units 20d and 20e does not include the other information history storage unit 206, and the control unit 10d does not include the associated information imparting unit 108. Configurations and specific operations of the other units are similar to the configurations and specific operations described in the fifth and sixth embodiments.

In the fifth and sixth embodiments described above, the space including whereabouts of an unspecified large number of people of interest is a shopping mall, but this is merely an example. For example, the space including whereabouts of an unspecified large number of people of interest can be any space such as a factory, an office, a school, or a public facility.

In the fifth and sixth embodiments described above, the whereabouts of an unspecified large number of people of interest is a store, but this is merely an example. For example, the whereabouts of an unspecified large number of people of interest can be any place such as a floor in a building.

In the fifth and sixth embodiments described above, the unit time for dividing the target period is set to one week, but this is merely an example. For example, the target period and the unit time for dividing the target period may divide one day by every several hours, or may divide one year by every several months.

In the sixth embodiment described above, the behavior visualization device 1e does not specify an individual but visualizes an association between the degree of behavior of people and a store or associated information by collectively handling an unspecified large number of people. However, limitation thereto is not intended. For example, the behavior visualization device 1e may analyze behavior or the like of a specific individual or a plurality of specific people for the specific individual or by collectively handling the plurality of specific people on the basis of the terminal ID of whereabouts information stored in the whereabouts history storage unit 207.

In this case, when referring to the whereabouts history storage unit 207, the important room extracting unit 105d acquires whereabouts information only for terminal ID(s) owned by a specific individual or a plurality of specific people as a target for estimating the degree of behavior or the degree of association. Then, the important room extracting unit 105d estimates the degree of behavior or the degree of association of a specific individual or a plurality of specific people as a target for estimating the degree of behavior or the degree of association on the basis of the acquired whereabouts information.

Figure 66:
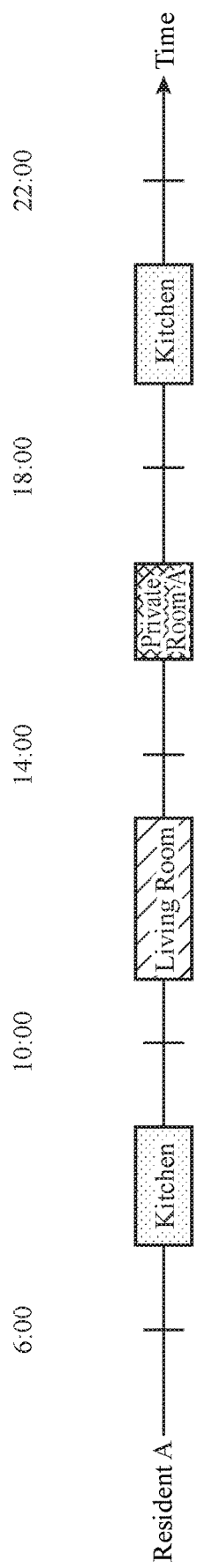
FIG. 66 is a diagram for explaining a display example in a case where a figure representing whereabouts, or the like deeply associated with a person is rectangular in the first to sixth embodiments.

In the first to sixth embodiments described above, the figure generating unit 106 of each of the behavior visualization devices 1 to 1e uses a circle when generating a figure representing whereabouts or the like deeply associated with a specific person, a plurality of specific people, or an unspecified large number of people. However, this is merely an example, and the figure generating unit 106 may use a figure other than a circle as a figure representing deeply associated whereabouts or the like. For example, the figure generating unit 106 may use a rectangle as a figure representing deeply associated whereabouts or the like as illustrated in FIG. 66.

The figure generating unit 106 calculates a value of a parameter characterizing a figure in such a manner that even when a figure representing deeply associated whereabouts is a circle or a rectangle, the larger the degree of occupancy or the degree of behavior is, the larger the region of the figure is. Examples of the parameter characterizing a figure include the radius of a circle in a case where the figure is the circle, and the horizontal width and vertical width in a case where the figure is a rectangle.

In the first to sixth embodiments described above, the figure generating unit 106 sets the time axis in the horizontal axis direction, but this is merely an example. The figure generating unit 106 can also generate drawing figure data by setting the time axis in the vertical axis direction or in a ring shape.

Figures 67A, 67B:
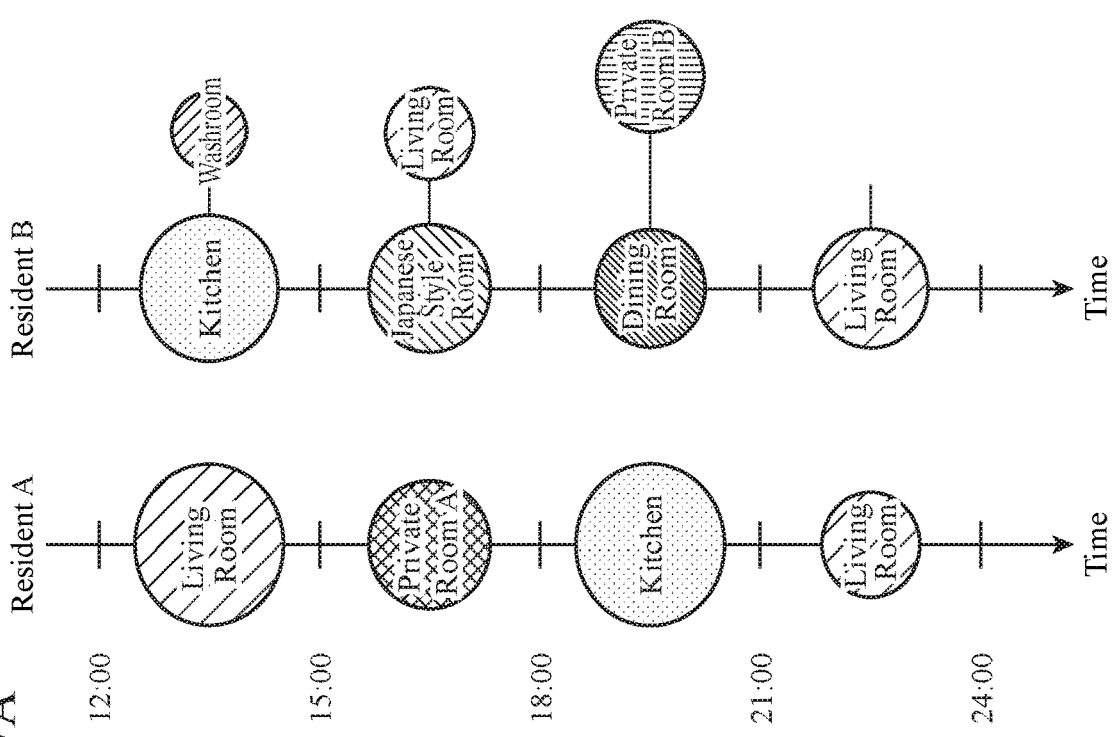
FIG. 67A is a display example in a case where a figure generating unit displays drawing figure data generated by setting a time axis in a vertical axis direction in the behavior visualization device according to any one of the first to sixth embodiments.
FIG. 67B is a display example in a case where the figure generating unit displays drawing figure data generated by setting the time axis in a ring shape in the behavior visualization device according to any one of the first to sixth embodiments.

For example, FIG. 67A illustrates a display example in a case where the figure generating unit 106 displays drawing figure data generated by setting the time axis in the vertical axis direction in the behavior visualization devices 1 to 1e according to the first to sixth embodiments. FIG. 67B illustrates a display example in a case where the figure generating unit 106 displays drawing figure data generated by setting the time axis in a ring shape in the behavior visualization devices 1 to 1e according to the first to sixth embodiments.

As illustrated in FIGS. 67A and 67B, a figure representing whereabouts, or the like deeply associated with a person is arranged depending on the time axis. Therefore, the arrangement is different from the figure arrangement in a case where the time axis is the horizontal axis.

In the first to sixth embodiments described above, the figure generating unit 106 generates drawing figure data connecting figures representing whereabouts of a person, main behavior, or associated information with a line segment, but this is merely an example. The figure generating unit 106 may connect figures with a curve, and the type of line connecting the figures is arbitrary.

Figure 68:
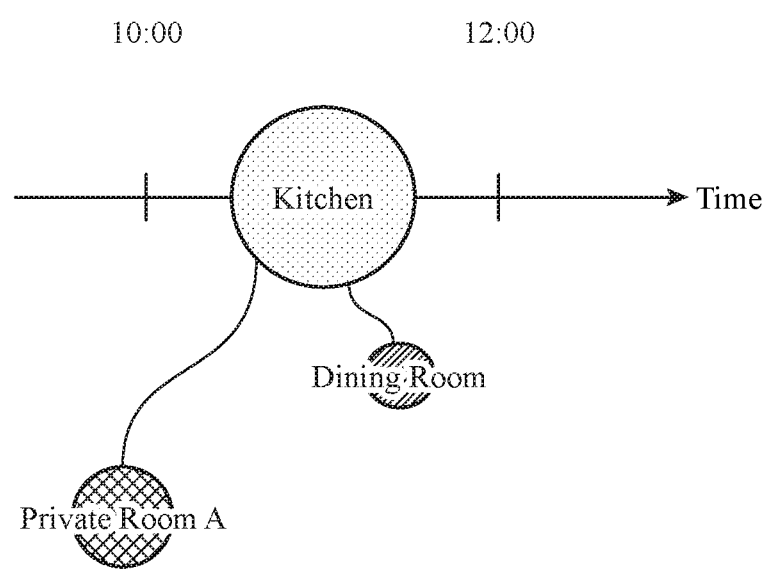
FIG. 68 is a display example in a case where a figure generating unit displays drawing figure data generated by connecting figures with a curve in the behavior visualization device according to any one of the first to sixth embodiments.

For example, FIG. 68 is a display example in a case where the figure generating unit 106 displays drawing figure data generated by connecting figures with a curve in the behavior visualization devices 1 to 1e according to the first to sixth embodiments.

In the first to sixth embodiments described above, the figure generating unit 106 generates drawing figure data in which a line segment connecting whereabouts that are directly connected to each other is a solid line, and a line segment connecting whereabouts that are not directly connected to each other is a line other than a solid line. However, this is merely an example. The figure generating unit 106 only needs to generate drawing figure data in such a manner that a figure element connecting whereabouts that are directly connected to each other can be distinguished from a figure element connecting whereabouts that are not directly connected to each other. For example, the figure generating unit 106 may generate drawing figure data distinguishing a line segment connecting whereabouts that are directly connected to each other from a line segment connecting whereabouts that are not directly connected to each other by color.

In the first to sixth embodiments described above, the figure generating unit 106 generates drawing figure data displaying whereabouts, main behavior, or associated information in a text in a figure element arranged in each time zone, for example, by displaying "living room" in a circle representing summary whereabouts. However, this is merely an example. The figure generating unit 106 may generate drawing figure data indicating whereabouts, main behavior, or associated information with an icon or the like.

In the first to sixth embodiments described above, the figure generating unit 106 generates drawing figure data with highlighted text in order to highlight main behavior or associated information in a case where there is a plurality of behaviors performed in each time zone or a plurality of pieces of associated information acquired in each time zone. However, this is merely an example. The figure generating unit 106 may generate drawing figure data indicating information to be highlighted and other information in different forms. For example, the figure generating unit 106 may generate drawing figure data displaying main associated information with an icon and displaying the others in a text.

As described above, the behavior visualization devices 1 to 1e analyze whereabouts deeply associated with a person or a relationship between whereabouts, and visualize the analysis result depending on summary on the time axis, a hierarchical structure, the area of a figure element, or a distance between the figure elements. Therefore, by checking visualized information, a user can easily understand main behavior of a person such as a place mainly spent by a person in a certain time zone, a place deeply associated with the place, main behavior performed at the place, behavior deeply associated with the main behavior, or information obtained at the place. A user can understand whereabouts of a person, main behavior, or associated information in association with one another.

The invention of the present application can freely combine the embodiments to one another, modify any constituent element in each of the embodiments, or omit any constituent element in each of the embodiments within the scope of the invention.

INDUSTRIAL APPLICABILITY

By analyzing whereabouts deeply associated with a target of interest and visualizing information regarding the whereabouts deeply associated with the target using a hierarchical structure, the behavior visualization device according to the present invention can visualize information indicating behavior of the target of interest so as to facilitate visual recognition thereof. Therefore, the behavior visualization device according to the present invention can be applied to a behavior visualization device for visualizing and providing information regarding behavior of a target of interest, for example.

REFERENCE SIGNS LIST 1, 1a, 1b, 1c, 1d, 1e: Behavior visualization device, 2: Sensor, 3: Device, 4: Display device, 10, 10a, 10b, 10c, 10d: Control unit, 20, 20d, 20e: Storage unit, 30: Reception unit, 101: Detection unit, 102: Whereabouts estimating unit, 103: Behavior estimating unit, 104: Summary condition setting unit, 105, 105d: Important room extracting unit, 106: Figure generating unit, 107: Behavior information imparting unit, 108: Associated information imparting unit, 109: Drawing unit, 110: Summary information generating unit, 201: Building structure file, 202: Layout information file, 203: Resident information file, 204: Device information history storage unit, 205: Sensor information history storage unit, 206: Other information history storage unit, 207: Whereabouts history storage unit, 208: Behavior definition file, 209: Behavior history storage unit, 1051: Occupancy time analyzing unit, 1052: Movement frequency analyzing unit, 1053: Degree-of-behavior estimating unit, 1054: Degree-of-association estimating unit, 4001: Processing circuit, 4002: HDD, 4003: Input interface device, 4004: Output interface device, 4005: Memory, 4006: CPU.

The invention claimed is:

1. A behavior visualization device comprising:
processing circuitry performing a process of:
setting a summary condition for extracting whereabouts deeply associated with a target of interest;
extracting whereabouts deeply associated with the target of interest in each of a plurality of time zones on a basis of whereabouts information indicating whereabouts of the target of interest and the summary condition;
calculating areas of figure regions of figures representing whereabouts deeply associated with the target of interest, and a distance between the figure regions, and generating drawing figure data for displaying a figure representing whereabouts deeply associated with the target of interest in a hierarchical structure; and
displaying drawing figure data on a display device, wherein
the process includes:
calculating an accumulated value of time during which the target of interest exists in each whereabouts for each of the time zones on a basis of the whereabouts information and the summary condition, extracting whereabouts having the largest accumulated value in each of the time zones as summary whereabouts, and extracting whereabouts having the second largest accumulated value after the summary whereabouts as associated whereabouts; and calculating a movement frequency between the summary whereabouts and other whereabouts by the target of interest for each of the time zones and extracting whereabouts having a high movement frequency with respect to the summary whereabouts as the associated whereabouts on a basis of the summary condition, and the process generates drawing figure data for displaying a figure representing the summary whereabouts for each of the time zones on a time axis as a parent node on a basis of information regarding an accumulated value of time during which the target of interest exists in each whereabouts for each of the time zones and information regarding a movement frequency between the summary whereabouts and other whereabouts by the target of interest, and displaying a figure representing the associated whereabouts below the figure representing the summary whereabouts in a hierarchical structure.

2. The behavior visualization device according to claim 1, wherein
the summary condition includes a condition for extracting behavior deeply associated with the target of interest, and
the process further comprises extracting behavior deeply associated with the target of interest in each whereabouts for each of the time zones on a basis of information regarding whereabouts deeply associated with the target of interest, behavior information indicating behavior by the target of interest, and the summary condition, and associating information regarding the extracted behavior with the drawing figure data.

3. The behavior visualization device according to claim 1, wherein
the summary condition includes a condition for extracting associated information deeply associated with the target of interest, and
the process further comprises extracting associated information deeply associated with the target of interest in each whereabouts for each of the time zones on a basis of information regarding whereabouts deeply associated with the target of interest, environmental information obtained in each whereabouts, and the summary condition, and associating the extracted associated information with the drawing figure data.

4. The behavior visualization device according to claim 1, the process further comprising
detecting changes in states of a sensor and a device installed within a range to be whereabouts of the target of interest, associating the detection information with date and time information, and generating sensor information and device information.

5. The behavior visualization device according to claim 4, the process further comprising:
estimating whereabouts of the target of interest on a basis of sensor information and device information, and generating the whereabouts information associating information regarding the estimated whereabouts with date and time information; and
estimating behavior of the target of interest on a basis of sensor information and device information, whereabouts information, and behavior definition defining a condition used for estimating behavior of the target of interest, wherein
the process sets the summary condition on a basis of behavior information indicating behavior of the target of interest.

6. The behavior visualization device according to claim 1, the process further comprising
generating summary information associating the summary condition with the drawing figure data.

7. The behavior visualization device according to claim 1, wherein
the process displays, on the display device, only a figure representing the summary whereabouts for each of the time zones on the time axis on a basis of the drawing figure data.

8. The behavior visualization device according to claim 1, wherein
there is a plurality of targets of interest, and
the process displays the hierarchical structure on the display device by switching between display of the hierarchical structure and non-display thereof depending on the target of interest on a basis of the drawing figure data.

9. A behavior visualization device comprising:
processing circuitry performing a process of:
setting a summary condition for extracting whereabouts deeply associated with a target of interest;
extracting whereabouts deeply associated with the target of interest in each of a plurality of time zones on a basis of sensor information or device information indicating a change in state of a sensor or a device installed within a range to be whereabouts of the target of interest and the summary condition;
calculating areas of figure regions of figures representing whereabouts deeply associated with the target of interest, and a distance between the figure regions, and generating drawing figure data for displaying a figure representing whereabouts deeply associated with the target of interest in a hierarchical structure; and
displaying drawing figure data on a display device, wherein
the process includes:
estimating a degree of behavior indicating how much the target of interest is performing behavior in each whereabouts for each of the time zones on a basis of information defining a region to be whereabouts of the target of interest, information defining a place where the sensor and the device are installed, the sensor information, the device information, and the summary condition, extracting whereabouts having the highest degree of behavior as summary whereabouts for each of the time zones, and extracting whereabouts having the second highest degree of behavior after the summary whereabouts as associated whereabouts; and
estimating, on a basis of the degree of behavior between two whereabouts included in the summary whereabouts and the associated whereabouts, a degree of association between the two whereabouts for each of the time zones, and
the process generates drawing figure data for displaying a figure representing the summary whereabouts for each of the time zones on a time axis as a parent node on a basis of the degree of behavior and the degree of association, and displaying a figure representing the associated whereabouts below the figure representing the summary whereabouts in a hierarchical structure.

10. The behavior visualization device according to claim 9, wherein
the summary condition includes a condition for extracting associated information deeply associated with the target of interest, and
the behavior visualization device further comprises associating associated information deeply associated with the target of interest in each whereabouts for each of the time zones with the drawing figure data on a basis of information regarding whereabouts deeply associated with the target of interest, environmental information obtained in each whereabouts, and the summary condition.

11. The behavior visualization device according to claim 9, the process further comprising
detecting changes in states of a sensor and a device installed within a range to be whereabouts of the target of interest, associating the detection information with date and time information, and generating the sensor information and the device information.

12. The behavior visualization device according to claim 9, the process further comprising
generating summary information associating the summary condition with the drawing figure data.

13. The behavior visualization device according to claim 9, wherein
the process displays, on the display device, only a figure representing the summary whereabouts for each of the time zones on the time axis on a basis of the drawing figure data.

14. The behavior visualization device according to claim 9, wherein
there is a plurality of targets of interest, and
the process displays the hierarchical structure on the display device by switching between display of the hierarchical structure and non-display thereof depending on the target of interest on a basis of the drawing figure data.

15. The behavior visualization device according to claim 1, wherein
the process generates the drawing figure data by calculating an area of a figure region of the figure and a distance between the figure regions depending on a resolution or a size of a screen on which the drawing figure data is displayed.

16. The behavior visualization device according to claim 9, wherein
the process generates the drawing figure data by calculating an area of a figure region of the figure and a distance between the figure regions depending on a resolution or a size of a screen on which the drawing figure data is displayed.

17. The behavior visualization device according to claim 1, wherein
the target of interest is a specific person.

18. The behavior visualization device according to claim 1, wherein
the target of interest is a group including a plurality of specific people.

19. The behavior visualization device according to claim 1, wherein
the target of interest is an unspecified large number of people.

20. The behavior visualization device according to claim 9, wherein
the target of interest is an unspecified large number of people.

21. A behavior visualization method comprising:
setting a summary condition for extracting whereabouts deeply associated with a target of interest;
extracting whereabouts deeply associated with the target of interest in each of a plurality of time zones on a basis of whereabouts information indicating whereabouts of the target of interest and the summary condition;
calculating areas of figure regions of figures representing whereabouts deeply associated with the target of interest and a distance between the figure regions, and generates drawing figure data for displaying a figure representing whereabouts deeply associated with the target of interest in a hierarchical structure; and
displaying drawing figure data on a display device, wherein
the step of extracting whereabouts deeply associated with the target of interest includes:
calculating an accumulated value of time during which the target of interest exists in each whereabouts for each of the time zones on a basis of the whereabouts information and the summary condition, extracting whereabouts having the largest accumulated value in each of the time zones as summary whereabouts, and extracting whereabouts having the second largest accumulated value after the summary whereabouts as associated whereabouts; and
calculating a movement frequency between the summary whereabouts and other whereabouts by the target of interest for each of the time zones and extracting whereabouts having a high movement frequency with respect to the summary whereabouts as the associated whereabouts on a basis of the summary condition, and
the step of generating the drawing figure data includes,
generating drawing figure data for displaying a figure representing the summary whereabouts for each of the time zones on a time axis as a parent node on a basis of information regarding an accumulated value of time during which the target of interest exists in each whereabouts for each of the time zones and information regarding a movement frequency between the summary whereabouts and other whereabouts by the target of interest, and displaying a figure representing the associated whereabouts below the figure representing the summary whereabouts in a hierarchical structure.

22. A behavior visualization method comprising:
setting a summary condition for extracting whereabouts deeply associated with a target of interest;
extracting whereabouts deeply associated with the target of interest in each of a plurality of time zones on a basis of sensor information or device information indicating a change in state of a sensor or a device installed within a range to be whereabouts of the target of interest and the summary condition;
calculating areas of figure regions of figures representing whereabouts deeply associated with the target of interest, and a distance between the figure regions, and generates drawing figure data for displaying a figure representing whereabouts deeply associated with the target of interest in a hierarchical structure; and
displaying drawing figure data on a display device, wherein
the step of extracting whereabouts deeply associated with the target of interest includes:
estimating a degree of behavior indicating how much the target of interest is performing behavior in each whereabouts for each of the time zones on a basis of information defining a region to be whereabouts of the target of interest, information defining a place where the sensor and the device are installed, the sensor information, the device information, and the summary condition, extracting whereabouts having the highest degree of behavior as summary whereabouts for each of the time zones, and extracting whereabouts having the second highest degree of behavior after the summary whereabouts as associated whereabouts; and estimating, on a basis of the degree of behavior between two whereabouts included in the summary whereabouts and the associated whereabouts, a degree of association between the two whereabouts for each of the time zones, and the step of generating the drawing figure data includes, generating drawing figure data for displaying a figure representing the summary whereabouts for each of the time zones on a time axis as a parent node on a basis of the degree of behavior and the degree of association, and displaying a figure representing the associated whereabouts below the figure representing the summary whereabouts in a hierarchical structure.

* * * * *